March 23, 1954  H. G. CROUCHER  2,672,973
APPARATUS FOR CONTROLLING SEQUENCES OF OPERATIONS BY
TRAVELING RECORD-BEARING MEANS FOR TYPOGRAPHICAL
COMPOSING, PRINTING, AND LIKE OPERATIONS
Filed June 1, 1951  20 Sheets-Sheet 11
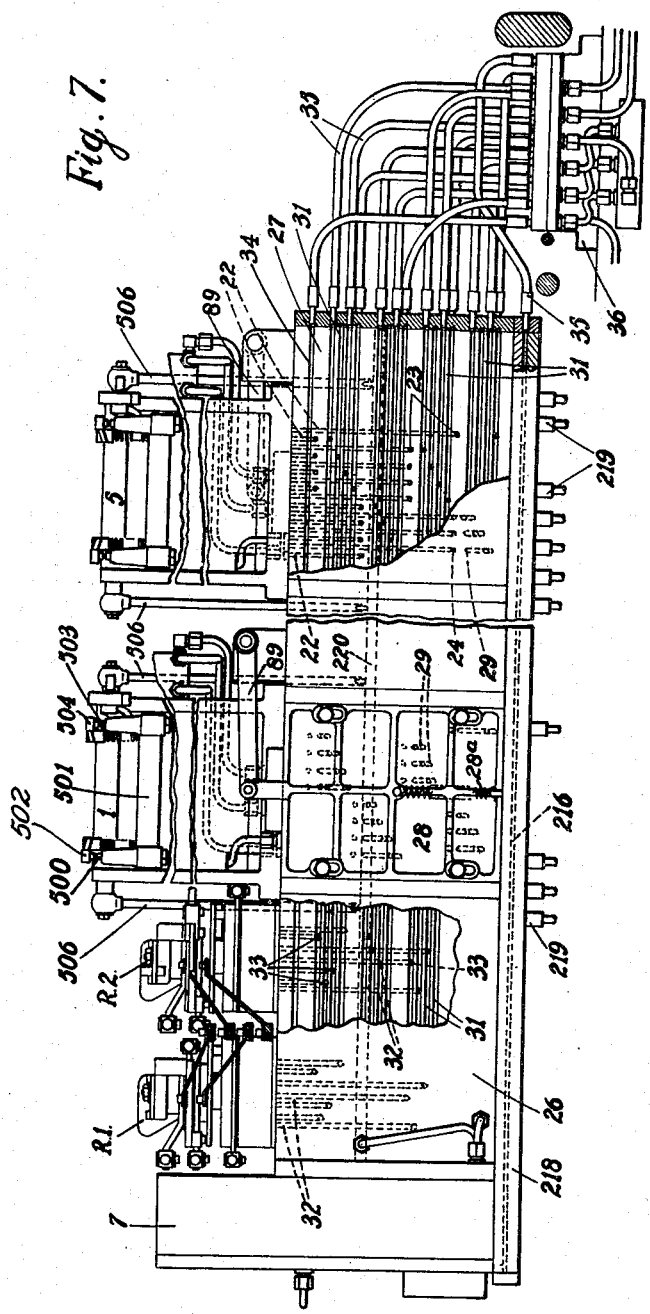
INVENTOR
Henry G. Croucher
BY
Hall & Houghton
ATTORNEYS March 23, 1954
H. G. CROUCHER
2,672,973
APPARATUS FOR CONTROLLING SEQUENCES OF OPERATIONS BY
TRAVELING RECORD-BEARING MEANS FOR TYPOGRAPHICAL
COMPOSING, PRINTING, AND LIKE OPERATIONS
Filed June 1, 1951
20 Sheets-Sheet 12
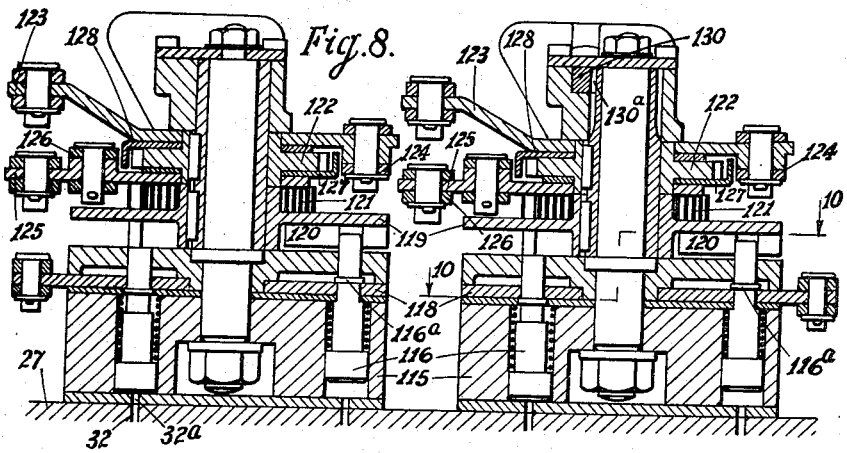
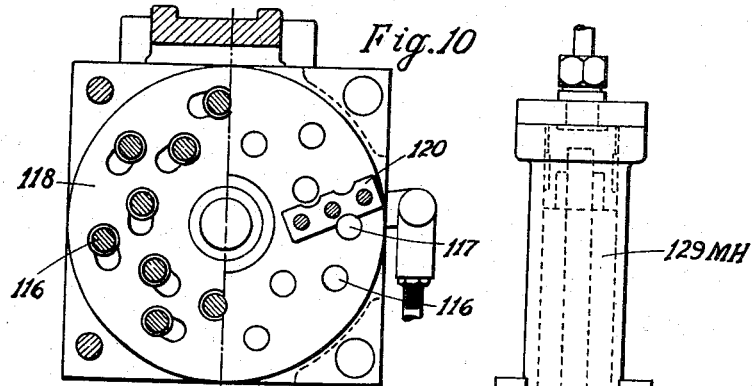
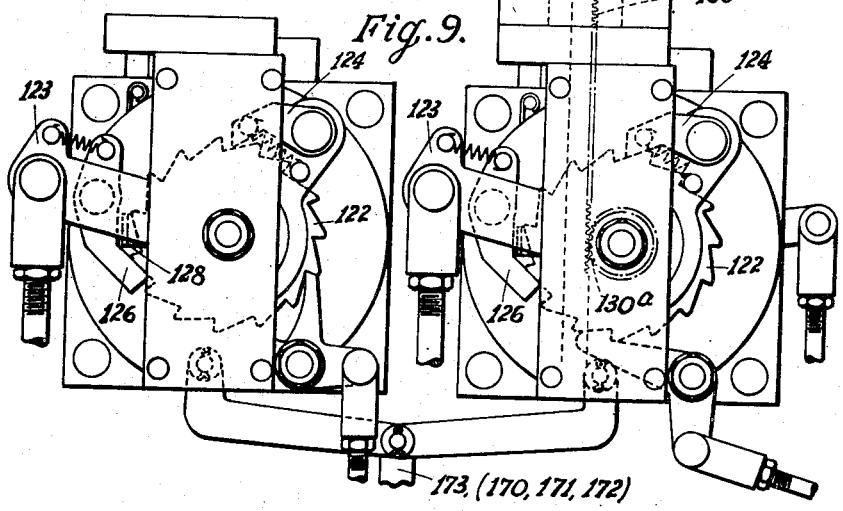
INVENTOR
Henry G. Croucher
BY
Hall & Houghton
ATTORNEYS

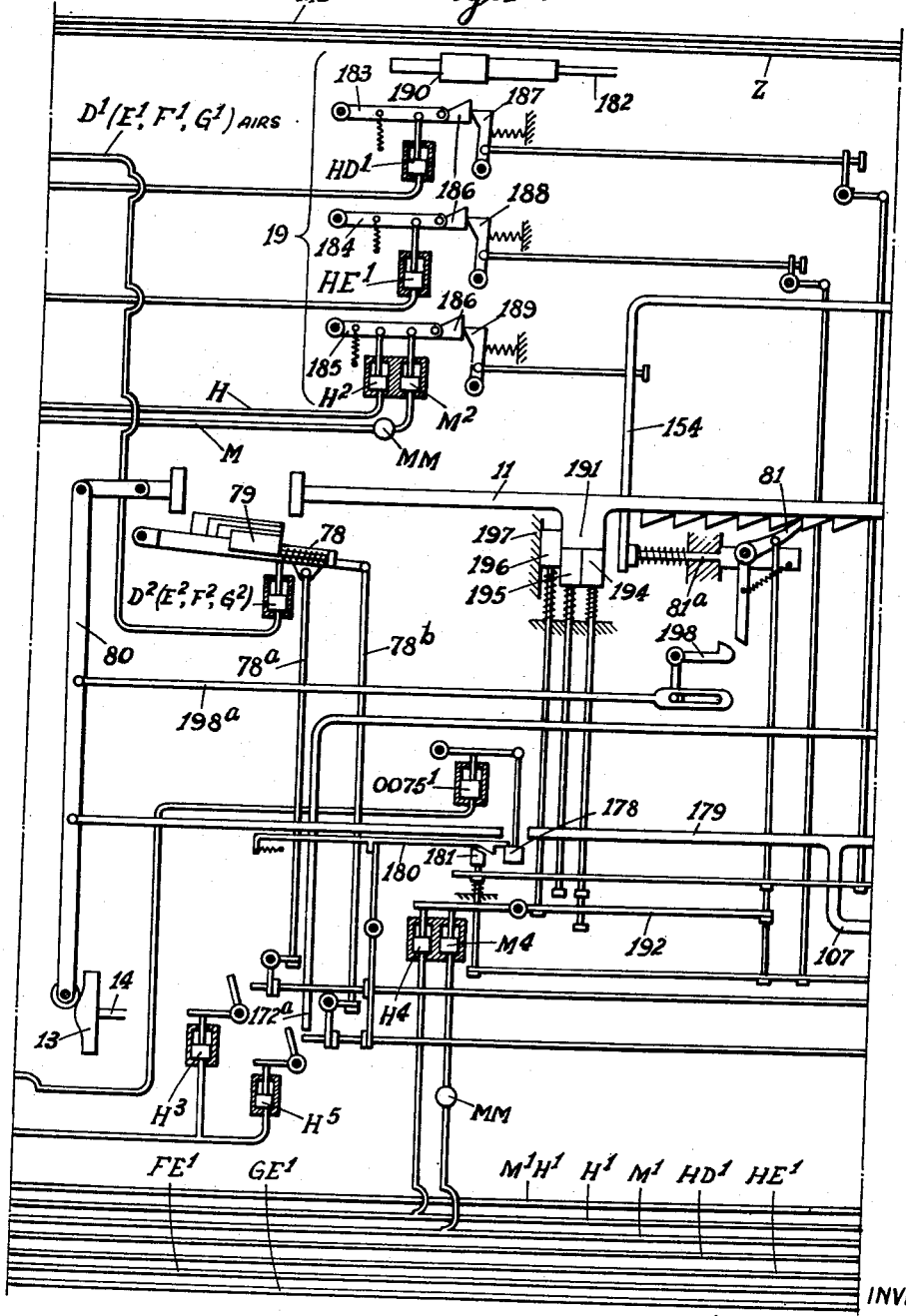

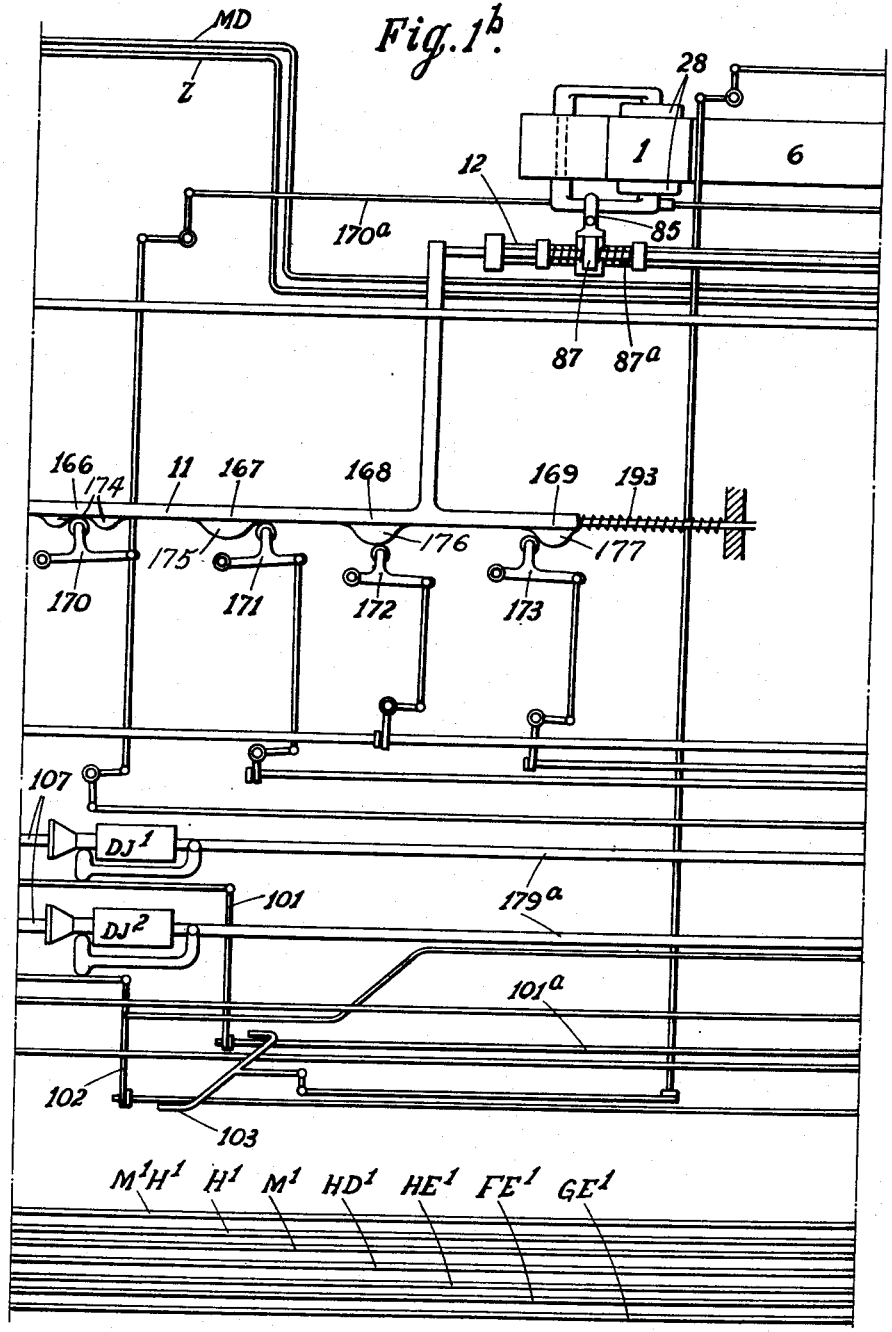

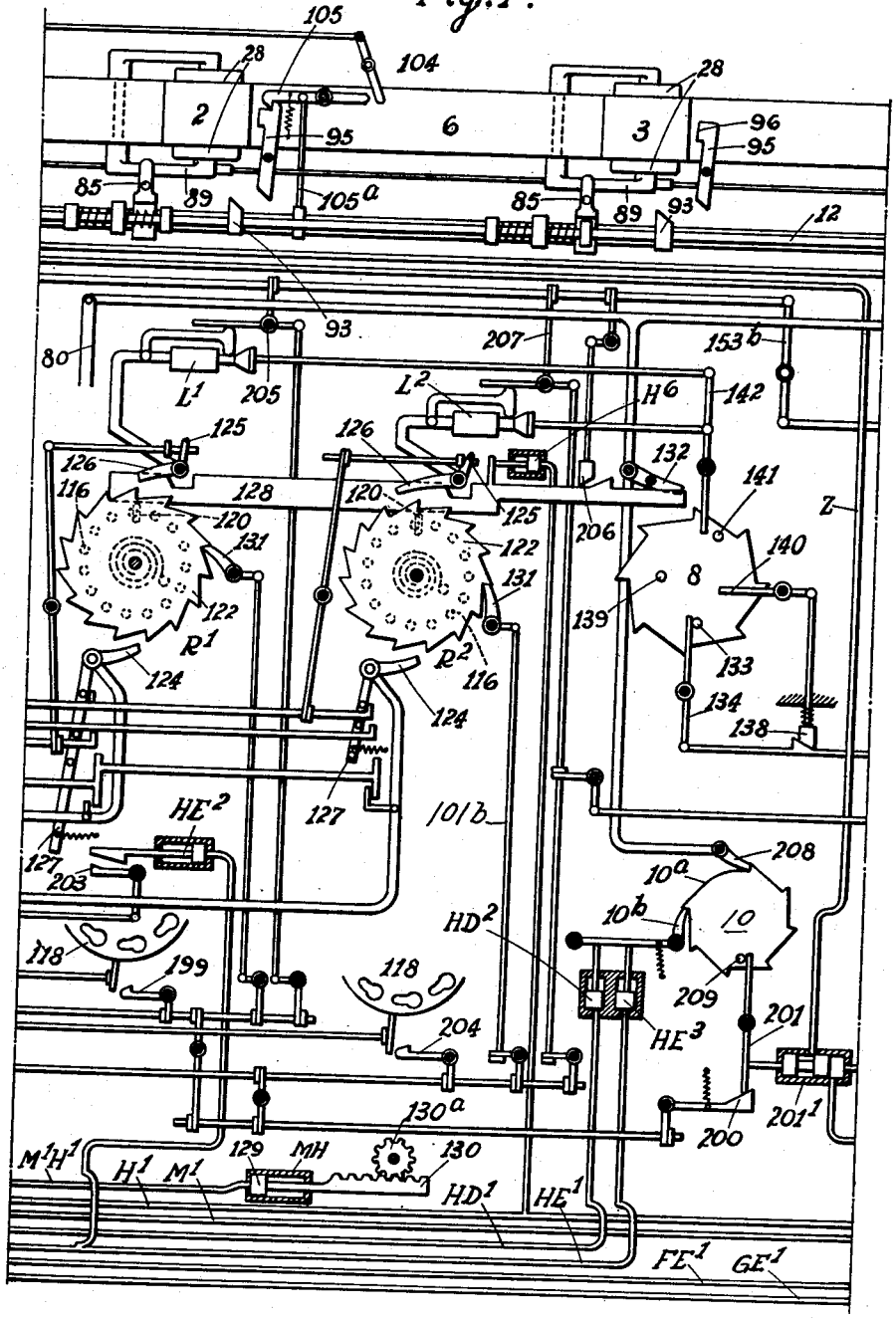

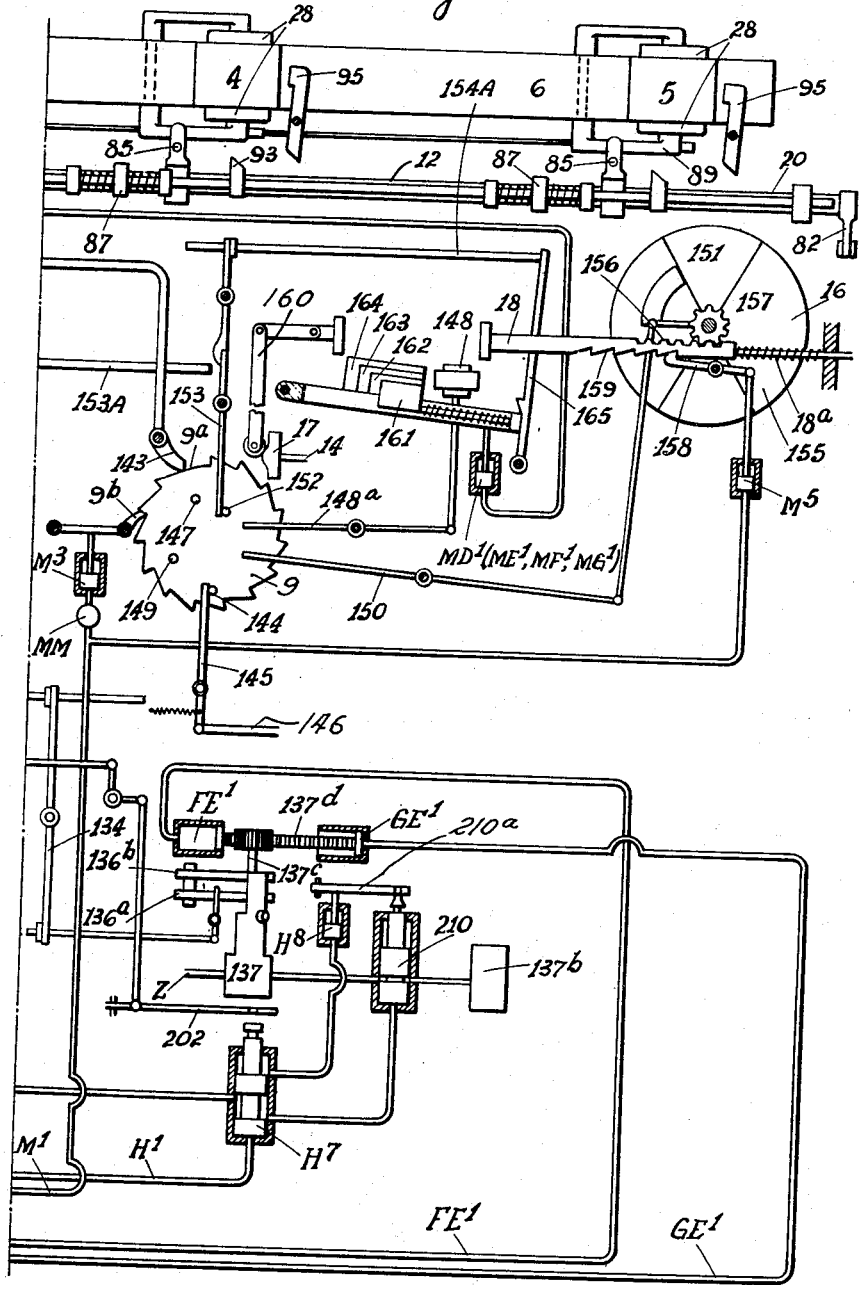

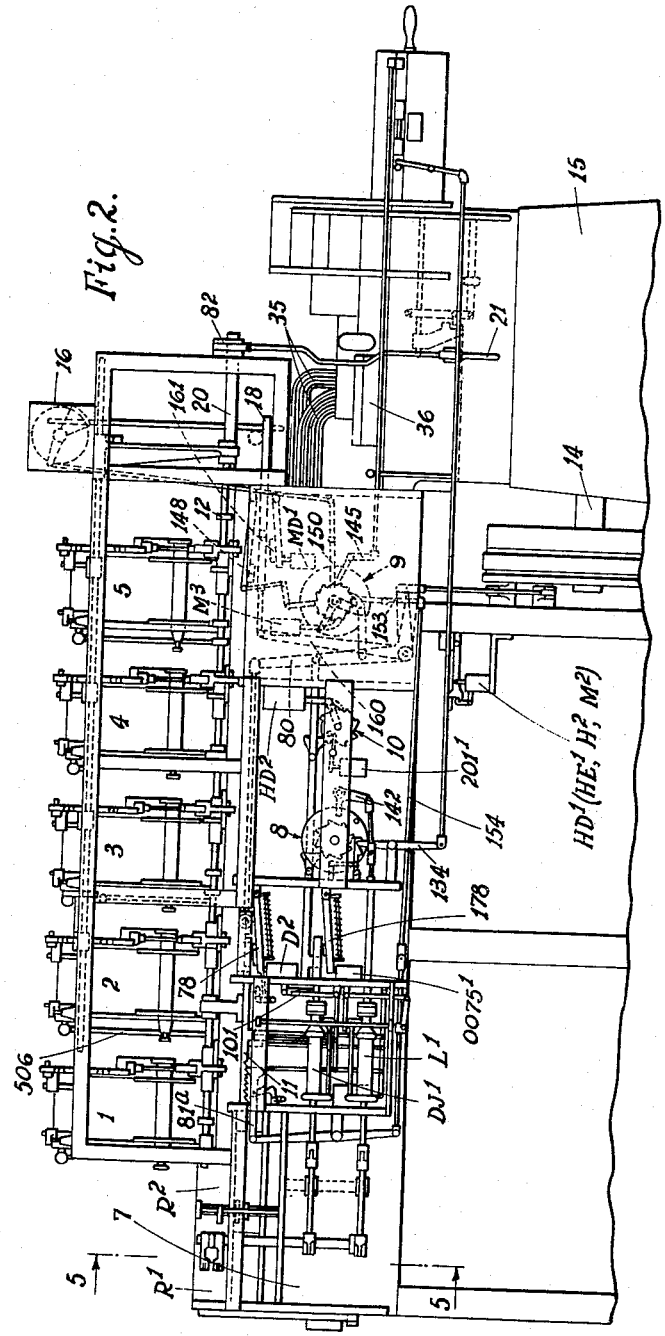

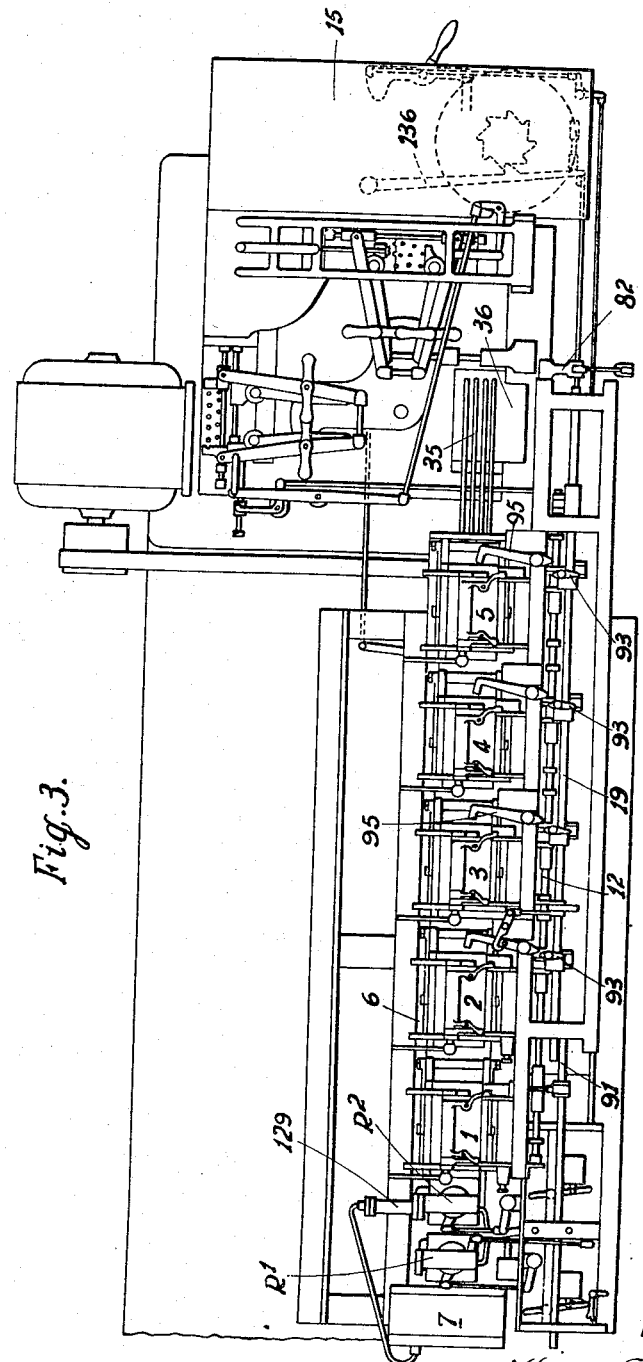

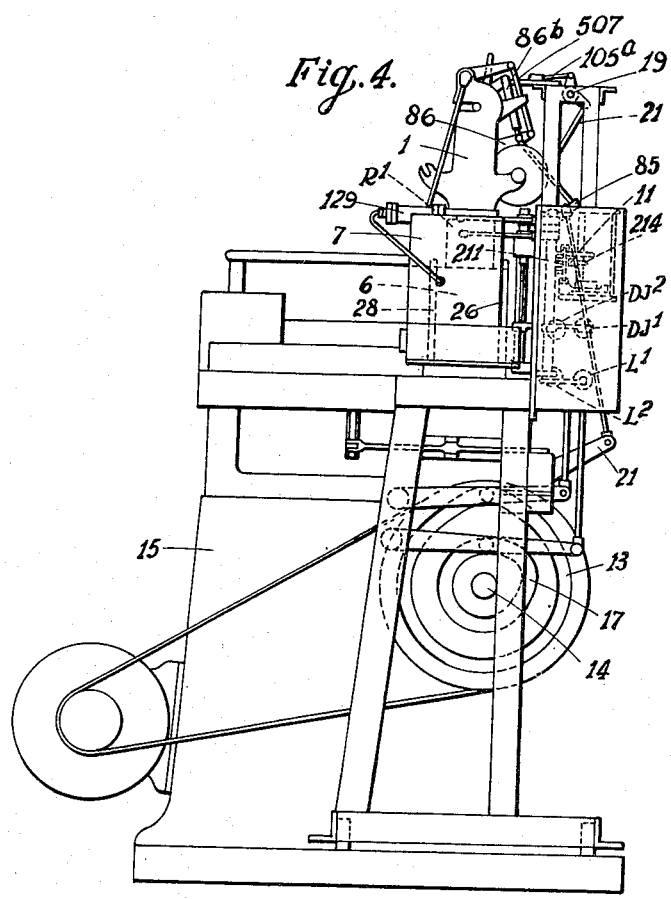

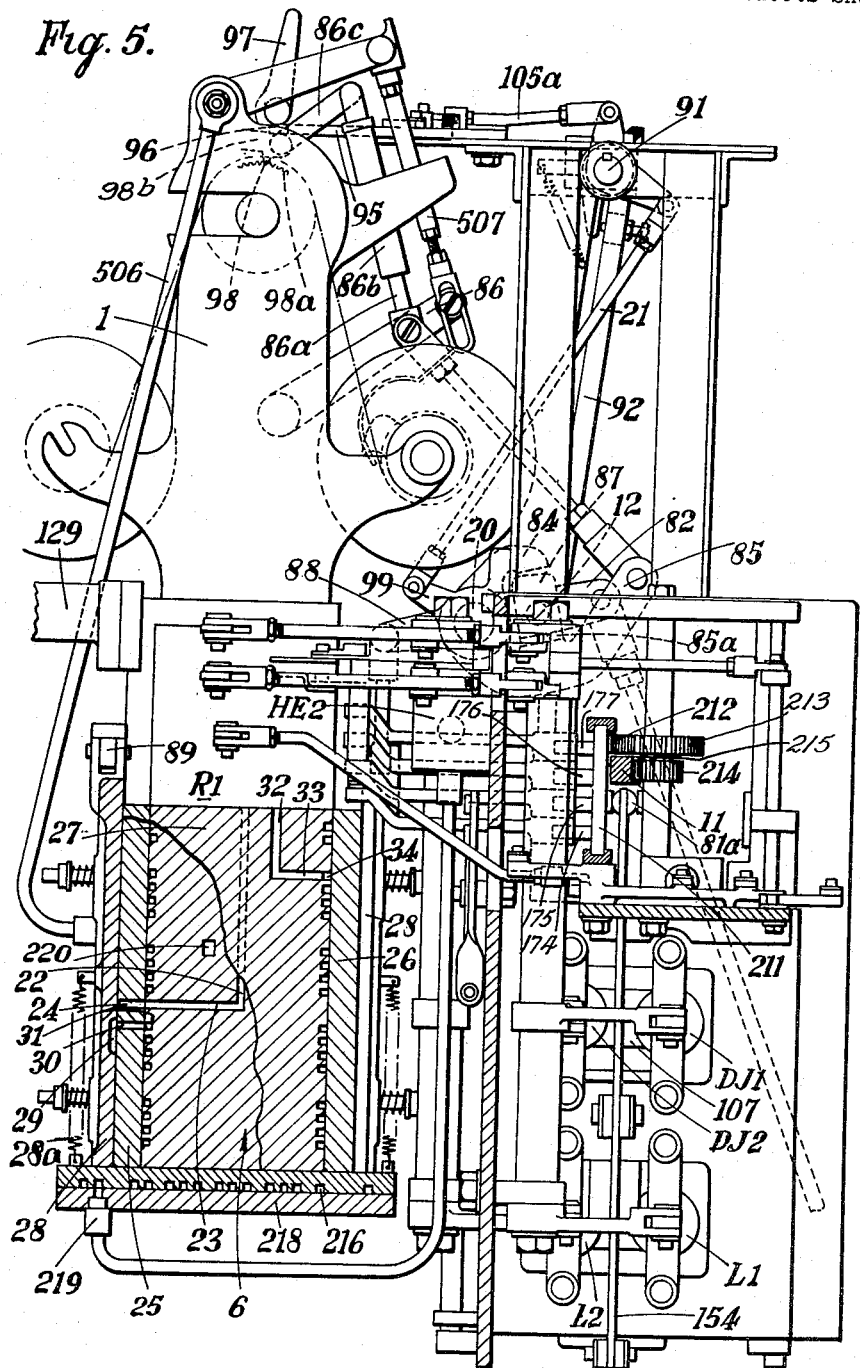

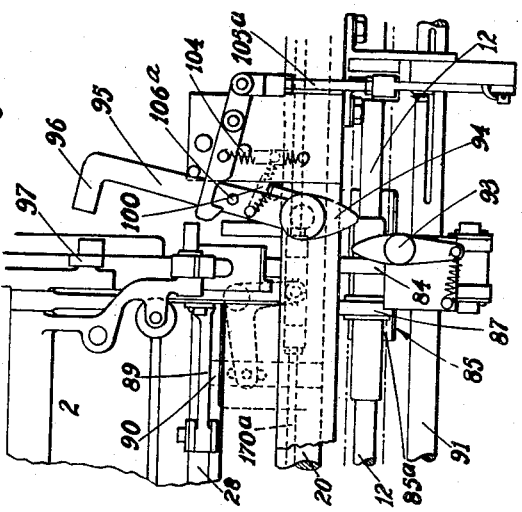

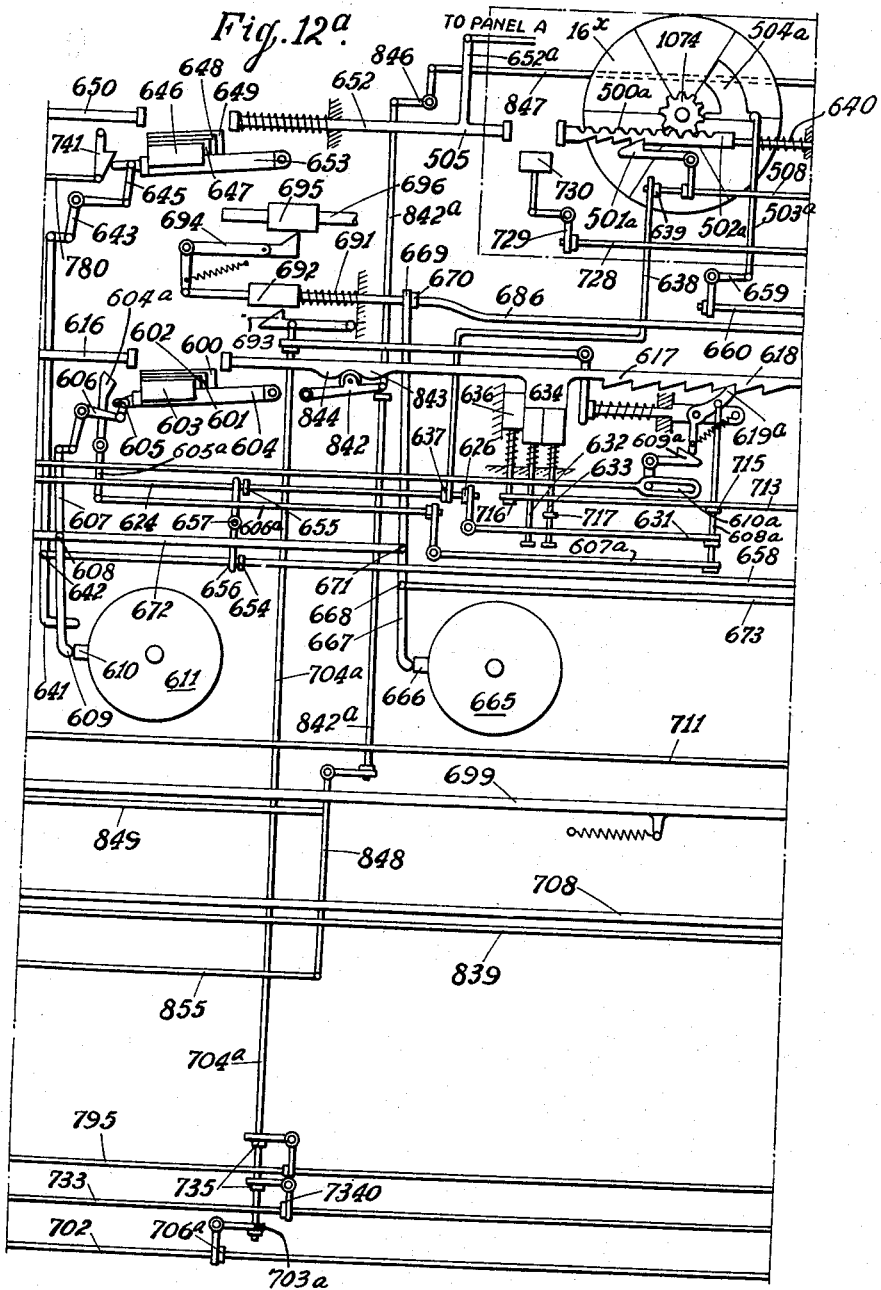

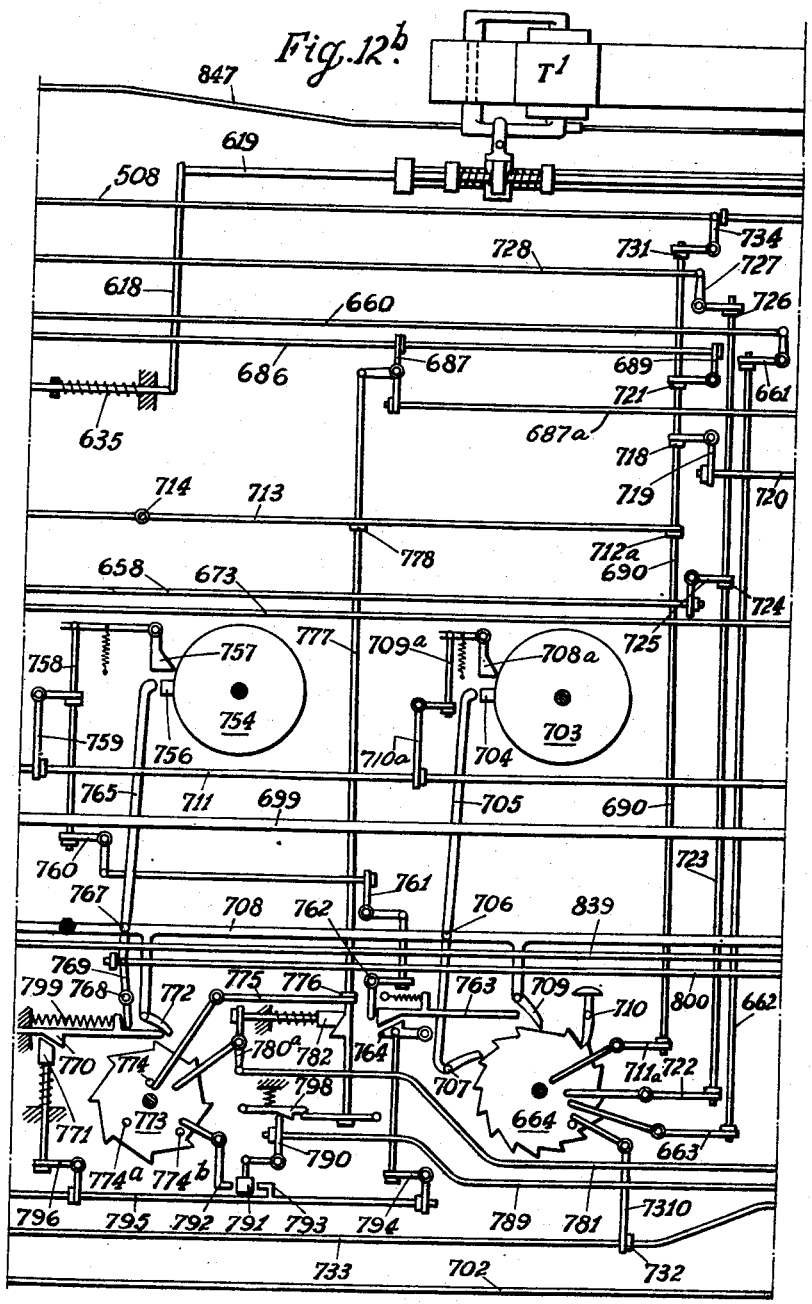

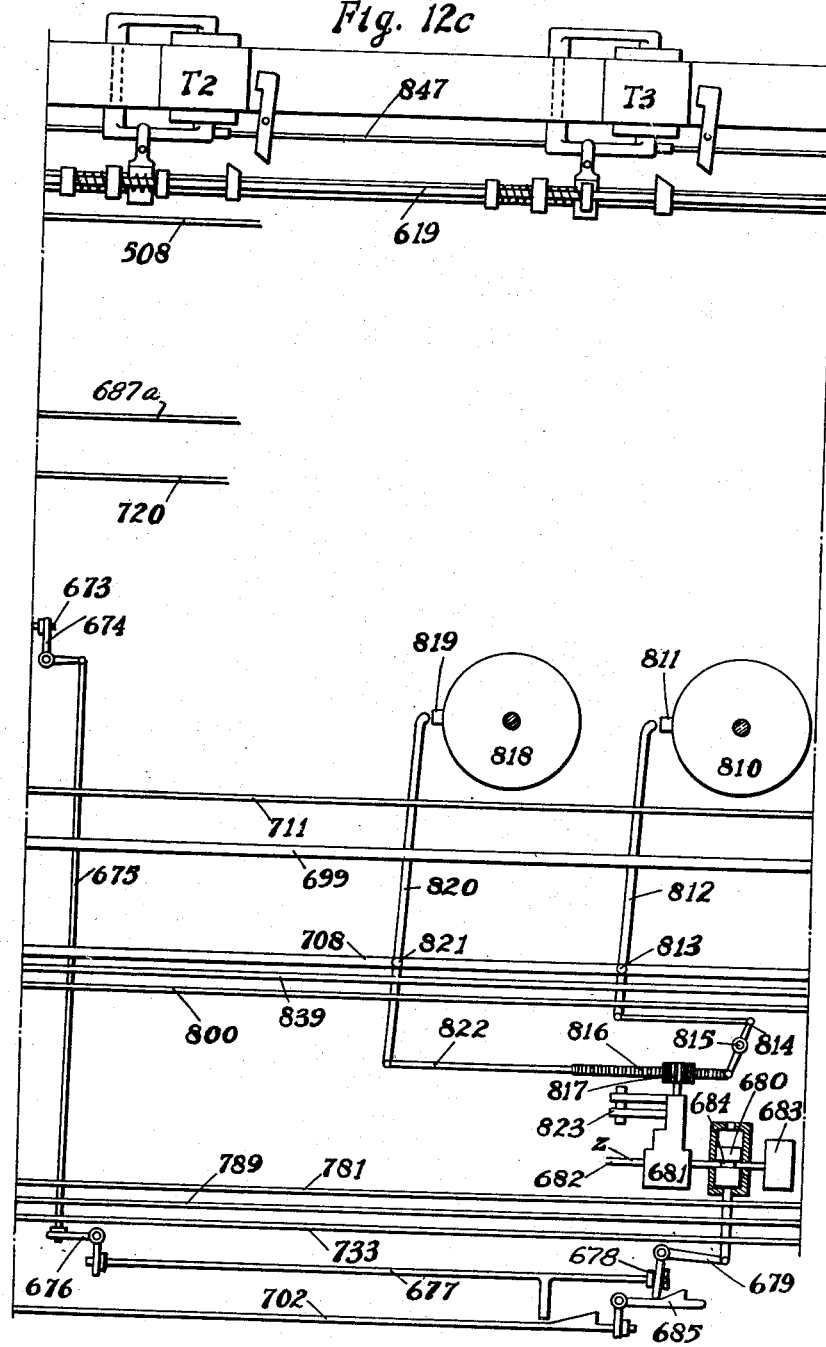

March 23, 1954

H. G. CROUCHER 2,672,973

APPARATUS FOR CONTROLLING SEQUENCES OF OPERATIONS BY TRAVELING RECORD-BEARING MEANS FOR TYPOGRAPHICAL COMPOSING, PRINTING, AND LIKE OPERATIONS

Filed June 1, 1951

INVENTOR
Henry G. Croucher
BY
Hall & Houghton
ATTORNEYS

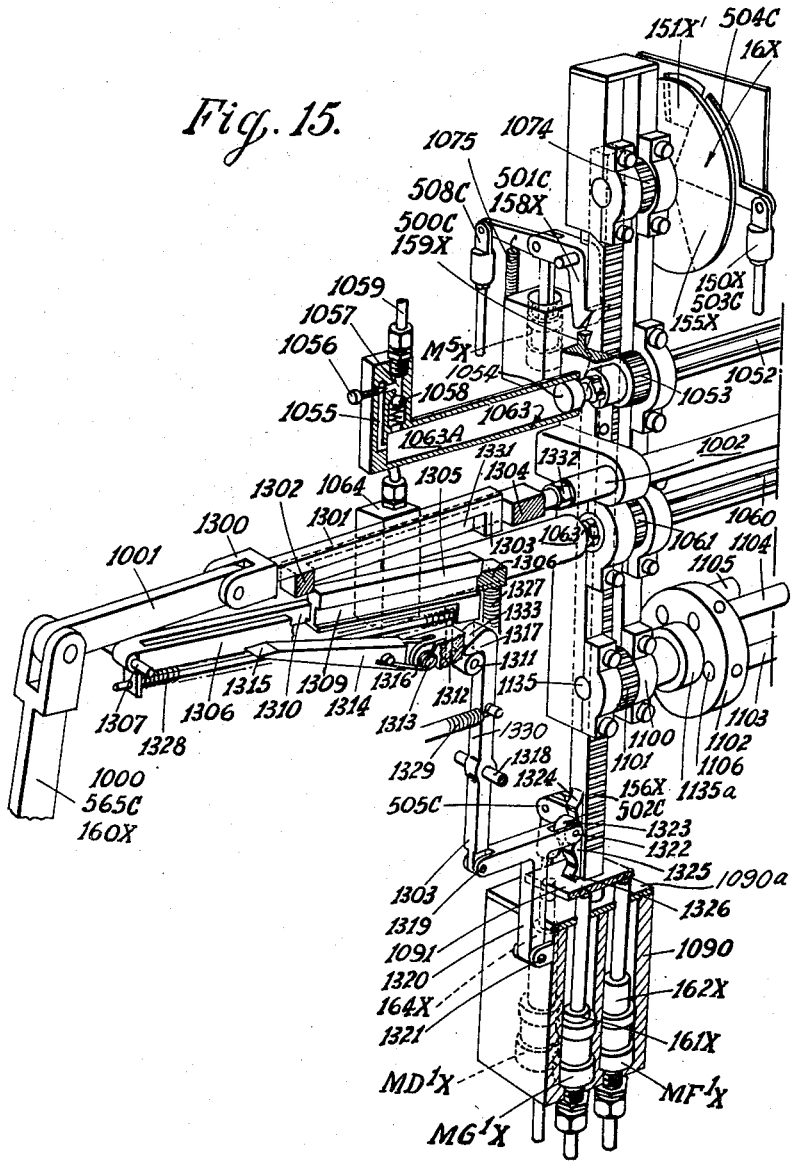

March 23, 1954
H. G. CROUCHER
2,672,973
APPARATUS FOR CONTROLLING SEQUENCES OF OPERATIONS BY TRAVELING RECORD-BEARING MEANS FOR TYPOGRAPHICAL COMPOSING, PRINTING, AND LIKE OPERATIONS
Filed June 1, 1951
20 Sheets-Sheet 20
Fig. 15.ª
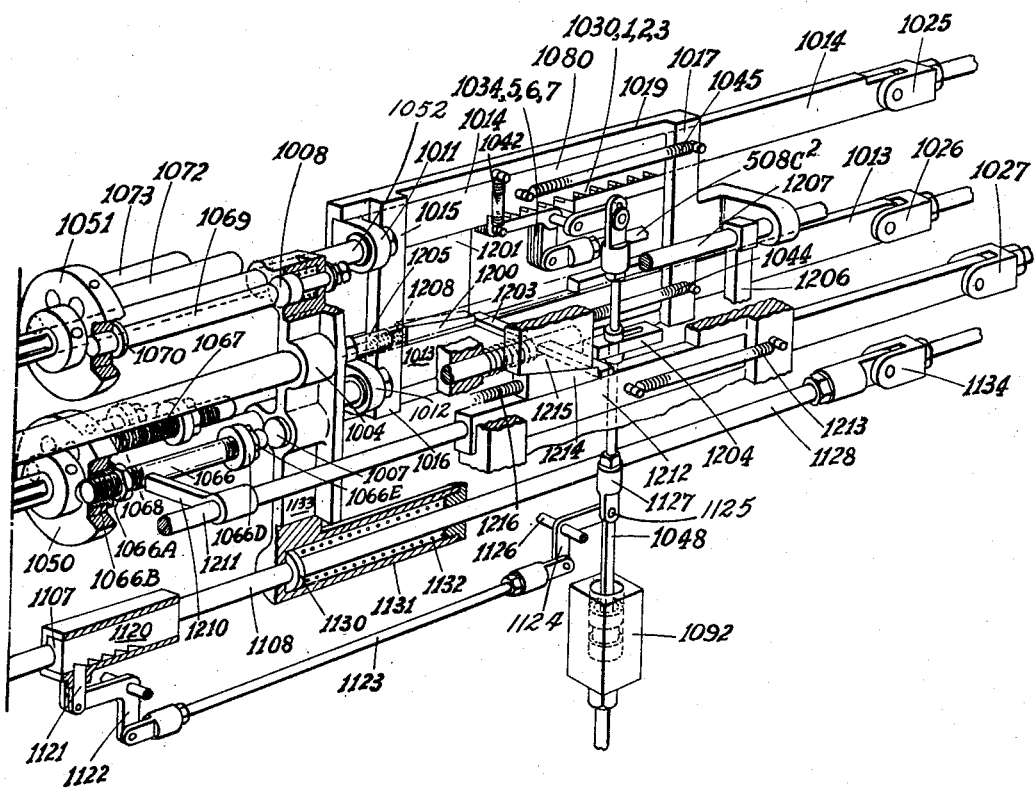
INVENTOR
Henry G. Croucher
BY
Hall & Houghton
ATTORNEYS Patented Mar. 23, 1954

2,672,973

UNITED STATES PATENT OFFICE 2,672,973

APPARATUS FOR CONTROLLING SEQUENCES OF OPERATIONS BY TRAVELING RECORD-BEARING MEANS FOR TYPOGRAPHICAL COMPOSING, PRINTING, AND LIKE OPERATIONS

Henry George Croucher, Beccles, England, assignor to William Clowes & Sons Limited, Beccles, England Application June 1, 1951, Serial No. 229,342

Claims priority, application Great Britain June 5, 1950

36 Claims. (Cl. 199—77)

This invention relates to apparatus for controlling sequences of operations for typographical composing, either by casting type or by photographic or other means, or for producing type faced impressions, contacts or characters, to form spaced lines or patterns of type, characters or symbols, by travelling record-bearing means capable of being previously formed or set and being effective through mechanical, pneumatic or electrical means. Such record-bearing means may comprise for example perforated strip controlling pneumatic devices as used heretofore in typographical composing machines but includes other forms of strip and also displaceable elements such as discs, drums or travelling devices carrying projections such as studs or otherwise formed for the purpose described.

It is an object of the invention to provide improved apparatus enabling a more comprehensive control to be exercised over sequences of operations for the purposes indicated above and in particular to enable two or more record-bearing means to be employed in such a way that they jointly determine the sequence of operations including the making-up of a page or other matter or the automatic insertion of corrections in the composed, impressed, or reproduced matter.

The invention can be applied with particular advantage to single-type composing machines of the kind described in British patent specification No. 8633 of 1899, to machines known under the registered trade-mark Monotype, and to machines for producing type faced impressions as described in the specification of British patent application No. 6848 of 1949, but is not restricted to such applications. Thus the invention could be applied to the control of operations other than those connected with composing, printing and the like.

The invention consists in apparatus for independently controlling the operations of an apparatus or machine for the purposes indicated by record-bearing means, comprising a plurality of devices for effecting predetermined operations, selecting means for determining the individual operation of said devices, and means controlled by the record-bearing means of one of the devices for operating the selecting means whereby control by one or more of the devices is interrupted and control by another device or devices is substituted therefor. The selecting means is so arranged that it can determine the operation of one only of the devices at any one time, the other devices being simultaneously rendered inoperative. Preferably the selecting means is arranged so that it can be rendered inoperative, by a suitable record or signal on the controlling record-bearing means so that none of the controlling devices can be operated. According to a further feature of the invention, all the control devices may be arranged for controlling different operational sequences, and the record-bearing means of one of the devices is provided with additional records which are adapted to control the selecting means.

The operation for the reproducing of matter as set out heretofore according to the invention may include steps to enable such matter to be corrected or made up, including line removal, exchange or alteration, or the insertion of additional matter, automatically. In a preferred form according to the invention, the formation of the type, or of the type-faced character, is effected with the aid of a plurality of matrices, dies or other character forming elements contained in a support which is given movements in the plane of the elements for positioning the selected element to enable the type forming, impression or photographic operation to be performed.

The invention may be applied with advantage to typographical composing machines such as are described in British patent specifications No. 8633 of 1899, No. 499,859, or No. 563,331, or to apparatus for producing type faced impressions or characters as described in the specification of British patent application No. 6848 of 1949, though not confined to such particular applications.

It is preferred to employ control devices comprising pneumatically actuated mechanism controlled by perforated paper strip such as are used in known composing machines of the kinds indicated above. Such strip can be produced by a keyboard mechanism such as is described in British patent specifications Nos. 17,199 of 1908, 197,996, 552,184, or the specification of co-pending British application No. 13,962 of 1950, or by other suitable means. Other types of record-bearing means may however be employed, such as strip having relief or otherwise formed surfaces, or discs, drums, or other movable elements provided with studs or other suitable means which can be previously set. Also the control may be effected otherwise than by pneumatic means, as for example electrically using photo-electric cell or like means, or by other media.

In one convenient arrangement according to the invention, a plurality of perforated strip controlling devices known as air towers are employed, each tower having the usual operating arm which when actuated causes advance of the strip and thereby effects the performance of the desired operation or operations by compressed air which is admitted through the perforations to actuate appropriate mechanism. Operation of the said arms is effected from a periodically produced motion, for example a revolving cam, through the medium of an adjustable selecting element which is movable to different positions for enabling actuation of the selected arm to be effected. The selecting element may conveniently comprise a rod slidable longitudinally in a pair of cranks which are periodically actuated to bring one or other of a series of projections on the rod into operative engagement with the operating arm of the selected air tower, according to the position of the rod. Adjustment of the rod is effected by pneumatically actuated means controlled by additional perforations, or suitable combinations of perforations, in the paper strips of either of two control towers one of which will act as master. Conveniently the selecting rod is displaced longitudinally by a pneumatically operated lever the position of which is determined by the interposition in the path of said lever of one or other of a series of stop elements which engage a shaped or cam surface on the lever. These stop elements are actuated by pneumatic means controlled by appropriate perforations in the strip of the master air tower. Thus the strip in the master tower can effect changing of the control from any one tower to any other, suitable means being provided for returning the selecting rod to master tower controlling position when required.

In applying the invention to the composing of typographical matter or to the production of characters in spaced lines or patterns in or for printing or reproducing, the several control devices, e. g. air towers, are provided with record-bearing means corresponding to the different classes of characters required, such for example as text, headings, notes and the like, and the controlling or additional records of the master control device will then cause the required control devices to be brought into operation in the required order, thereby enabling the make-up of a page for example to be effected automatically. Means is also provided for effecting cancellation of lines and substitution or insertion of lines under the control of a master record-bearing means, enabling corrections to be made in matter which has previously been recorded or set up upon the record-bearing means, and the arrangement may be such that both the making-up of a page and the correction thereof can proceed simultaneously.

Thus, in accordance with a further feature of the invention, means is provided for controlling the production of lines of characters, including line repetition, bye effecting the return to the master control device of the selecting means which determines the operation of the individual control devices. Such means conveniently comprises a step by step device which is actuated by a suitable motion in the machine, which motion occurs at the completion of each line of characters, such for example as the so-called double justification operation in a composing machine according to British patent specification No. 8,633 of 1899. The number of steps made by such device (corresponding to the number of lines required) is previously set by a suitable record or signal in the record-bearing means in the master control device or air tower.

According to a further feature of the invention, means is provided for controlling the insertion of leads, i. e. the provision of spaces of varying depth between lines of characters, the leading operations being automatically controlled from appropriate records in the master record-bearing means or preventing insertion of leads when lines are deleted. Such leading controls necessarily include means for interrupting operation of all the control devices and the restoration of operation of the master control device when leading has been completed. In an arrangement including a plurality of air towers as previously described, the tower selecting member is arranged so that it can be moved to a neutral or non-operative position by withdrawal of a spacing member which is actuated by leading initiation mechanism. Control of leading is preferably effected with the aid of the step by step device used for line control referred to in the preceding paragraph whilst control of lead deletion is effected as a single step action. The number of leads to be inserted or deleted is determined by suitable records or signals in the record-bearing means of the master control device, and the mechanism is arranged to return the control to the master device at the completion of the leading operation.

The invention also comprises means for bringing the machine to rest under the control of an appropriate record or signal in the controlling record-bearing means in combination with the actuation of an indicator and dissociation of the tower selecting means to prevent further paper feeding. Such stopping means is necessary when it is required to change the size of type or character. Thus as applied to a composing machine as described in British patent specification No. 8,633 of 1899 or apparatus according to the specification of British patent application No. 6,848 of 1949, a change in the character of the type or impression requires that the machine should be stopped to enable the die case or its equivalent to be removed and replaced by another provided with the desired characters. The invention also comprises the provision of means whereby a determined number of revolutions of the machine are made after the initial starting impulse by the operator and before the actuation or engagement of any of the control devices such as air towers.

The invention also comprises a composing machine or an apparatus for producing characters in spaced line formation as referred to in the preceding paragraph including air towers provided with travelling perforated strip for controlling the operational sequences in which means is provided for interrupting the normal step by step feed of any particular strip for one step at the commencement of the first line controlled by any air tower, this being for the purpose of enabling the justification means of the existing machine to repeat its so-called double justification motion for wedge setting purposes. Such means conveniently comprise mechanism for locking or preventing motion of the paper strip feed mechanism and an arrangement of the line control mechanism, previously referred to and actuated from the justification means, whereby the initial movement of said means is necessary to bring the control mechanism into a condition to be effectively operated by a movement following said initial movement. The required locking may conveniently be effected by locking means on the tower selecting rod which are engaged when the rod is brought into position to actuate a selected tower with complementary means on the said tower, said engaged means being arranged so that they become disengaged during operation of the tower, and said locking means being prevented from locking action for special purposes.

The invention also comprises the provision of means to enable one or more lines already recorded on the record-bearing means to be cancelled and if desired replaced by another line or lines, under the control of the master record-bearing means. As applied to a machine or apparatus of the kind previously referred to where line control is effected by the aid of so-called justification motions, it is necessary to modify the normal actions resulting from the double justification motion when a line is to be cancelled.

According to a further feature of the invention, where a plurality of so-called air towers are employed as previously described, means is provided for preventing pneumatic control being exercised by any tower except that selected by the tower selecting means. This can conveniently be effected by providing each tower with a displaceable valve plate controlling all the air passages to the tower. The valve plates are spring loaded so that they are normally held in a position to interrupt the air passages, but can be moved to open said passages when the selecting means is moved to select a particular tower, the air passages of the remaining towers being interrupted.

The invention further comprises the provision of mechanically settable record-bearing means either in place of or in addition to travelling strip means for controlling the operational sequences. Such means may comprise for example, rotatable discs provided with series of holes into which studs or like controlling projections can be inserted, the discs being rotated step by step from a suitable motion on the machine and effecting the desired operations through suitable mechanism. Thus such discs may be provided for line control, leading control, and air tower control, or any of them, and can if desired be employed in conjunction with the control of the air tower or towers previously described.

The invention still further consists in the provision of automatic control means (referred to hereafter as Panel A), in association with the main control means according to any of the preceding paragraphs, for effecting automatic control of auxiliary means comprising the sizing means described in co-pending British application No. 14,748/50 and/or the adjustable type body depth mould described in co-pending British application No. 19,325/50, or exclusively with the means for photographic reproduction of characters (as opposed to casting or impressing) described in co-pending British application No. 18,120/50, said automatic control means (Panel A) comprising means responsive to a control signal or movement from the main control means for selecting the setting movement to be effected in said auxiliary means and means operating in synchronism with the drive of the main control means for causing said setting movement to be effected.

Further features of the invention will appear from the following description, being an example of one possible mode of carrying the invention into effect.

The invention will be described as applied by way of example to a machine or apparatus having the basic motions of a typographical composing machine of the kind described in British patent specification No. 8,633 of 1899, which basic motions are also employed in apparatus for producing type faced impressions or characters as described in the specification of British application No. 6,848 of 1949. Thus the invention may be applied to the production of composed type produced by a single-type composing machine or to the production of type faced impressions or characters, or photographic images, arranged in spaced lines or patterns on any suitable receiving surface. In particular the invention will be described as applied to a machine having the basic motions of that known under the registered trade-mark "Monotype," referred to hereafter as the existing machine.

In the accompanying drawings:

Figures 1, 1a, 1b, 1c and 1d comprise a schematic layout of one form of the control apparatus according to the present invention.

Figures 2, 3 and 4 are respectively a front elevation, plan and end elevation of a casting machine embodying the control apparatus of Figure 1.

Figure 5 is a fragmentary sectional view taken on the line 5—5 of Figure 2, showing a paper tower and mechanism for actuating the same together with the air manifold block by which control airs are conveyed from the towers.

Figure 6 is a fragmentary plan view of part of one of the paper towers (tower 2) together with means for selectively achieving and preventing paper locking thereon.

Figure 7 is an enlarged front elevation (partly broken away) of the paper towers and counter mechanisms mounted on the air manifold block.

Figure 8 is a sectional front elevation of the counter mechanisms.

Figure 9 is a plan view of the counter mechanisms.

Figure 10 is a sectional plan view of one of the counters taken on the line 10—10 of Figure 8.

Figure 11 is a perspective view of a pair of spring boxes used in conjunction with the counter mechanisms.

Figures 12a, 12b, 12c and 12d comprise a schematic layout of an alternative form of the control apparatus according to the present invention.

Figure 12:
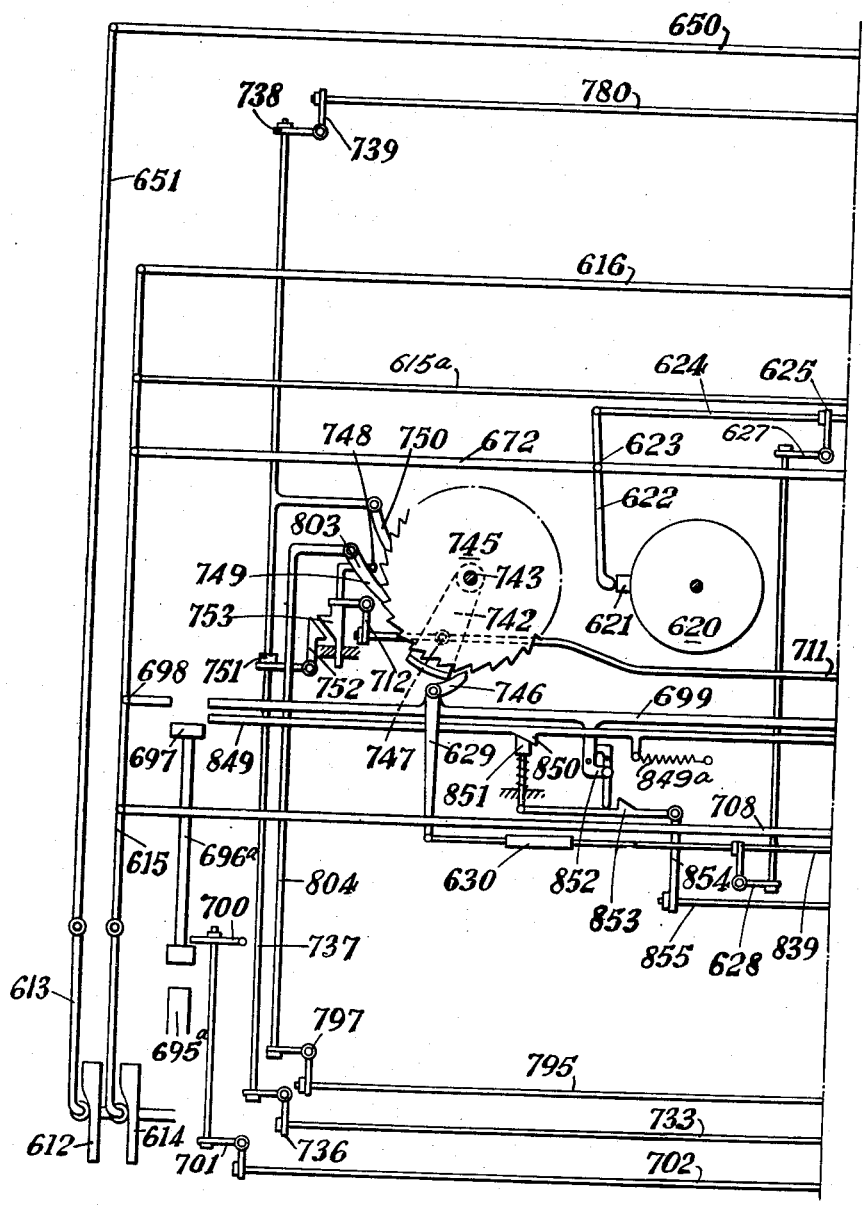
Figure 12D:
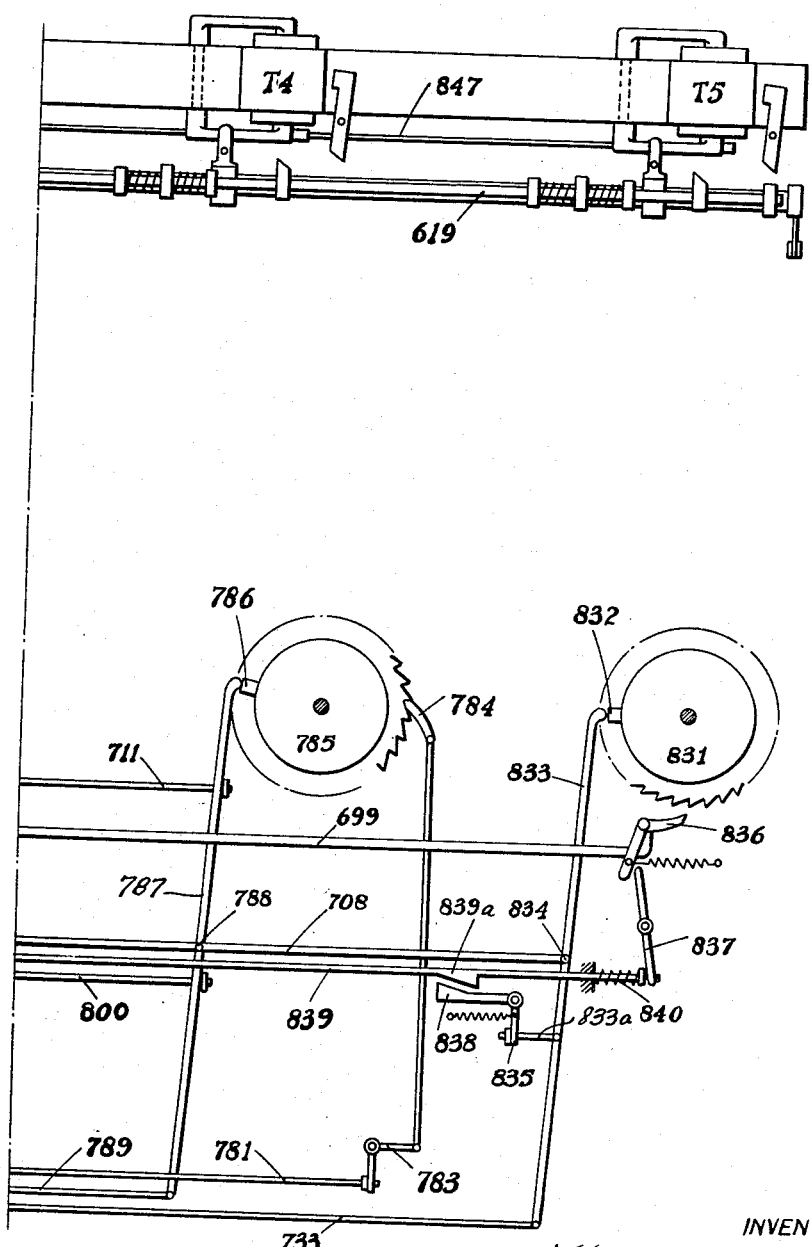
Figure 13:
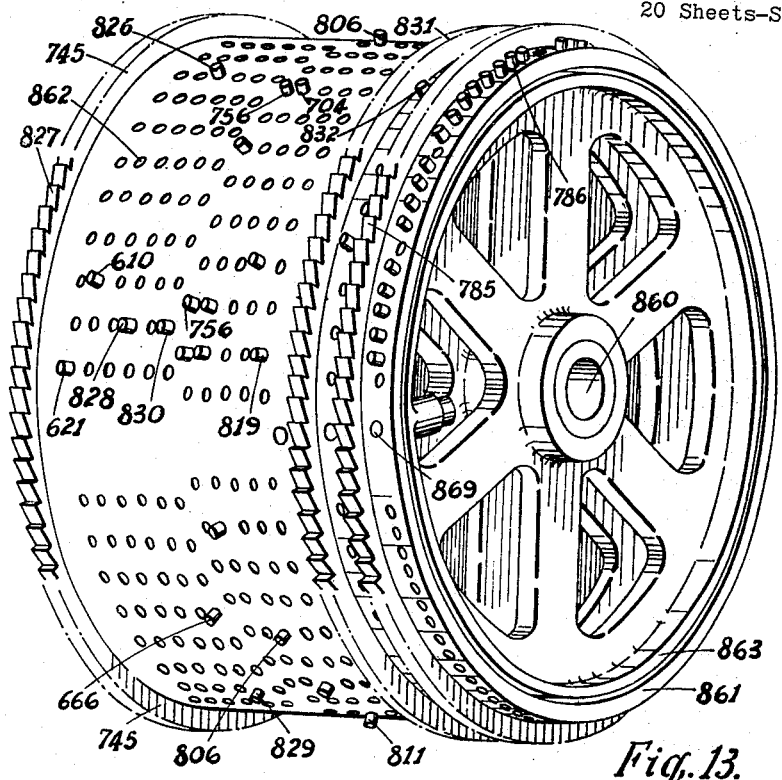

Figure 13 is a perspective view of the control drum used in the mechanical embodiment of the control apparatus shown in Figure 12.

Figure 1:
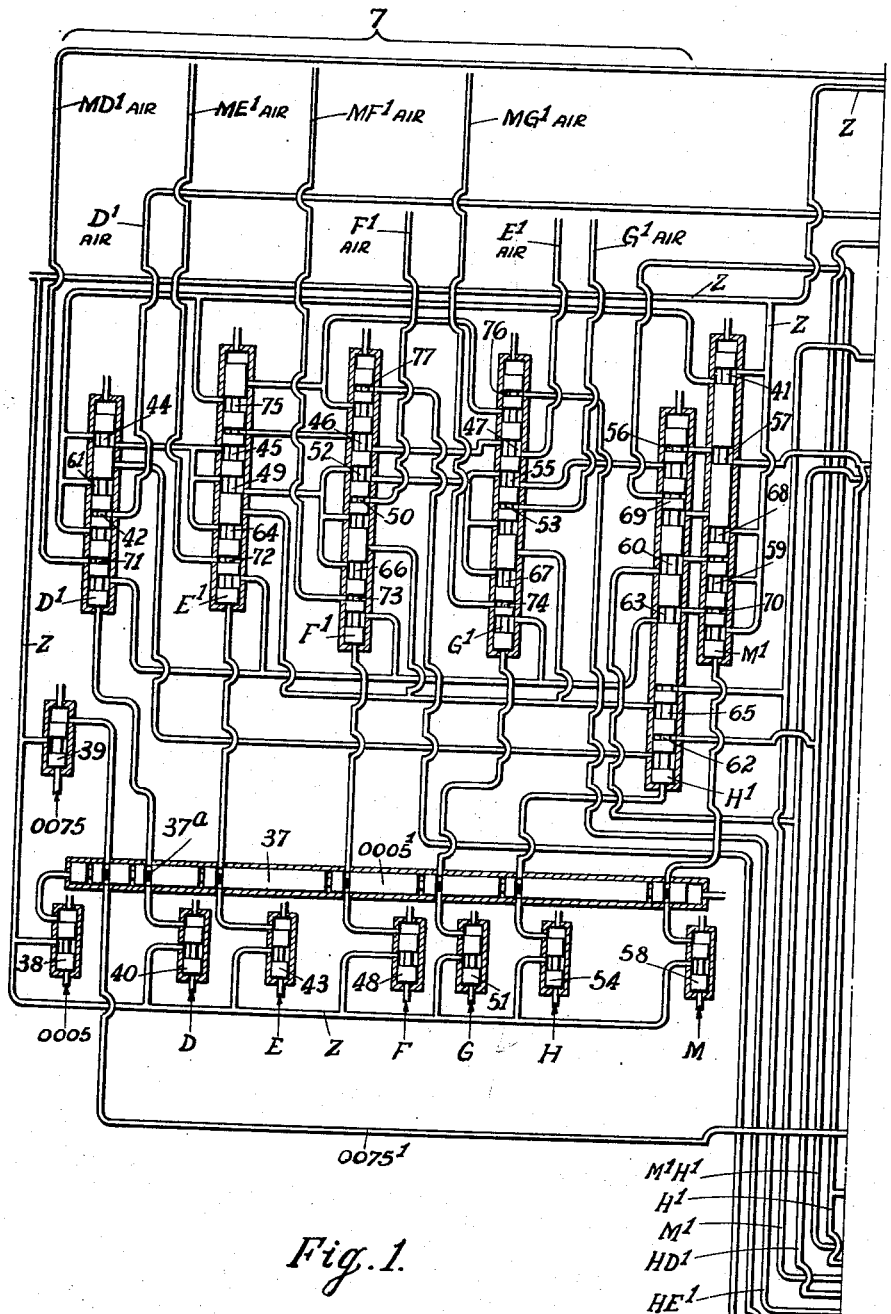
Figure 14:
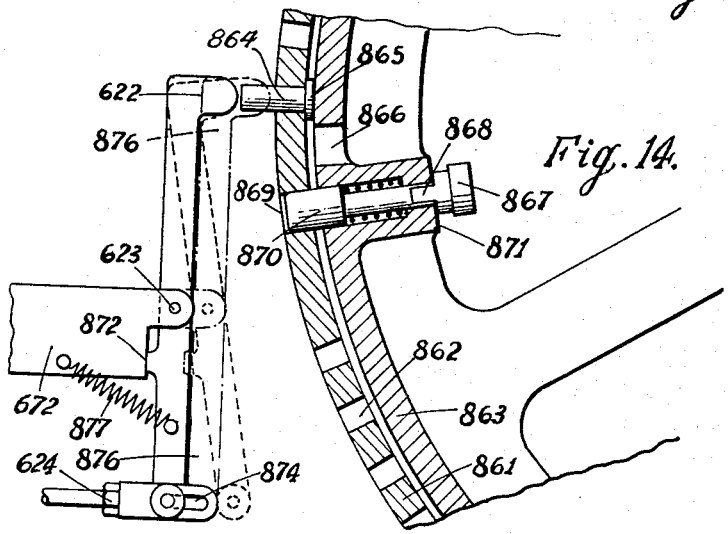

Figure 14 is a fragmentary sectional side elevation of part of the periphery of the control drum shown in Figure 13 together with part of the mechanism actuated thereby, and Figures 15 and 15a comprise a perspective view of apparatus (referred to as Panel A) which can be incorporated in control apparatus mechanically embodying the form of the invention shown schematically in either Figure 1 or Figure 12.

In carrying the invention into effect according to a convenient mode, a plurality of control devices known as air towers or paper towers are provided, each device being provided in known manner with a perforated paper strip which is advanced step by step through a pneumatic arrangement over a cross bar in which are holes from which pipes lead to pins in so-called pin blocks associated with the caster, compressed air being admitted to such pipes as are uncovered by the perforations to actuate the corresponding pins. The latter arrangement forms part of the existing machine and the pins determine the motions of a die case, die plate, or its equivalent, whereby selection of the desired character to be cast, impressed, or projected is effected. The existing machine also includes motions whereby the control of the justification of lines of characters is effected. The number of air towers is determined by the number of different sequences of operations, including changes of type which it is desired to perform. Additionally, one tower may carry a strip bearing perforations corresponding to desired corrections either by way of insertions of deletions. In the present example five towers are provided which will be referred to for convenience as 1, 2, 3, 4 and 5. Tower 1 is known as the correction tower as described subsequently. Tower 2 may control text matter. Tower 3 may control notes, tower 4 may control chapter heads, and tower 5 may control page headlines, the arrangement being suitable for the production of a book such as a novel for example.

The general arrangement, which will be described in detail hereafter, includes the five towers 1–5 mounted on a manifold block 6 to which is attached a valve box or chest 7, controlling mechanism for line or lead counting, for insertion or deletion, consisting of two counters R1 operated in conjunction with tower 1 and R2 with tower 2. Each of these counters have two associated spring boxes DJ1 and L1 for counter R1, and DJ2 and L2 for counter R2. Further controlling means are leading control wheel 8, stop control wheel 9, and leading cut out wheel 10. These controlling mechanisms control a positioning rack 11 to which is attached a tower engagement rod 12, the rack 11 being selectively displaced by a lever driven by cam 13 mounted on the main drive shaft 14 of the existing machine, a part of which is shown at 15. A visual tower indicator 16 is operated by cam 17, also on shaft 14, when the attachment is used with existing moulds, die cases and normal wedges of known type casters. To prevent unwanted casting of type a pump cut-out means is provided.

The perforations required in the record strips for control of this invention can be obtained from a known keyboard, when make-up and correction is done by single measure strips. When it is done by "multi-measure" strips (of which two only are required one strip having composed lines of various type set widths whilst the other strip carries corrections and any new matter for insertion), there is no change in the above attachment but a keyboard modified according to the disclosure of co-pending British patent application No. 13,962/50 is the more convenient for providing the required multi-measure strips.

The towers 1—5 are, as stated, positioned on a manifold 6 which consists of a block 27 (see Figure 5) having five sets of holes 22 drilled vertically to correspond with the existing holes in the base of the five paper towers. The holes 22 meet lateral holes 23 drilled across the block 27 which in turn match holes 24 in side plates 25, 26 secured to the block 27. Slidably attached to each plate 25 and 26 are valve plates 28 (making 10 valve plates in all, a pair for each tower) which have grooves 29 which convey the air back to a second set of holes 30 in the plate 25 and so into grooves 31 in the faces of the manifold block 27, the grooves being connected to the existing machine to operate in the normal manner. Each valve plate 28 is urged towards its closed (down) position as shown in Figure 5 by a spring 28a, the arrangement being such that only the valve plates 28 associated with the tower in use are in the up or operative position.

A further two sets of holes 32 are drilled vertically in the block 27 to correspond with holes 32a (see Figure 8) in the base of the counters R1 and R2. The holes 32 meet lateral holes 33 which convey the air straight from the appropriate grooves 31 in the faces of the block 27.

It will be seen that there is a groove 31 to correspond with each of the thirty-one holes provided in known manner in each paper tower; these holes are by custom designated:

Reading from left to right:

N M L K J I H G F S E D 0075 C B A
  1 2 3 4 5 6 7 8 9 10 11 12 13 14 0005

There are further appropriate known grooves 34 in the faces of block 27 which connect to the special purpose attachments for quadding, repeating and centering in known manner.

Reference hereafter to air supply (such as G air or MH air) will refer to the airways associated with the holes or combinations of holes as identified above. All the airways are taken to the caster, via the grooves 31 through flexible pipes 35 which are connected to a distributing head 36 attached to the caster in place of its normal paper tower. A main air duct 220 passes through the manifold block 27 and air is taken from this duct via pipes 505 to inlet air valves 500 and 503 of towers to feed the air bar 501. In the existing machine only one air pipe 505 and one valve 500 is provided, in view however of the amount of air required to operate the present machine, an additional valve 503 is provided with a second air pipe 506. The valves 500 and 503 are actuated by rockable levers 502 and 504 respectively operated in known manner by a rod 507 driven from the usual operating arm 86.

Each tower has an operating arm 86 (see Figure 5) which when actuated effects the paper strip feed through rod 508 and the initiation of the pneumatic operations through valves 500 and 503 described above, the paper strip being prepared by a suitable keyboard mechanism. The strips are fed through the towers in normal manner, whether they are the known standard single measure strips, or the "multi-measure" strips as described in co-pending British patent application No. 13,962/50.

The drive of each tower is taken from a shaft 20 which is in turn operated from a cam lever 21 (see Figures 2 and 4) on the caster so keeping the five towers in correct time with that required by the caster. The manner in which drive is transmitted to the paper feed and pneumatic mechanism on any selected tower is described hereafter.

Air passing through the perforations exposed is led by the usual pipe system into the manifold 6, from which it goes to valve chest 7 and counters R1 and R2 for control of the device as will be described. The air is also led from the manifold 6 to the known casting machine for die case positioning, wedge setting and other operations generally performed by such air. The manner of utilization of the controlling airs will now be described in greater detail:

The chest 7 contains a number of piston valves designated D E F G H M 0075 0005 according to the air supply which operates them. When these pistons are raised, air called "main air" coming direct from supply source via air lines Z passes round the channel of the pistons and to the appropriate operating piston valve designated respectively D′ E′ F′ G′ H′ M′ 0005′ and valve 0075′ located outside the valve chest 7.

Considering each air separately, the function of which will be only generally indicated and which will be described in detail hereafter:

*0005.*—0005 air raises the 0005 piston 38 so allowing main air to move a control piston 37 (to the right as viewed in Figure 1) to its open position. It will be observed that piston 37 will not allow any air from the other air supplies to reach any further piston valve unless the 0005 air is in combination with any other such air supply since the piston 37 in its shut position (as shown in Figure 1) causes airs from any of pistons D, E, F, G, H or M to be vented to atmosphere via vents 37*a*. So in all the following descriptions it is to be assumed that a 0005 air has caused piston 37 to be moved to its open position, and keeps it there to provide combination air supplies.

Assuming 0005 air has opened piston valve 37, then:

*0075—for initiating line counting.*—0075 air raises piston 39 so allowing main air to flow past the 0075 piston to piston 0075′ located outside the valve box 7.

*D—used for engaging tower 2.*—D air raises piston 40 so allowing main air to raise the D′ piston valve. Main air can now pass through port 42 in this valve after passing through the open ports 41 in the M′ piston valve direct to the D′ piston valve and so to piston D².

*E—used for engaging tower 3.*—E air raises piston 43 so allowing main air to raise the E′ piston valve. Main air passing through port 41 in piston M′ then passes through the open port 44 in the D′ piston into the port 45 in the E′ piston, so through port 46 in the F′ piston, through port 47 in the G′ piston and so to the E² piston.

*F—used for engaging tower 4.*—F air raises piston 48 so allowing main air to raise the F′ piston. Main air passing through the open port 41 in piston M′ passes through the open port 44 in piston D′ so through open port 49 in piston E′ through port 50 in piston F′ so into piston F².

*G—used for engaging tower 5.*—G air raises piston 51 so allowing main air to raise the piston valve G′. Main air passing through the open port 41 in piston M′ goes through open port 44 in piston D′ through open port 49 in piston E′ through the open port 52 in piston F′ through the port 53 in piston G′ and so to piston G².

*H—for leading operations.*—H air raises piston 54 so allowing main air to raise piston valve H′. Main air flowing through the open port 41 in the piston M′ flows through open port 44 in piston D′, flows through open port 49 in piston E′, flows through open port 52 in piston F′, flows through open port 55 in piston G′, passes through port 56 in piston H′ then through the open port 57 in piston M′ and so to pistons H² H³ H⁴ H⁵ H⁶ H⁷ H⁸.

*M—for stopping the machine for die case changing.*—M air raises piston 58 so allowing main air to raise the piston valve M′. When the M′ piston is raised it shuts the normally open ports 41 and 57. Main air passes through port 59 in piston M′ and through the open port 60 in piston H′ and so to pistons M² M³ M⁴ M⁵.

The following are additional combination air supplies. Each individual air supply raises its own pistons as already described.

*HD—for engaging tower 2 and stopping casting and absolutely preventing leading from tower 2.*—D air into piston D′ as previously described. When the D′ piston is raised the normally open port 44 is closed. Main air flows through port 61 in piston D′ and through port 62 in piston H′ and so becomes HD air to the pistons HD′ HD². When piston H′ is raised, the normally open ports 60 and 63 are closed.

*HE—for engaging tower 3 and stopping casting and absolutely preventing leading from tower 3.*—E air into piston E′ as previously described. When the E′ piston is raised the normally open ports 49 are closed. Ports 60 and 63 are closed in the H′ piston. Main air flows through port 64 in piston E′ and through port 65 in piston H′ and becomes HE air to operate pistons HE′ HE² HE³.

*HF—for engaging tower 4 and stopping casting and absolutely preventing leading from tower 4.*—F air into piston F′ as previously described. When F′ and H′ pistons are raised the normally open ports 52—46—60—63 are closed. Main air flows through port 66 in piston F′ and port 65 in piston H′ becoming in effect HE air and so to pistons HE′ HE² HE³; since, in combination with H′ air, E′, F′ and G′ airs share the same pipes after leaving their respective valves in valve box 7.

*HG—for engaging tower 5 and stopping casting and absolutely preventing leading from tower 5.*—G air into piston G′ as previously described. When G′ and H′ pistons are raised, the normally open ports 47—55—60—63 are closed. Main air flows through port 67 in piston G′ and port 65 in piston H′ becoming a further supply of HE air and so to pistons HE′ HE² HE³, since, in combination with H′ air, E′ F′ and G′ airs are in effect the same after leaving valve box 7 as mentioned above.

*MH—for deleting leads.*—When the pistons M′ and H′ are raised the normally open ports 41—57—60—63 are closed. Main air flows through port 68 in piston M′ and through port 69 in piston H′ so producing MH air supply and so to piston MH (cylinder 129 on counter R2).

*MD—for setting indicator 16 to tower 2 or for Panel A setting control as will be later described.*—M′ air goes to pistons M² M³ M⁴ and M⁵ as previously described. When pistons M′ and D′ are raised, the normally open ports 41—44—57 are closed. Main air flows through port 70 in piston M′ through port 71 in piston D′ emerging as MD air supply and so into piston MD′.

*ME—for setting indicator 16 to tower 3 or for Panel A settings control.*—M′ air goes to pistons M² M³ M⁴ M⁵. When piston M′ and E′ are raised the normally open ports 41—49—57 are closed. Main air flows through port 70 in piston M′ through port 72 in piston E′ becoming ME air and so to piston ME′.

*MF—for setting indicator 16 to tower 4 and for Panel A settings control.*—M′ air goes to pistons M² M³ M⁴ M⁵. When pistons M′ and F′ are raised the normally open ports 41—46—57 are closed. Main air flows through port 70 in piston M′ through port 73 in piston F′ and out as MF air to piston MF′.

*MG—for setting indicator 16 to tower 4 and for Panel A settings control.*—M′ air goes to pistons M² M³ M⁴ M⁵. When pistons M′ and G′ are raised the normally open ports 41—47—55—57 are closed. Main air flows through port 70 in piston M′ through port 74 in piston G′ and emerges as MG air to piston MG′.

*GE—for setting the leading valve switches to "S" (signal or solid matter).*—When pistons G′ and E′ are raised the normally open ports 47—49—55 are closed. Main air flows through port 41 in piston M' through port 75 in piston E' through port 76 in piston G' becomes GE air and so to piston GE'.

*FE—for setting the leading valve switch to "R" (repeat leads).*—When pistons F' and E' are raised the normally open ports 45—49—46—52 are closed. Main air flows through port 41 in piston M'—through port 75 in piston E' through port 77 in piston F' out as FE air to piston FE'.

The various air circuits associated with valve box 7 as described above are led into a series of ducts 216 formed between two plates 218 which extend along the underside of the manifold 6 and which are tapped at suitable places by pipes 219 to take the air to the appropriate operating pistons, e. g. MH, D², E², H³, H⁴, and the like (located outside the valve chest 7) which have been mentioned above, but which will be described more fully hereafter with respect to their functions.

The tower engagement rod 12 is arranged to slide longitudinally along the length of the series of towers 1 to 5 and is slidably carried by a pair of crank arms 80 which are actuated by cam 13 from the main drive 14 of the machine. The previously mentioned cam operated lever 21 on the caster which is the normal paper feed lever when the caster is to be used normally, is connected to a lever 82 fixed to a drive shaft 20 on which are fixed five striker levers 84. Freely mounted on shaft 20 are five intermediate levers 85 which are connected to the normal paper feed arm 86 on each paper tower. Between these two levers 84—85 is the tower engagement rod 12 on which are mounted five engaging blocks 87, which are spring held in position along the rod 12 being so placed that only one block can be engaged at any one time according to the position of the positioning rack 11 for selecting a tower for operation. The lever 84 oscillates once every revolution and when a block 87 is in position between a pair of levers 84 and 85, the latter lever will be depressed so operating feed arm 86 for the selected tower. Each lever 85 has a second arm 88 which is connected to an arm 89 which moves the associated pair of valve plates 28 to their open position, where they are latched by a bolt 90 passing below the arm 89 (Figure 6). Each bolt 90 is given an unlatching movement on any movement of the tower engagement rod 12 through a trip link 170a actuated by lever 170 which is displaced by a cam 166 on the positioning rack 11. The cam 166 and lever 170 also operate means to render the counters R1 and R2 inoperative as described hereafter.

Each engaging block 87 is slidable along the rod 12 in either direction against a spring 87a. The rod 12 is moved at 300°–360° of shaft 14 rotation and the blocks 87 can slip into their respective positions, or be spring-thrust from them as the case may be, at approximately 50°–65° when the driving rocking lever 80 is changing its direction of travel. By such means the necessity for having approximately 2" travel between tower 1 and tower 5, if the blocks 87 were fixedly secured to the rod, is obviated. Further, if a block 87 were engaged on tower 5 on one cycle and another block 87 was wanted for engagement at tower 1 on the next cycle, it would mean that the rod 12 would have to travel the 2" necessary for such engagement in the few degrees of drive when block 87 was free to slip out and the other block 87 free to engage, i. e. at the most not more than 10° with a machine speed of 180 revolutions per minute, which means 2" in approximately 1/100 of a second.

The action is therefore that rod 12 is driven to the right (Figure 1) at 300°–360°, causing the springs 87a to be compressed against the blocks 87, one of which is already under drive, and the blocks the slide along the driving faces 85a (see Figure 6) of the levers 85 keyed to the shaft 20. When the drive shaft 14 has rotated to the dwell in the stroke of the lever 80, the block 87 previously engaged is spring-thrust out and resumes its normal position central between the springs 87a and the block in alignment with the tower to be engaged is spring-thrust into its engaging position.

The rod 12 can also be moved from tower 1 to 1 neutral position or from tower 2 to 2 neutral position, which movement is determined by stop or lead means described hereafter, in which positions operation of the levers 84 have no effect on the towers so that pneumatic operations cease. The teeth of the positioning rack 11 which are engageable by the pawl 81 correspond to the above positions and also hold the rod at any of the tower actuating positions 2, 3, 4 or 5 to which it may be moved. The teeth of the rack 11 shown in Figure 1 correspond, reading from right to left, with the following positions:

Tower 1, neutral
Tower 1, actuated
Tower 2, neutral
Tower 2, actuated
Tower 3, actuated
Tower 4, actuated
Tower 5, actuated The tower engagement rod 12 must return from a tower position to a neutral position whenever the leading control wheel 8 or the stop control wheel 9 are operating in order to prevent the paper strip fading through any tower during its operation. To this end the positioning rack 11 of the rod 12 has a projection 191. When the positioning rack pawl 81 is removed by movement of lever 192 resulting from H' air or M' air entering cylinders H⁴ or M⁴, the positioning rack 11 is free to move under action of spring 193 until the projection 191 meets stop 195 or 197. Stop 195 will stop positioning rack at tower 2 neutral position, 197 will stop positioning rack at tower 1 neutral position.

When the rack pawl 81 is taken out because of an "abnormal movement" (this action being decribed in detail later as it constitutes a feature of this mechanism) resulting from the spring boxes DJ1 and DJ2, the positioning rack 11 is free to move under action of spring 193 until projection 191 meets stop 194 or 196. Stop 194 will position the rack at tower 2 position, whilst stop 196 locates it at the tower 1 position.

The forward movement of rod 12 as distinct from the return movement just described is caused by signal perforations acting as directives in contradistinction to the mechanical resulting movements acting as controls for the rod 12 returning travels.

A signal such as D will cause the positioning rack 11 and rod 12 to go to the tower 2 position, that is to allow that tower to become effective, D being for tower 2, E for tower 3, F for tower 4 and G for tower 5. If the signal were D9 for example then the tower 2 position is obtained by the signal D; also the signal 9 will cause the number nine pin to be blown up in both counters as hereafter described (this applies for any number that is signalled). Piston D² will raise its own selector lever 78 (there being one for each of tower positions 2, 3, 4 or 5) so bringing the D gauge block 79 between the drive lever 80 and the end of the positioning rack 11. The drive lever 80 thrusts forward at 300°–360° of each revolution of the machine drive shaft 14. The positioning rack 11 will now be placed in the tower 2 position and held there by the pawl 81 engaging the tooth corresponding to that position, i. e. the fourth tooth face from the right. Thus the rod 12 will be placed in the tower 2 position so transferring the paper feed drive to that tower by means of the establishment by the associated block 87 of a drive from lever 84 to lever 85 (see Figure 6). The above applies to any tower position. When pawl 81 is removed as described above, it is held out by a latch 198 to permit uninterrupted return of tower engagement rod 12 by spring 193, the latch 198 being itself released by next return stroke of lever 80 through a rod 198a. Thus the travel of the tower engagement rod 12 is determined by mechanism which can be set under the control of appropriate perforations in the paper strips of normally towers 1 or 2, but record strip on tower 3 could contain signals causing the rod 12 to travel from tower 3 to towers 4 or 5. In other words an appropriate combination of perforations at towers 1 or 2 can bring into operation any one of the five air towers while simultaneously preventing operation of the other four towers.

As shown in Figure 1 the positioning rack 11 is at tower 1 position as is also the tower engagement rod 12 to which it is attached. When any of the following combinations occur in the paper strip, the towers 2, 3, 4 and 5 are respectively engaged by means of their respective gauge blocks 79 as instanced above with D air:

Tower 2=0005 with D
    Tower 3=0005 with E
    Tower 4=0005 with F
    Tower 5=0005 with G The airs from these perforations combine in valve chest 7 to produce air supplies for pistons $D^2$ $E^2$ $F^2$ and $G^2$, which as previously mentioned determine which of the selector levers 78 and gauge blocks 79 is to be put into operation. The periodic operation of the crank 80 carrying the tower engagement rod 12 can then cause the operational sequence of type casting or the production of a line of characters of any kind in accordance with the perforations in the paper strip of the selected tower. The operations incidental to line justification are also performed by the known mechanism, as described in the British Patent Specifications referred to previously.

Control of the lines of characters, including lead and line repetition, is effected automatically from appropriate perforations on towers 1 or 2. A separate line control and counter repeater mechanism is provided for towers 1 and 2 for this purpose and includes the step-by-step counters R1 and R2 actuated from the justification rod of the existing machine or from some equivalent motion related to the completion of a line of characters.

The counters are the memories of the machine. A signals imparts information to them and a step-by-step motion, which may be continuous or discontinuous, is applied to them to cause an assessing or adding up, until finally one or both counters react to cause a complete change of action in the control and sequence of the machine. The counters can be used for line counting to be cast, lines to be deleted, leads to be inserted or leads to be deleted. Counter R1 is operatively associated with tower 1 and counter R2 with tower 2, whilst counter R1 takes priority of action when both counters synchronise and has a controlling effect on the action of counter R2, so that counter R1 can be regarded as the master brain.

The perforations 0075 and 0005 produced by the justification keys on the operators' keyboard are normally employed to cause in the caster the wedge setting, pump cut out and line removal; when used together they result in a movement known as a double justification (abbreviated to DJ) signal. Single justification (SJ) perforations, while used for initiating wedge setting operations in known manner, are not used for control purposes according to the present invention. The two air supplies 0005 and 0075 are used to initiate actuation of the counting means R1 or R2 instead of being directly connected to pump or justification rod as heretofore. Thus 0075 air entering the 0075' cylinder inserts a block 178 between the drive from lever 80 and the DJ frame 179 to which are attached the spring boxes DJ1 and DJ2. The block 178 is prevented from insertion unless a latch 180 has been removed by the latching of the counters R1 and R2 as described hereafter and held in this position by a latch 181.

Each counter R1 or R2 (see Figures 8, 9 and 10) comprises a spring loaded ratchet wheel 122 actuated by a pawl 124, the number of steps made by the wheel being determined by variable stops constituted by spring-loaded air-operated piston pins 116 which are selectively raised in accordance with appropriate perforations in the controlling paper strip, these perforations being previously made by the operator in combination with the air of the lower row of justification keys on his keyboard. The air pipes 32 and 32a for actuating these piston pins 116 are connected to the block 27 of manifold 6 (see Figures 7 and 8).

Each counter R1 and R2 has a base 115 carrying the pins 116, of which there are fourteen capable of being lifted by air from the respectively associated tower, and a single fixed pin 117 called the "15" pin (corresponding to the "15" pin on the front pin block of the caster). The fourteen pins 116 are supplied by airways, corresponding to holes 1 to 14, from the towers via the manifold 6. The pins are arranged in two staggered concentric circles (see Figure 10), running from the fixed "15" pin 117 in order 14, 13, 12 and so on in an anticlockwise direction. After a pin 116 has been blown up, e. g. pin "12" by "12" air, it is latched in that position by a latch plate 118, adapted on being given a slight rotation to engage under an annular shoulder 116a on the raised pin (see Figure 8). The latching movement of plate 118 is caused by two methods depending upon whether lines or leads are to be counted. If the counting relates to lines, a mechanical linkage to tower 2 selector lever 78 causes locking movement of plate 118 on R1. If the counters are used for leads, the lead air— H'—causes a movement of R1 latch plate by piston H3, also a similar movement of R2 latch plate by H5 piston.

*Latching of pin in counters*

After a pin is blown up it is latched by the latch plate 118 being rotated by:
 (a) Air entering H3 piston to latch counter R1.
 (b) Air entering piston H5 to latch counter R2.

(c) Movement of D selector lever 78 by D2 piston to latch counter R1.

(d) Movement of either E, F, G, selector levers 78 by E2, F2 or G2 piston respectively to latch counter R2.

The latch plate 118 can be moved to latch any piston pin 116 in its raised position. The latch plate 118 is actuated also when leads are to be inserted between lines, the mechanism for which will be described later. It will suffice to say that lead insertion is controlled by one of the piston pins 116 being raised by air through an appropriate combination of perforations, and the arrangement is such that when such a pin is raised, air is also allowed to pass to the piston H3 or H5 for actuating the latch plate 118 of either counter R1 or R2 respectively. Release of the latch plate 118 in the case of lead counting is effected by abnormal movements of spring box L1 or L2, displacing the latch 199 or 204. The linkage 101a by which said abnormal movements are transmitted to latch 199 or 204 also includes a link arm 101b connected to one end of the pivoted stop pawl 131, arranged so that return movement of the link 101a which releases the latch plate 118 also removes the stop pawl 131 from engagement with the ratchet wheel 122 and allows the latter to return to zero position by its spring 121, zero position being with a depending projection 120 on a rotating counter plate 119 just clear of the "1" pin 116, so that should the "1" pin be blown up for action (e. g. to insert or delete a single line or lead), no movement of the plate 119 can take place and the DJ signal at the end of the single line would cause an abnormal movement as required.

The latch plate 118, after latching a blown-up pin 116, prevents any further pins 116 from being blown up by partially closing the pin apertures in the base 115. The rotating counter plate 119 on which is the depending projection 120 is mounted above the latch plate 118. The counter plate 119 is rotated against the spring 121 by the ratchet wheel 122 one step at a time at each line end by DJ frame drive pawls 124; or after insertion of each lead by leading drive pawl 126, until the projection 120 strikes a raised pin 116 or the fixed pin 117 when further rotation will be prevented. This results in an "abnormal movement" being caused in the appropriate L1 or L2 spring boxes, or the DJ1 or DJ2 or in certain circumstances both spring boxes. What constitutes an "abnormal movement" is described hereafter. As an example, if a signal directive on tower 3 is to cast four lines, the "4" pin 116 is blown up and latched and the tower engagement rod 12 moved to tower 3, each line cast causes one tooth movement of the wheel 122 and therefore plate 119 towards the blown up pin. The first DJ signal met on the spool of tower 3 (i. e. at the beginning of the first line to be cast) does not effect the counter as described hereafter, the next three DJ signals corresponding to three lines cast move the plate 119 and projection 120 thereon to within one tooth movement of the blown up pin 116, so that when the 4th line is cast, the projection 120 engages the blown up pin and causes an "abnormal movement" to alter the control, the four lines having been duly cast. Disposed about the ratchet wheel 122 of each counter R1 or R2 are a DJ feed lever 123 on which is mounted the feed pawl 124, a lead feed lever 125 having the feed pawl 126, a plate 127 having a projection which when rotated will remove the pawl 124 from the ratchet and a second plate 128 which will remove the pawl 126.

Counter R2 has in addition a cylinder 129 into which MH air enters to drive an associated rack 130 meshing with a pinion 130a in order to rotate the counter plate 119 until it strikes any pin 116 lifted, by which means the counter R2 is taken by a single revolution up to the desired raised pin corresponding to the key number for deletion of leads rather than requiring the usual eight revolutions of the drive for each lead insertion. A retaining or locking pawl 131 is provided for each of the ratchet wheels 112.

Normally a drive is required to rotate the counters R1 and R2 step by step until they register the given number (i. e. corresponding to the pin 116 blown up) after which they cease to rotate; the same drive movement is then required for an entirely different purpose as will be seen below.

For normal use the DJ signals are counted on counters R1 and R2. As counter R1 has a prior mechanical action sequence resulting from such counting it becomes the means whereby control from tower 1 can supersede tower 2 control.

When pawl 124 of counter R2 is operative to transmit drive movements of the DJ frame 179 to the ratchet wheel 122 of counter R2, the pawl 124 for counter R1 similarly operates to effect counting on counter R1.

If the signal is such as to cause deletion of lines when towers 3, 4 and 5 are engaged then counter R1 drive pawl 124 is removed by the actuation of piston HE2 to prevent R1 counting, otherwise R1 would check off and disrupt the lines resulting from a tower 2 directive.

The arrangement is such that the tower engaging rod 12 always returns to the tower from which its removal was initiated, when the abnormal movement referred to hereafter completes the cycle of operations resulting from the initiating signal.

Thus when making up a setting on tower 2, counter R2 is used for line from tower 3, 4 or 5, for line insertion or deletion, the DJ signals from these towers operating R2, whilst those of tower 2 have no operative counting action. When making up a setting on tower 1 counter R1 is used for all towers for line insertion, or if tower 2 is already in control of 3, 4 or 5 it is itself subject to correction, control for insertion or deletion from tower 1 hence the DJ signals from tower 2 are counted on R1. When deletion of lines from towers 3, 4 or 5 take place as a result of a tower 2 directive the DJ signals do not count on tower 1 in order that sequence control cannot be lost however much intertower movement and interruption of signal directives takes place.

The R1 and R2 latch plates 118 are released by any "abnormal movement" from the DJ1, DJ2, L1 or L2 spring boxes as already detailed.

*Abnormal movement*

When the ratchet wheel 122 can no longer be rotated by the pawl 124, continued strokes of the DJ frame 179 by the lever 80 are absorbed in the spring boxes DJ1 or DJ2. The absorption of a stroke by one of the spring boxes DJ1 or DJ2 (or of the spring boxes L1 and L2 described hereafter) results in what is termed an "abnormal movement"; this will be described with reference to Figure 11 which represents either pair of spring boxes DJ1, DJ2, L1 or L2.

In the schematic view of Figure 1, the spring boxes DJ1, DJ2 (and L1 and L2) are shown as normally transmitting a push from the lever 80 to operate the pawls 124 (or 126 in the case of L1 and L2). In the mechanical embodiment of the machine, see Figures 11 and 5 particularly, it is more convenient for the spring boxes to transmit a pull for the same purpose, the operation of the spring boxes being otherwise unaltered. A rod 106 (Figure 11) of the DJ frame 179 is driven ultimately from the shaft 14, by lever means from the lever 80, through the previously mentioned block 178. The rod 106 is connected to a yoke 107 linking the two spring boxes DJ1 and DJ2, which comprise each a cylinder 107' slidably mounted on a rod 108 which connects each spring box by way of rods 179a with its associated pawl 124 (or 126). Within the cylinder 107' and secured to rod 108 is a collar 109, between which and the end of the cylinder 107' is confined a compression spring 110 which is sufficiently strong to transmit a pull from the rod 106 to rod 108 without further compression. Each pull on the rod 106 is transmitted to rod 108 and results in an operative movement of the associated pawl 124 (or 126 in the case of spring boxes L1 and L2) to rotate the counters R1 and R2. When the counters R1 or R2 are stopped rotating as described above by the engagement of the projection 120 with a raised stop 116 or the fixed "15" stop 117, rod 108 resists the pull with a result that cylinder 107' is moved relatively to the rod 108 and against spring 110 under the pull of rod 106. Pivotally secured to the rod 108 is a lever 111 having roller means 112 at its free end and engaging on the one hand an inclined (coned) camming surface 113 on the cylinder 107' and on the other hand an arm of a bell crank lever 114. When therefore the cylinder 107' is moved relatively to the rod 108 the roller means 112 ride up the inclined surface 113 causing lever 111 to pivot and to displace the bell crank lever 114. The above described motion of the spring boxes is termed "abnormal movement," which constitutes a development in the mechanical usage of the spring box and effects control of the whole mechanism. The bell crank lever 114, shown in Figure 11 represents any of the bell cranks 101, 102 or 205, 207 shown diagrammatically in Figure 1. In order to avoid functioning of the counters R1 and R2 when not required, the pawls 124 and 126 are removed as follows:

*Counter R1 DJ drive pawl 124, associated with tower 1.*—This pawl 124 is removed, i. e. rendered inoperative, when the tower engagement rod 12 is (a) at the tower 1 position (i. e. DJ movements originating from tower 1 do not effect either counter R1 or R2), (b) at the tower 1 neutral position, (c) when air enters cylinder HE2 and piston is latched by detent 203, or (d) on any movement of the rod 12, in order that the initial DJ signal of any first line shall not operate the counter. The removed pawl 124 is released by the first return movement of the DJ frame 179, which is always associated with the above-mentioned initial DJ signal.

*Counter R2 DJ drive pawl 124, associated with tower 2.*—This pawl 124 is removed, i. e. rendered inoperative when the tower engagement rod 12 is (a) at tower 1 position (i. e. DJ movements originating from tower 1 do not effect either counter R1 or R2), (b) at the tower 2 position, or (c) on any movement of the rod 12. The removed pawl 124 is released by the first return movement of the DJ frame 179.

*Counter R1 lead drive pawl 126, associated with tower 1.*—This pawl 126 is removed when the tower engagement rod 12 is at tower 2 neutral position or when air enters cylinder H6 and the plate 128 is latched by detent 206.

*Counter R2 lead drive pawl 126, associated with tower 2.*—This pawl 126 is removed when the tower engagement rod 12 is at tower 1 position or when air enters cylinder H6 and the plate 128 is latched by detent 206.

For removal of the pawls 124 and 126 of counters R1 and R2 on movement of the tower engagement rod 12 to the tower position indicated above, there are schematically shown in Figure 1 four cams positioned at 166, 167, 168 and 169 associated with the rod 12, i. e. on the rack 11, and operating through levers 170, 171, 172 and 173 to remove selectively pawls 124 and/or 126 from the ratchet wheels 122 in the counters R1 and R2.

Lever 172 in addition to removing the pawl 124 of counter R2 on actuation by cam 168 also locates a lug 172a in a position to prevent cylinder H5 from rotating latch plate 118 of counter R2, so that no pins 116 can be latched in counter R2 when the rod 12 is at the tower 1 position. In the mechanical embodiment (see Figure 5) each pawl 124 and 126 for each counter R1 or R2 will have its own cam 174, 175, 176 or 177 which will remove the pawls at all the desired times, operating through the aforementioned levers 170, 171, 172 and 173 respectively. The cams 174, 175, 176 and 177 are mounted on sliding plate 211, which is moved by having a rack 212 which meshes with a pinion 213, fixed to another gear wheel 214, which latter is driven by a rack 215 (not shown on Figure 1) on the positioning rack 11.

Analysing the effects of abnormal movement, they are as follows:

*Spring box DJ1 abnormal movement*

This movement rocks the bell crank 101 so causing the following operations (see Figure 1):

(a) Removal of stops 194, 195 so allowing the positioning rack 11 to go from any tower position to tower 1 position i. e. as shown.

(b) Removal of latch 181 so allowing return of latch bar 180 to prevent insertion of block 178 into DJ frame 179.

(c) Removal of pawl 81 so freeing the rack 11 for the above-mentioned return to tower 1 position.

(d) Removal of latch 187 so allowing latch 183 to be removed from pump collar rod collar 190 (for purposes described hereafter).

(e) Removal of latch 199 from counter R1 latch plate 118 to allow unlatching.

(f) Removal of the retaining or locking pawl 131 from ratchet 122 of counter R1 only to allow counter plate 119 to return to zero.

(g) Removal of latch 200 from lever 201 of leading cut out wheel 10 so shutting valve 201' (for purposes described hereafter).

*Spring box DJ2 abnormal movement*

This movement rocks the bell crank 102 so causing the following:

(a) Removal of latch 181.

(b) Removal of pawl 81.

(c) Removal of latch 188 from latch 184 so freeing pump collar rod 182 (for purposes described hereafter).

(d) Removal of latch 203 from piston HE2 latched as described hereafter.

(e) Removal of latch 204 from latch plate 118 of counter R2 to allow unlatching.

(f) Removal of the retaining or locking pawl 131 from ratchet 122 of counter R2 only to allow counter plate to return to zero.

(g) Removal of latch 200 from lever 201 of leading cut out wheel 10 so shutting valve 201' for purposes described hereafter.

(h) Removal of latch 202 from the piston of valve H7 for purposes described hereafter.

Spring box L1 abnormal movement

This movement rocks the bell crank 205 so causing:

(a) Movement of the control rod 154 to return the rack 11 from the neutral to the tower 1 position (as described hereafter).

(b) Removal of latch 189 from latch 185 so freeing pump collar rod 182 (for purposes described hereafter).

(c) Removal of latch 206 to allow plate 128 to move to right (Figure 1), so allowing pawls 126 to disengage ratchet wheels 122 of counters R1 and R2.

(d) Removal of retaining or locking pawl 131 from ratchet wheel 122 of counter R1 only.

(e) Removal of latch 199 from latch plate 118 of counter R1 only to allow unlatching of raised pin 116.

(f) Removal of latch 200 from lever 201 of leading cut out wheel 10 so shutting valve 201' for purposes described hereafter.

Spring box L2 abnormal movement

This movement rocks bell crank 207 so causing:

(a) Movement of the control rod 154 to return the rack 11 from neutral position to the tower 2 position (as described hereafter).

(b) Removal of latch 189 from latch 185 so freeing pump collar rod 182 (for purposes described hereafter).

(c) Removal of latch 206 to allow plate 128 to move to right (Figure 1), so allowing pawls 126 to re-engage ratchet wheels 122 of counters R1 and R2.

(d) Removal of retaining or locking pawl 131 from ratchet 122 of counter R2 only.

(e) Removal of latch 204 from latch plate 118 of counter R2 only to allow unlatching of raised pin 116.

(f) Removal of latch 200 from lever 201 of leading cut out wheel 10 so shutting valve 201' for purposes described hereafter.

(g) Removal of latch 202 from piston of valve H7 for purposes described hereafter.

The above operative functions of abnormal movements as respects the tower engagement rod 12 allow the rod 12 to return to tower 1 position on actuation by counter R1, or counters R1 and R2 simultaneously, or to tower 2 position from actuation by counter R2. As stated, in the present example, each ratchet wheel 122 has fifteen teeth, one fixed pin 117 and fourteen stop (piston) pins 116, so that one movement of the actuating pawl 124 must be made to bring the wheel 122 into position corresponding to a single line. The actuating pawl 124 is pivoted to its rod on the DJ frame 179 and can be held in non-actuating position as already described when the tower engagement rod 12 occupies one of its neutral positions.

Insertion of leads

For leading purposes the "lead" perforations, i. e. 0005 with H, are used in conjunction with the 0005 SJ perforations, when any of these numbered lower justification keys are used, i. e. the air to give desired number of leads from 1–14. No movements of the DJ frame 179 occur and counting of the counters R1 and R2 takes place at the completion of each revolution of the lead control wheel 8 through the leading pawls 126. It takes 8 revolutions of the caster to insert one lead (i. e. for one revolution of the galley cam plate) using the existing known leading attachment. Therefore it is necessary to count leads—by lead drives of the counters R1 and R2 through the pawls 126 as described above, having a means of counting 8 revolutions between each step-by-step travel of the counter R1 or R2 as required. This second requirement is achieved by introduction of the lead control wheel 8.

Leading caster mechanism

In the leading caster mechanism of the existing machine 0005 air causes the leading valve 137 to be depressed from its halfway position. Normally leading valve 137 is spring held up in this halfway position so that the leading valve piston is pressed against the upper latch 136b, when at the "ready" position. A normally manually operated switch, the shaft of which is shown at 137c, is provided for causing the lower latch 136a to be removed or to be present. If removed, the valve is depressed by 0005 air and spring returned to engage the underside of the plate of the upper latch 136b when the air is cut off. This is the so-called "R" position. If lower latch 136a is present it locks the piston of leading valve 137 in the depressed position, which is the "S" position. This is the existing arrangement, in which with the switch 137c in the "S" (signal or solid) position, no leads are inserted between lines. With the switch in the "R" (repeat) position, leads are automatically inserted between lines as cast.

In order to make the operation of the switch 137c automatic, it is driven by a rack 137d. For operation of the switch 137c, the rack is positioned at "R" when FE combination air is passed to piston FE' and at "S" by piston GE' with GE air.

As the galley cam plate rotates a stud removes the upper latch 136b at 155°–215° on the fourth revolution of drive shaft 14 after initial removal of galley trip arm. If the piston of leading valve 137 is not held by the lower latch 136a—due either to the switch 137c being at "R" so that the lower latch 136a is removed—or to the fact that "S" air is in the same signal as the 0005 in known manner and therefore neutralises the depressing effect of the 0005 air, leaving the piston of valve 137 unmoved downwardly, the piston immediately springs up and permits main air to pass round it and enter the cylinder of the leading galley piston 137b which results in a lead being dropped in below the line which contained the DJ (0005) signal and possibly the "S" leading signal with it. After the lead is dropped in, the main air is cut off as the valve 137 is thrust down and held by the upper latch 136b by the galley cam plate at 20° in the 5th revolution of the drive shaft 14 counted as before. In order to reset the lower latch 136a if using "S" leading and permit the valve 137 to be lifted to its normal halfway position, should it have been depressed and latched, the lower latch 136a is removed at 340° on the 6th revolution of the shaft 14 counted as before. This means that when the galley cam plate has come to rest at the beginning of the 8th revolution, there has occurred (1) release of upper latch 136b at 155°–215° of 4th revolution, (2) depression of valve 137 to its down position at 20° of 5th revolution, (3) replacement of valve 137 to its halfway (ready) position at 340° of 6th revolution.

For the impression mechanism according to British application No. 6848/49 (in which leading can occur at each revolution when the wedges permit table depthwise travel), pin 133 of leading wheel 8 causes lever 134, which in the impression machine of British application No. 6,848/49 is connected to the justification frame of that machine instead of to the usual galley trip 135 shown in Figure 3 of the accompanying drawings, to set in motion the DJ (secondary) shaft of the impression machine for freeing of the wedge locking means and so freeing the table for depthwise travel to the leading piece ejected pneumatically for striking purposes. In effect leading will be identical as a result of pin 133 operation, although if desired the eight revolution wheel 8 of the present machine can be replaced in the impression machine with a three revolution wheel to correspond with the DJ (secondary) shaft of that machine to eliminate the unnecessary five unproductive revolutions which would result from the use of an eight revolution leading wheel in the aforementioned impression machine.

*Lead control wheel 8*

The lead control wheel 8 has eight ratchet teeth driven tooth by tooth by a pawl 132 operatively driven by cam driven lever 80, and three pins 133, 139 and 141 project from its face. Pin 133 moves the lever 134 (then latched by detent 138) during the first tooth movement of the wheel 8, which lever 134 is connected to and operates the usual galley trip 135 (Figure 3) to start off the one revolution of the galley cam plate and ensures that the lower leading valve latch 136a (Figure 1 only) on the normal leading valve indicated generally at 137 on the caster is removed in case the leading switch is set at "S."

The lower leading valve latch 136a is then latched, since a 0005 signal depresses the leading valve 137 from 150°–360° of shaft 14 rotation and removes the lower latch 136a at the same time. Both leading valve 137 and lower latch 136a are spring returned and, therefore, there is likelihood of the lower latch 136a returning in time to arrest the leading valve 137 so preventing full movement up of the leading piston 137b. The lower latch 136a is therefore delatched after the upper latch 136b is removed by rotation of the galley cam plate in known manner and the leading piston 137b has fully lifted, which takes place at 155° on the 4th revolution of the drive shaft 14 counting from the first operative movement of the pawl 132 of the leading wheel 8.

The second pin 139 moves a lever 140 during the fifth tooth movement of leading wheel 8 so freeing the lever 134, by removing the latch 138, before the cam plate depresses the leading valve 137. The third pin 141 during the eighth tooth movement moves a lever 142 connected to the spring boxes L1 and L2 to which are connected the two lead drive pawls 126.

Thus the lead wheel 8 is the counter of the eight revolutions of the machine during which a lead is inserted and as no movement of the paper strip is required on any tower, the tower engagement rod 12 is set at a neutral position as previously described.

*Leading cut-out wheel 10*

As the control arrangement according to the present invention provides means for inserting leads from 1–15 by employing control perforations produced by the leading key together with the appropriate number key or the lower justification keys, the normal "S" method outlined above is really redundant, since usually the leading valve switch 137c will be set at "R" which means that for each DJ signal there is a corresponding travel of the galley cam plate. Each galley cam plate travel results in a lead and for line taking purposes this raises no problem because the timing of the removal of the upper latch 136b is not until halfway through the aforementioned 4th revolution. Then the DJ signal produces abnormal movement by means of the counter control, and tower engagement rod 12 returns to tower 1, for example. Thereafter a directive can be received for tower 2 and from tower 2 a further directive to tower 3, on which occurs a DJ signal. In effect this means the DJ (0005) signal is making the leading valve 137 bob down and up for each of the previously mentioned 4 revolutions with the valve at the "ready" halfway position when the lower latch 136a is released. If however a "lead delete" signal was on tower 1 or tower 2, the last 0005 signal by the DJ on tower 3 would cause the piston of the leading valve 137 to be depressed just as the upper latch 136b is removed, hence no main air could reach leading galley. But when line deleting, then the DJ signals at the end of the lines have to be prevented from causing leads, as they normally do. This is achieved by the leading cut-out wheel 10, described hereinafter. It should be noted that before the delete directive, sending air to cylinders HD2 or HE3 as described above, is received the DJ signal of a line cast must be acted upon to insert the lead belonging to it (especially if operator is using existing "S" method of spasmodic leading). The pump is then cut off by the delete signal and the galley cam plate started on its way round during the delete signal cycle. At the 7th and last tooth movement of the leading wheel cut out wheel 10 (see also below) a pin 209 thereon strikes the cut-out lever 201 which displaces the control piston 201' as will be described. By this time the leading valve 137 has acted normally and the upper and lower leading valve latches 136a and 136b have been reset with the piston of the valve 137 half up (i. e. at the "ready" position). Main air passes through the displaced control piston 201' to the leading cut-out valve 210 which is latched up, so that although the leading valve 137 will be lifted to its up position at the 4th revolution of the shaft 14, after next DJ signal no main air can now reach the leading galley piston 137b therefore no leads are cast. When however the abnormal movement on spring box L1 or L2 takes place the cut-out lever 201 is released from latch 200, so that piston 201' returns by a spring (not shown) to cut off main air from the leading cut-out piston 210. Since however the abnormal movement in this case is caused by the DJ signal of a deleted line no leading must occur so that although main air is cut off from piston 210 it remains latched up and stays so until its latch 210a is removed by a stud on the galley cam plate at the 7th revolution of the shaft 14. This cam plate delatching takes place at each DJ signal but has had no effect before, because constant main air has held the cut-out piston 210 up, so that all that takes place is an ineffective delatching and relatching. The stud on the galley cam plate effecting the delatching is located slightly rearward of the stud for releasing the lower latch 136a which operates at 340° on the 6th revolution of shaft 14. In practice the same stud could be used for both purposes. The leading cut-out wheel 10 which has seven ratchet teeth and one blank space 10a is driven tooth by tooth by a pawl 208 actuated by the lever 80. When air (caused by any delete signal) enters either of cylinders HD2 or HE3 at 150°–300° of shaft 14 rotation, a displacement of a pawl 10b occurs to turn the wheel 10 one tooth so bringing the first operative tooth after the blank space 10a into position to be moved by the pawl 208 which makes a driving stroke at 300°–360° of each rotation of shaft 14. At the seventh tooth movement caused by the pawl 208 the previously mentioned pin 209 strikes the cut-out lever 201 which depresses the piston in the valve 201' so allowing main air to flow to and through a lead control (cut-out) valve H7 (the function of which is described in greater detail hereafter) and thence to the leading galley piston cut-out valve 210, the piston of which is raised and latched by latch member 210a. This piston movement cuts off main air to leading galley piston 137b, which main air normally is delivered from leading galley valve 137 in known manner. When piston in valve H7 is raised by the next H' air occurring (i. e. for lead insertion), the main air is diverted to cylinder H8, which trips latch member 210a allowing the leading galley piston cut-out valve 210 to return to normal so permitting air to flow to leading galley piston 137b for such lead insertion.

The above mechanism is necessitated by the desirability of preventing lead insertion when the leading valve is set at "R" for repeat leading, because of the cam plate revolutions which occur during the action of line deleting, as already explained.

Lead control valve H7

Should a lead signal follow in sequence a line delete signal or break into the sequence of that delete signal as would happen if a "delete 10 lines" directive for tower 2 occurs on tower 1, yet when tower 2 is engaged an "insert 4 leads" directive is already there, it becomes necessary to interrupt the previously described lead cut-out means in order to cast the leads required. When these leads have been obtained, the lead cut-out means must then become operative again without any further directive. This is achieved by the previously described lead control (cut-off) valve H7 in the main air line leading from the piston 201' operated by cut-out wheel 10 to the actual leading cut-out valve 210. The supply of main air to lead control valve H7 is constant from the 7th revolution after the first DJ signal following the finish of that same deleting operation. By inserting the piston of valve H7 as a blocking means in such main air supply, the deleting control is removed temporarily, since main air can no longer reach the cut-out valve 210. Meanwhile the cut-out valve 210 is latched up and the blocking continues because of this latching by latch 210a which normally cannot be removed by the gallery cam plate stud until the 7th revolution of shaft 14 as previously described. Non-removal in this instance would mean that a lead would be lost, hence main air must be diverted from the cut-out valve 210 to piston H8 which causes release of latch 210a of the cut-out valve 210, the diversion of main air to piston H8 being caused by an "insert leads" signal (H air) displacing the piston of valve H7 to be held by latch 202 as already described. In this manner when an "insert leads" signal follows a "lines delete" signal the whole of the delete cycle is cut out. When the abnormal movement from counter R2 is obtained, this removes latch 202 of valve piston H7, which drops down, and main (Z) air passes through piston 201' to the cut-out valve 210 via valve H7 as latch 200 has not been removed by an abnormal movement of spring box L1 and again the delete cycle is complete after its interruption for leading. For this operation counter R2 will have counted the inserted leads required and counter R1 will have been prevented from counting at all, its purpose being only to count the final of DJ signals of the deleted lines.

Pump locking

Whenever it is necessary to prevent the act of casting (or impressing, projecting or other operations) i. e. for line deletion, lead insertion or for stopping and changes of die case, the pump is locked to be inoperative. Attached to the normal pump collar rod 182 of the caster is an additional collar 190 (see Figure 1) on which act the three holding latches 183, 184 and 185. Air entering any of the HD', HE', H2, M2 pistons moves the appropriate lever of catch 183, 184 or 185 so that its toe 186 rests against the collar 190. The lever 183, 184 or 185 actuated is held in this position by an associated latch 187, 188 or 189 and as the pump collar rod 182 moves forward into its known SJ position the toe 186 of the selected latch drop behind the collar 190 so holding the pump collar rod 182 in its SJ position until released. This holding mechanism is indicated generally by the reference numeral 19.

Normally the pump collar rod 182 is thrust outwards 1/16" for any 0075 or 0005 signal and 3/8" when both are in combination. All directives used for the purposes of the present invention contain 0005 therefore the normal thrust will be 1/16". When a latch falls behind the collar 190, as for example, the HD latch 183 for deleting of lines on tower 2, the HE latch 184 for deleting lines on towers 3, 4 or 5, or the H2 or M2 latch 185 for leading or stopping, the latch is piston actuated at 150°–360° of shaft 14 rotation and then retained there by the associated latch 187, 188 or 189. The pump collar rod 182 cannot move its 1/16" forward travel until 350°–10° of shaft 14 rotation hence the spring loaded toe 186 of each latch bears on the surface of the pump collar rod until it can slip behind the collar 190 at 350°–10°. When the retaining latches 187, 188 or 189 are removed by abnormal movements (as previously described) or last tooth drive of stop wheel 9 (to be described hereafter), the spring loaded toe 186 is still held in place against the vertical face of the collar 190 because of the spring pressure of the pump collar rod 182 which remains there until a 3/8" travel obtains as a result of combined 0005 and 0075 signal to bring counters R1 and R2 into action. Thus once a latch 183, 184 or 185 is put in by piston HD', HE', H2 or M2 the pump remains locked by the collar 190 on the pump collar rod 182 engaging the usual pump hook thereby breaking the drive to the pump mechanism in known manner until 350°–10° of shaft 14 rotation of a DJ cycle.

Stop wheel 9

The operations of making up a page of composed type, or producing corresponding lines of impressed photographically projected or otherwise reproducible characters, require changes in the kind of face or size of type or character, as for example from headings to text, and this requires, in machines of the kind previously referred to, the changing of the die case or its equivalent. To enable this to be done, a stopping control air piston M3 is provided for initiating the stopping of the machine automatically when such change is required, under the control of appropriate perforations in the controlling paper strip.

The mechanism actuated by the stop control piston M3 includes the stop wheel 9, whose function is to stop the machine, to provide a time lag between the stopping of the machine and its restarting functionally, and also set the tower engagement rod 12 at one of the previously mentioned neutral positions to prevent the paper strips feeding on. It also provides the means for bringing the indicator 16 into operation or (with Panel A) the automatic sizing control means according to British application No. 19,325/50. Stop wheel 9 has fifteen teeth and a blank 9a over which a pawl 143 travels idly when the wheel is at rest; this pawl is attached by suitable linkage to the cam driven lever 80. The M3 piston initiates movement of the stop wheel 9, when actuated by a suitable combination of airs including M air, by causing a pawl 9b to advance the stop wheel 9 by one tooth so that the pawl 143 is clear of the blank 9a and starts to rotate the wheel 9 tooth by tooth for each revolution of drive shaft 14. Four pins 144, 147, 149 and 152 project from the wheel. The first pin 144, during the first tooth movement caused by pawl 143 strikes a lever 145 which is attached to a lever 146 (see also Figure 2) which operates the release of the starting handle means on the known caster causing a dissociation in the drive, so that the caster is no longer driven. The second pin 147 moves a lever 148a which inserts a drive block 148 (also called the "M" block) in the drive linkage for the indicator 16 for purposes to be described hereafter. The third pin 149 moves a lever 150 during the tenth tooth movement which brings a flag 151 associated with the indicator 16 into a visible position to tell the operator he is free to restart the caster. The flag 151 can conveniently be linked to a mould sizing lever mechanism (according to British application No. 14,748/50), where such is provided, so that the flag does not give the 'go ahead' until the mould has been set and the wedge relocked to their new positions. The fourth pin 152 moves a lever 153 during the fifteenth tooth movement, which is connected through rod 153A and lever 153b to the control rod 154 (previously mentioned with reference to spring box L2 abnormal movement) which engages a spring-loaded sliding rod 81a on which the pawl 81 for the positioning rack 11 is mounted. On movement of the lever 153, control rod 154 is moved to displace the pawl 81 a distance equal to one tooth of the positioning rack 11 to return the tower engagement rod 12 back to the tower position previously occupied from that tower's neutral position (i. e. from tower 2 neutral to tower 2 position or from tower 1 neutral to tower 1 position).

By the above means the stopping perforation combination (which includes M) causes the machine to be stopped by actuation of the existing stopping means and at the same time ensures that tower actuation cannot be effected until a predetermined interval of time, determined by the delay imposed by the 15 revolutions of the stop wheel 9, has elapsed. This interval enables the operator to change the die case or its equivalent and restart the machine, so that the latter can reach a suitable operating speed before the control tower devices again become operative.

Manual valve

A manually operated valve MM is situated on the valve chest 7 for the purpose of preventing the machine from stopping as described above when used for photographically projecting negatives according to co-pending British application No. 18,120/50. As the image size is to be varied automatically and sizing is to be controlled automatically there is no longer any need for the machine to be stopped during page make-up and correction as previously described. With the improved keyboard having "multi measure" means according to British application No. 13,962/50 the present "sizing" keys which in the method of the foregoing description produced perforations M, D, E, F or G—0005 for stopping the machine, comprise the keys for bringing into operation the "multi measure attachment." Thus by pressing a "measure" key with its alternative lug operative to control the respective sizing key bar, the operator obtains his desired measure for setting, whilst on the impression machine or the composing machine, the perforations resulting from such keys effect wedge setting, image size focus setting and page depth control for such changed measure.

The manual valve MM can be operated to prevent M air (stop signal) from reaching pistons M2, M3 and M4, so that respectively latch 185, initiating pawl 9b for stop wheel 9, and lever 192 for releasing pawl 81 of positioning rack 11 and removing stop 196 (for tower neutralizing) are not actuated. Thus an M air does not cause a stoppage of the reproducing part of the machine.

Paper feed

To enable the wedge setting operation incidental to line justification in the existing machine to be effective in a machine or apparatus according to the invention, it is necessary that the DJ operation should take place at the commencement of any line of type controlled by any one of the controlling air towers. As has been described, the DJ movement at the end of any predetermined number of lines causes an abnormal movement of the counters R1 and R2 and a removal of the paper tower control from the particular tower used, leaving the record strip in its last used position on the same tower. This means that the DJ perforations which have been used to produce the abnormal movement must be used again for wedge setting purposes when the same tower is re-engaged. For this purpose it is necessary to interrupt at such times the normal step-by-step feed of the paper strip in such tower in order to obtain a repetitive usage of the DJ perforation. The strip is advanced in normal manner by sprocket wheels connected to a ratchet wheel 98a having a locking pawl 98 and the usual actuating pawl (not shown) both carried by a bell crank lever 98b pivoted on a partially rotatable pawl ring in known manner. The tower operating arm 86 is connected through a link 86a, and a lever 86c, to the locking pawl 98 and the lever 86c is also connected by a further link in known manner to the actuating pawl, the arrangement being such that a movement of the operating arm 86 normally disengages the locking pawl 98 and engages the actuating pawl to move the ratchet wheel 98a one tooth. The operating arms 86 of all the air towers are actuated through the medium of the blocks 84 on the tower engagement rod 12 as described previously, and means is provided to enable the individual tower ratchet wheels 98a to be locked temporarily when a projection 96 as described hereafter is positioned prior to actuation of a selected tower. For this purpose each tower operating link 86a is spring loaded by coupling 86b so that in its rest position the locking pawl 98 engages and locks the feed ratchet wheel 98a.

On tower 1 and during normal conditions for all paper towers, the first feed stroke always feeds on paper to bring the first perforation into line with the air holes on the paper tower, further movement of this feed stroke opening the valves 500 and 503 to allow air to pass through the perforation in the paper strip. On tower 2, when the tower engagement rod 12 moves from tower 1 to tower 2 positions and on all occasions on towers 3, 4 and 5 locking is provided in order that the paper shall not be fed on for the first engaging revolution of the machine drive. This is effected by having a paper engagement shaft 91 (Figures 3 and 6) connected to the tower engagement rod 12 by an arm 92 (Figure 5), and mounted on the paper engagement shaft 91 are four spring-biassed strikers 93 which when moved by the rod 91 (i. e. on movement of the tower engagement rod 12) to their appropriate tower positions contact the spring held tail 94 of a locking lever 95 which is swung over so that the aforementioned projection or tongue 96 is placed between the normal hand locking lever 97 and the locking pawl 98 to hold down the pawl 98 so preventing any paper feed. On the next revolution of the tower drive shaft 20, the oscillating link 21 driven by a lever 99 mounted on shaft 20, on its upward or return stroke, causes a partial rotation of the shaft 91 which removes the striker 93 out of the path of the tail 94 and so allows the lever 95 to move under action of the spring 100 and removes the projection or tongue 96. The reason for this mechanism is to prevent losing a DJ control perforation on tower 2 or on towers 3, 4 and 5, which has not completed its function; in actual fact the DJ control perforation is used twice as already explained. Initially it is used for operating the counter R2 causing the abnormal movement already described which re-sets the tower engagement rod 12 and all other mechanism involved, secondly (its normal function) for setting wedges in known manner on the caster when the rod 12 returns to the tower from which it was withdrawn by perforation control.

An exception to the above operative sequence occurs on tower 2 when simultaneous abnormal movement of spring boxes DJ1 and DJ2 cause the tower engagement rod 12 to return to tower 1 position. On the next return of the tower engagement rod 12 from tower 1 to tower 2, the paper feed would normally lock for the first revolution (as already described). To prevent this locking, the resulting simultaneous movement of the DJ spring box bell cranks 101 and 102 causes a duplex lever 103 (Figure 1) to withdraw a stop 104 (Figure 6) and allow a detent 105 to engage a pin 106a on the lever 95 so preventing the projection or tongue 96 on the lever 95 from entering between the hand locking lever 97 and pawl 98 as previously described. The first return stroke of the lever 21 rotating the shaft 91 withdraws the detent 105 through link 105a so withdraws stop lever 95 and allowing stop 104 to rise and prevent further action of detent 105 until after another movement of the duplex lever 103. As the lever 95 is actuated through its spring held tail 94 no movement will take place when the tower engagement rod 12 returns to the tower 2 position from either of tower 3, 4 or 5 positions and hence paper will feed on first stroke and no locking will take place. The reason for causing tower 2 to feed on the strip is to remove the signal which initiated the cycle producing the counter R2 abnormal movement, as counter R1 abnormal movement took place at the same time as the tower engagement rod 12 returned to tower 1 and not to tower 2. If feed-on did not take place, the signal perforation of tower 2 would be repeated again as happens in the case of a DJ signal.

*Tower indicator and setting mechanism*

The purpose of the indicator 16 (see Figure 1) is to tell the operator which tower is coming into operation next so that he can be ready to insert the correct die case in the caster. The revolving disc 155 has five pockets corresponding to the five towers into each of which can be placed tickets showing all the required data such as mould change, wedge change, leads required and the like appertaining to each of the respective towers next to come into operation. The disc 155 is rotated by a setting rod 18 through a rack 156 and pinion 157 and is held in its correct position by a pawl 158 engaging ratchet teeth 159.

The setting rod 18 is moved by a lever 160 operated by the cam 17 on the same main drive shaft 14 as the cam 13, which operates the tower engagement rod 12, but timed to operate subsequently to the cam 13. (The cam 13 operates at 300°–360° of shaft 14 rotation, while the indicator cam 17 operates at 330°–370° of shaft 14 rotation.) When the indicator 13 is inactive, the drive between the lever 160 and the rack 156 is incomplete, but when a stop signal (M air) occurs in conjunction with a tower air (D, E, F or G air) according to the next tower position operating, the corresponding combination air piston MD', ME', MF' or MG' is actuated to raise one of the blocks 161, 162, 163 or 164 in similar manner to that described with reference to the actuation of the positioning rack 11 for the tower engagement rod 12. The previously mentioned "M" block 148 is also inserted between the selected block 161, 162, 163 or 164 and the end of the setting rod 18 on actuation of the lever 148 by the fifth tooth movement of a stop wheel 9 as previously described. The selected block 161 (or 162, 163, 164) is held in its raised position by a latch 165 until released by movement of the control rod 154A by the fifteenth tooth movement of stop wheel 9 through lever 153 also as described.

The indicator 16 is held in its correct indicating position by the teeth 159 on the rack 156 being engaged by the pawl 158 until, preparatory to the next indicating movement of the indicator the next stop signal (M air) moves piston M5 temporarily to release the pawl 158 and allow the rod 18 to return to its starting position under the spring 18a, so that the previous information shown by the indicator is nullified.

A second object of the setting rod drive is to obtain automatic sizing described with reference to Panel A (Figure 15). As the wedge sizes on the types will probably bear no relation with the positions of the towers on the indicator, means is provided on the sizing mechanism control wedge for causing these various positions but when this wedge control is brought into use depends upon the "M" block etc. The same setting drive does both operations. It adjusts automatically the wedge and indicates the mould size and die case needed for the next tower.

It should be appreciated that with the keyboard means previously described, each tower could have an associated counter means and that there is no limit to the number of towers used or to the numbers counted on the tower counting means. The arrangement described with reference to Figure 1 is not the limit of the application of the present invention. Hence in the keyboard method described, the operative means may be varied and adapted to the type of machine to which the invention is to be applied according to work to be produced.

With the mechanism as described to obtain more than fifteen lines or leads or delete more than fifteen lines or leads merely calls for a further signal or signals. Thus if 37 lines are required from the paper strip on tower 3, the operator depresses his keys as follows: Tower 3, 15; Tower 3, 15; Tower 3, 7; so obtaining the 37 lines with only four revolutions of the machine being unproductive, the second Tower 3, 15; the Tower 3, 7; and the two DJ sets of perforations being re-used.

It is to be understood that this invention applies when using perforated record strips as produced on known keyboards such as British Patent No. 17,199/1908 or 522,184, which produce in known manner strips for control of composing machines such as British Patent No. 8,633/99, 499,859 or 563,331, which machines in known manner are controlled by the first perforation to be met on the perforated strip, which is the last perforation to be made by the operator; hence the known manner consists of casting or projecting, beginning at the last letter of the last line and finishing at the first letter of the first line.

As the hand method of make-up and correction is the preferable method, whereby the compositor begins at line one of page one, so the use of perforated strips whereby make-up can proceed in a manner and sequence analogous to the known make-up method is preferable to the use of strips to which reference has been made. Such strips can be produced by the application of the means according to co-pending British application No. 13,962/50 to any keyboard such as those mentioned.

Hence it is to be appreciated that whilst this invention can be used with known strips controlling known machines in known sequence of operations, it can also be used and with an increased value when control is by perforated strips having line start justification.

For use with this line start justification, the known type moulds can be utilised without alteration but the matrices require the character turned 180° in the same position on the matrix body as the character now has, such matrices are known as reversed matrices and used in the art for phonetical or dialect composition.

Having now described the mechanism shown schematically in Figure 1, the movement of the tower engagement rod and the purposes and effects of various perforations giving control airs will now be set out in greater detail:

*Tower engagement rod 12—forward travel L–R from tower 1 to towers 2–5*

*By direct drive.*—The lever 80 is cam driven from the cam 13 on main shaft 14 and has a constant throw forwards at 300°–360° and returning at 10°–60°. The gauge blocks 79 of varying widths are inserted in its path by D', E', F', G' airs operating D2, E2, F2 or G2 pistons causing the positioning rack 11 together with the tower rod 12 to be taken along a distance according to the width of such stops, such width being the amount required from tower 1 to tower 2, tower 1 to tower 3 and so on.

*By indirect drive.*—When the rod 12 is at one or other of its neutral positions, it has to be returned to tower 1 or tower 2 position, depending whether it is at tower 1 neutral or tower 2 neutral, on completion of H (leading) or M (stopping) directives. The pawl 81, which normally acts as a retainer, locking the rod 12 after the direct drive explained above, is mounted on a control rod 81a which can be moved by control rod 154 as previously described from left to right one tooth unit only of the rack, so permitting stops 196 or 194 to be spring returned to their normal position behind projection 191 on the positioning rack 11. This movement of the pawl 81 therefore is caused by the pin 152 on the last tooth movement of the stop wheel 9 striking the lever 153 causing the movement of the control rod 154 through levers 153A and 153b, or by the pin 141 on the leading wheel 8 striking lever 142 at its 7th tooth movement causing an abnormal movement of the spring box L1 or L2 of counter R1 and R2 during leading drives which are linked to the control rod 154 to provide this movement. Since the lead wheel 8 and the stop wheel 9 are both moved from the same lever 80, this travel of the rod 12 takes place also at 300°–360°. Stop 197 is always fixed in position and stop 195 is always spring loaded to return into position and therefore slips into place as soon as the rod 12 is removed enough to the right to permit entrance.

*Tower engagement rod 12—return travel right to left from tower 5 to tower 1*

From tower to tower, e. g. from tower 5 to towers 1 or 2. The only means of keeping the rod 12 and rack 11 in set position is the pawl 81 and the spring driving the rod 81a against it. When the pawl 81 is removed the rack 11 and rod 12 are spring returned at 360°–50° to stop 196 or stop 194 position. The abnormal movement of counter R1 removes the pawl 81 and also stops 194 and 195, so giving the rod 12 an uninterrupted return to tower 1 position against stop 196. The abnormal movement of counter R2 gives removal of the pawl 81 only, so ensuring that the rod 12 only returns to tower 2 position against stop 194. When both counters R1 and R2 function together the actions are combined and the rod 12 is free to return to tower 1 position against stop 196.

*From tower to neutral.*—To obtain disengagement of paper tower feed the rod 12 returns to the left one tooth only of rack 11, from stop 194 to 195 (i. e. tower 2 to tower 2 neutral), or from stop 196 to 197 (i. e. tower 1 to tower 1 neutral). At tower 1 neutral and tower 2 neutral positions the rod 12 is not engaged with any tower and hence no paper feed results. This motion is obtained by use of pistons H4 and M4 which, when actuated by H' (leading) or M (stop) airs, remove stops 194 and 196 together so that the rod 12 can move from stop 194 to 195 or from stop 196 to 197. It cannot move from stop 194 to 197 as stop 195 is in its path, neither can it move from stop 196 to 195 because of the bias of spring 193.

*Purposes of special perforations used for control of make-up and correcting attachment*

(The key pressed by the keyboard operator when preparing spools is shown in brackets on left.)

Serial (a) (Key-"Tower 2")—perforations 0005-D.—For taking control from tower 1 to tower 2 and drawing lines from spool thereon.

Serial (b) (Key-"Tower 3")—perforations 0005-E.—For taking control from towers 1 or 2 to tower 3.

Serial (c) (Key-"Tower 4")—perforations 0005-F.—For taking control towers 1 or 2 to tower 4.

Serial (d) (Key-"Tower 5")—perforations 0005-G.—For taking control from towers 1 or 2 to tower 5.

Serial (e) (Key-Delete Tower 2)—perforations H-D 0005.—For taking control from tower 1 to tower 2 and drawing lines from spool thereon, also ensuring that no functional operation such as type casting, impressing, photographical projecting or other means takes place or interline leads inserted, whilst the paper runs through, which is rendered redundant as a result of the deletion signal given.

Serial (f) (Key-Delete Tower 3)—perforations H-E 0005.—Same action as serial (e) but for tower 3.

Serial (g) (Key-Delete Tower 4)—perforations H-F 0005.—Same action as serial (e) but for tower 4.

Serial (h) (Key-Delete Tower 5)—perforations H-G 0005.—Same action as serial (e) but for tower 5.

Serial (i) (Key-Sizing 2)—perforations M-D 0005.—Causing the control mechanism to set die case indicator, or (with Panel A) to set mould, wedges and automatic focus to deal with spool on tower 2, details of this mechanism being discussed later.

Further when using "multi-measure" strips already referred to, where towers 1 and 2 only will be required, Panel A will set the wedge, mould, focus or other necessary adjustment for desired matter and no movement of the tower engagement rod 12 may be needed, depending on which tower is being used and which method of control is used.

Serial (j) (Key-Sizing 3)—perforations M-E 0005.—Same action as serial (i) but for spool on tower 3.

Serial (k) (Key-Sizing 4)—perforaitons M-F 0005.—Same action as serial (i) but for spool on tower 4.

Serial (l) (Key-Sizing 5)—perforations M-G 0005.—Same action as serial (i) but for spool on tower 5.

Serial (m) (Key-Stop)—perforations M 0005.—Causing caster to stop and returns indicator 16 or Panel A mechanism to zero on tower 1 position.

Serial (n) (Key-Leads)—perforations H 0005.—Causing the lead inserting mechanism of the attachment and the caster or impression machine to become operative.

Serial (o) (Key-Lead Delete)—perforations M-H 0005.—Causing the above control in make-up spool on tower 2 to be cancelled or limited by master spool on tower 1 in final correcting stage.

By simultaneously depressing any numbered key in row of lower justification keys of known keyboard or any other keys giving the required 0005 perforation, a corresponding number of leads or lines are included or deleted; according to which of the special perforations serials (a) to (h) and (n) and (o) are used in conjunction with the numbered key actions of these perforations on correcting attachment.

Serial (p) (Key-Solid)—perforations G-E 0005.—Causing the leading valve switch on the caster to be set automatically at "s" (signal), whereby interline leading is prevented.

Serial (q) (Key-Repeat Lead)—perforations F-E 0005.—Causing the leading valve switch on the caster to be set automatically at "R" (repeat), whereby a lead is inserted after delivery of each line to the galley.

*Operative sequences of special perforations used for control of make-up and correcting mechanisms*

Serial (r) (Tower 2)—D-0005 perforations results in D air coming from the valve chest 7 to piston D2 at 150°-360°. Piston D2 will have been lifted at approximately 240° and so tower 2 gauge block 79 in the path of the driving lever 80 at 300°-360°. Block 79 is slidable in its holder (lever 78) and so acts as a gauge for travel of the tower engagement rod 12, which is connected to the positioning rack 11. As this rack moves to the right—from tower 1 to 2—the retaining pawl 81 is clocked over 2 teeth, the rod 12 is taken along for 2 tooth units, and engaging block 87 is spring held against engaging arm 84 on tower ready to snap into engaging position at 50°-60°.

Serial (s) (Tower 3)—E-0005 perforations results in E air coming from valve chest 7 to piston E2. This is situated behind piston D2 and lifts up its gauge block 79 in the path of the lever 80 travel, so causing the rod 12, and positioning rack 11 to be taken to tower 3 position in similar manner to that described above.

Serial (t) (Tower 4)—F-0005 perforations results in F air taking rod 12 to tower 4 position by same means as above, by actuation of piston F2.

Serial (u) (Tower 5)—G-0005 perforations results in G air taking rod 12 to tower 5, by same means as above, by actuation of piston G2.

Serial (v) (Tower 2 Delete)—H-D 0005 perforations results in D air coming from valve chest 7 and operating as in serial (r) above, it also results in another air being available—combination HD—which causes the prevention of leading or line production during the passing through of the line, or lines, to be deleted. This is accomplished by piston HD' driving a latch 183 down behind the shoulder on the pump collar trip rod extension 182. This rod is taken forward $\frac{3}{16}$" as in normal action of the existing machine following 0005 air, and places a collar 190 in the path of the usual pump engaging hook to remove it from operative engagement. When the rod 182 is so positioned, no productive operation can take place when this is latched there, by action of latch 183 being engaged and so preventing the normal spring return of the pump collar rod at the next revolution. This one non-operative cycle continues until the HD latch bar 183 is removed by an abnormal movement of spring box DJ1. Further, the HD air drives up piston HD2 which causes the leading cut out wheel 10 to be moved by pawl 10b one tooth, into such a position that the wheel 10 is subsequently driven by the pawl 208 for a further 7 tooth steps, when the projecting pin 209 thereon meets the lever 201 engaging the control valve 201' and causes the lever 201 to displace the valve 201' so that main air passes round the valve 201', along to the cut-out control valve H7, which is in the "open" position so that the air continues to the base of the leading cut out piston 210 causing it to lift and cut off main air supply from leading valve 137 to the leading galley piston 137b, which results in no leads being dropped whilst the deleted lines are running through the tower 2. The lever 201 is retained by latch 200 in its displaced position.

*Serial (w) (Tower 3 delete)—H–E–0005 perforations* results in "E" air functioning as in serial (s) above for tower 3, it also results in combination HE air driving up piston HE' to insert a latch 184 behind the collar 190 on the pump collar rod 182 (as described in serial (v) above with reference to the HD' latch 183), and piston HE2 to remove the line counting drive pawl 124 from counter R1, since it is essential to ensure that only the DJ signals of the lines to be deleted are counted and only on the counter (R2) concerned tower 3 being normally controlled from tower 2. If, however, tower 1 is used as a control means directly for tower 3 then piston HE2 will be rendered inoperative. Further HE air also goes along to piston HE3 which also actuates the initiating pawl 10b of the leading cut out wheel 10 as did HD2 for serial (v) above to prevent leading whilst the paper is running through tower 3.

*Serial (x) (Tower 4 delete)—H–F–0005 perforations* results in "F" air functioning as in serial (t) above for tower 4, and also results in HE air (HF air being the same as HE air as previously described) for actuating pistons HE', HE2, and HE3 to cut out pump, leading counter R1 and DJ pawl 124 as described for serial (w) above.

*Serial (y) (Tower 5 delete)—H–G–0005 perforations* results in "G" air functioning as in serial (u) above for tower 5, and also results in HE air (HG air being the same as HE air as previously described) for same purposes as already described in serial (w) above.

*Serial (z) (Stop)—M–0005 perforations.*—Used mainly in the master spool run on tower 1 to position the tower engagement rod 12 at tower 1 position to cancel out a previous die case instruction, to stop the machine and operate indicator 16 as previously described, or, with Panel A in use, to set automatically the wedges and mould for operations of the next spool to be used, in this case from the spool on tower 1 which immediately follows the "stop." From the valve chest 7, "M" air leads to various pistons, all of which have a single cycle operation only at 150°–360° of shaft 14 rotation. Thus piston M2 drives up the "neutral" latch 185 to ensure that the pump collar rod 182 remains in the "out" or not operative position. This latch 185 is "neutral" in that it has nothing to do with "lines" as had the two latches 183 and 184 for HD' and HE' airs described in serials (v) to (y) above, and is unlatched from a different source, described hereafter. Piston M3 drives up the initiating pawl 9b on stop wheel 9 and brings the 1st tooth into effective position so that the driven pawl 143 which normally idles over the lost tooth blank 9a can take the wheel 9 round its cycle of 15 effective teeth, until after the fifteenth tooth movement the idling position is again reached as previously described. Piston M4 has the effect of removing the retaining pawl 81 on the positioning rack 11 to allow it to be spring thrust to a neutral position, also it removes tower 1 stop 196 and so permits the rod 12 to pass to the 1 neutral position against stop 197, so that no paper feed can be obtained during the 15 revs. taken by the stop wheel 9. Piston M5 is also blown up and causes the pawl 158 to be disengaged from the teeth 159 of the setting rack 156, to allow the die case indicator to return to neutral or blank position so cancelling out the previous die case instructions to the operator before the new instructions are signalled. When in use, Panel A setting returned to zero as described hereafter with reference to Panel A.

*Serial (aa) (Sizing 2)—M–D–0005 perforations* again cause M' air to be obtained from the valve chest 7—when all the pistons M2-5 function as described with reference to serial (z) above. M' air can be cut off from M2 by the hand control valve MM since when using photography with automatic sizing and focussing as described in British application No. 18,120/50, there will be no need to stop the caster in order physically to remove and replace a die case. Further there will be no need for the 15 revs. pause given by stop wheel 9 or for the movement of the rod 12 from tower 1 or 2 to tower 1 neutral or 2 neutral, so that valve MM also functions to cut off M' air from piston M3 and M4. A combination air MD is obtained from valve chest 7 which drives up piston MD' and so lifts up block 164 to have a positioning effect on the indicator 16 and setting rod 18 as previously described. Normally "sizing 2" signal is used on tower 1 for setting purposes for a "tower 2" or "tower 2 delete" signal which follows. As M4 piston removes stops 196 and 194, the rod 12 travels to rest against stops 197 or 195, stop 195 not being removed by air and so the rod 12 cannot pass from stop 194 to 197 because stop 195 is in its path as previously described. Thus, whether at tower 1 or tower 2 the rod 12 only passes to its next neutral, following the action of the M4 piston, whether the actuating M air is caused directly by "stop" key or as a result of any of the sizing keys, all of which use the M' air circuit. See also details under Panel A.

*Serial (bb) (Sizing 3). M–E 0005 perforations* causes M' air to function as for serial (aa) above, piston ME' lifting setting block 163 to an operative position in the drive of indicator 16. As above, this signal can be used on either tower; in either case the rod 12 being returned to the tower from which originated the signal which sent it away. See also details under Panel A.

*Serial (cc) (Sizing 4)—M–F–0005 perforations.*—As in serials (aa) and (bb) above, all the M' air pistons function, piston MF' lifting up setting block 162 to an operative position in the drive of indicator 16. Again, this signal can be used on either tower. See also details under Panel A.

*Serial (dd) (Sizing 5)—M–G–0005 perforations.*—As in serials (aa), (bb) and (cc) above all the M' air pistons function, piston MG' lifting up setting block 161 to an operative position in the drive of indicator 16. Again this signal can be used on either tower. See also under Panel A.

*Serial (ee) (Leads)—H–0005*—a number (1–14) perforations results in H' air being obtained from the valve chest 7, so that piston H2 inserts the "neutral" latch 185 behind the collar 190 of the pump collar rod 182 as this moves to its halfway $\frac{3}{16}$" position as already described. As the air timing is 150°–360° and the pump collar rod timing to the out or ½ out position is 350°–10° the spring loaded toe 186 carried by latch 185 drops in at 10° and holds off the pump until released at the end of the cycle, or cycles, determined by number (1–14) of the leading signal. Piston H3 has a delayed action of 300°–350° and effects the latching by latch plate 118 of the number pin 116 blown up in counter R1 to keep it up as a stop for the counter R1 lead drive. Piston H4 causes the withdrawal of stops 196 and 194 and the removal of the positioning rack pawl 81 in order to let the rod 12 be spring returned to tower 1 neutral or 2 neutral position so that there is no paper feeding on until the leading signal is complete, piston H5 has the same latching function for counter R2 as piston H4 has for counter R1. When the rod 12 is in tower 1 position for the leading signal, the lug 172a operated through lever 172 and cam 168 on the positioning rack 11 prevents the H5 piston from functioning, otherwise counter R2 would have a pin 116 latched up as does counter R1 and so control would be lost. Piston H6 displaces the plate 128, which normally is spring held in a position holding out pawl 132 to prevent any driving of the leading wheel 8, so that at 150°–300° the pawl 132 drops into place and drives the wheel 8 its first tooth at 300°–360° of shaft 14 rotation. Having been displaced by piston H6, the pawl removal plate 128 is held in the inoperative position by latch 206. Piston H7 is lifted to prevent main air reaching the leading cut out valve 210. This is necessary as a signal for leads might exist on tower 2, and which might follow in sequence a delete line signal on tower 1. This delete line signal prevents main air reaching the leading galley piston 137b by inserting the cut out valve 210, which valve is therefore controlled by H7 which is capable of a two-way diversion of H' air. Piston H8 which latches valve 210 in its cut-off position is controlled by piston H7.

*Serial (ff) (Lead delete)—M–H–0005 perforations* has no effect on the tower engagement rod 12 being a single cycle action as on the tower and tower delete signals. This combination of perforations produces MH air from the valve chest 7, which drives forwards MH piston and the rack 130 engaged to a pinion 130a on counter R2 ratchet wheel 122. This causes the wheel 122 to rotate as far as it is allowed until projection 120 engages the pin 116 blown up, if any, or the fixed pin 117, the wheel being held where stopped by its retaining pawl 131. No latching of a pin 116 takes place since the purpose of this pre-setting of counter R2 by MH air is to short circuit the leading signal which follows, which signal causes another pin 116 to be lifted and this time latched, the wheel 122 of the counter then being driven by the drive of pawl 126. As already explained the use of MH air is to effect deletion of a number of leads during a single revolution only of the caster, each lead normally requiring eight revolutions.

*Serial (gg) (Solid)—G–E–0005 perforations* causing piston GE' to operate the rack 137d engaged with the leading valve switch 137c on the caster to semi-rotate this switch until it reaches the position marked "s." In this position the lower latch 136a of the leading valve box 137 is operative and causes the retention of the valve when depressed by 0005 (normal SJ signal), except if this 0005 is neutralised by "s" perforation (as the operator will be used to leading out occasionally by the depression of the leading keys, there will be no need for this method of signal leading as hitherto).

*Serial (hh) (Repeat)—F–E–0005 perforations* causing piston FE' to drive the rack 137d in the opposite direction to that for serial (gg) above, positioning the valve switch 137c at "R" for repositioning the valve switch 137c at "R" for repeat leading whereby the lower latch 136a is removed and the leading valve 137 is spring thrust upwards against the upper release plate in known manner because the switch 137c at "R" prevents the lower latch 136 from being effective.

*Serial (ii) Keys—Lower justification or 0005 perforation.* For tower, tower delete, and leads, any of the 15 lower justification keys may be depressed at the same time as the above keys set out under serials (a) and (hh). These have the effect of blowing up in both counters R1 and R2 the pin 116 corresponding to the key number. If these pins are latched up they then become positioning means for obtaining an abnormal movement as described; if they are not latched, then nothing happens. Thus at each normal SJ or DJ perforation a pin 116 is lifted in the counters (as is the front pin block for wedge setting purposes in known manner), but as no latching occurs nothing happens in the counters. Once they are latched by piston H3 or H5 as described, or by links 78a or 78b to D2, E2, F2, G2, selector lever 78 then it is essential to use DJ perforations to cause the counters to drive.

*Serial (jj) Key—Upper justification—0075 perforation.*—When 0075 air is used in combination with 0005 air an air supply 0075' is obtained to actuate piston 0075', which is used for the purpose of inserting the block, known as DJ block, shown at 178 on Figure 1, for insertion into the path of the lever driven DJ frame 179. On the known keyboard 0075 always occurs in combination with 0005 for the known double justification operation which occurs at the line ends. It is this line repetitive factor which is utilised for line counting purposes, as explained in relation to the DJ pawls 124 of R1 and R2. For normal justification on tower 1 or tower 2 for correcting or setting when no counting is required on the counters, the latch 180 prevents the 0075' piston from lifting the DJ block 178 into operative position. The DJ block 178 is prevented from being effective as an engaging agent in the DJ frame 179 when a normal justification occurs, except when the pins in the counter are latched. This latch 180 is withdrawn (and latched) by movement of piston H5 or pistons D2, E2, F2, G2, through link 78b. After this each DJ perforation causes a drive of the DJ frame 179 until the latch 180 is released by abnormal movement of spring boxes DJ1 or DJ2 withdrawing the detent 181 by bell cranks 101 or 102.

The foregoing description has been concerned with make-up control means whose operations are initiated by special control perforations produced in the paper spools by the keyboard operator at the same time as he sets the copy; in other words the control is dependent on the previous work done in the keyboard machine. It is, however, convenient and useful for certain classes of work (e. g. reprints) to have control of the caster independent of the keyboard in the form of an automatically selective attachment which does not depend on special perforations in the spool to initiate the various operative movements required.

The control means according to the present invention may be achieved by various mechanical means and by following various methods of sequence control, but all must be capable of bringing about the following:

(1) Stopping of the caster machine when necessary.

(2) The introduction of a plurality of leads according to the numbers required and their whereabouts in the page as required, and (3) Command of the operations on any paper tower selectively engaged for any desired number of lines to be taken from the paper record spools and used in the make-up of the page, or to be taken but not used (i. e. when lines are to be deleted).

As has been pointed out in respect of the control apparatus of Figure 1 (referred to hereafter as keyboard control), a DJ operation takes place at the end of each line cast. This same movement, which is a constant feature, can be used as a controlling factor for control apparatus (as described hereafter with reference to Figures 12, 13 and 14) operative independent of the keyboard (hereafter referred to as caster control). In applying caster control means to another type of machine, then any other movement relative to line completion could be equally well harnessed.

The invention will now be described with reference to apparatus embodying caster control, shown schematically in Figure 12. In the following description, wherever possible reference is made back to the description of the keyboard control apparatus of Figure 1, since many of the mechanical principles and movements are the same or similar or correspond.

General principles

A movement of the justification trip rod caused by DJ operation or any mechanical thrust caused independently by the 0005 and 0075 perforations used at each DJ can be used to drive line counting means step-by-step for each thrust of such harnessed movement. The line counting means may conveniently comprise a drum (see Figure 13) 745 having ratchet teeth 827 peripherally arranged to be driven by the aforementioned thrust in any suitable manner, two teeth at a time. Corresponding to each second tooth are drillings arranged in rows around the drum surface numbered in succession, an allowance being made for 50 lines in the drum illustrated though it can be any desired number. The first row (reading from left to right) carries studs such as 621 and affect mechanism relative to tower 1. The second row shown carrying stud 618, controls tower 2. The third row, stud 826, controls tower 3. The fourth row, stud 828, controls tower 4. The fifth row, stud 829, controls tower 5. Next to the fifth (tower 5) row is the "line delete" row when stud 830 as shown would cause the deletion of line 2 on paper tower 4. Each line to be deleted needs a delete stud in the correspondingly numbered hole in the "line delete" row. Deletion could be continuous if desired following from a single stud, but the above method is preferred as less likely to cause trouble. The holes in the first six rows mentioned above are aligned axially of the drum. Further sets of drillings for studs are located to the right of the first six rows and are located in the halfway position, which cause control actions to occur between the lines cast. The first (7th row) of these halfway rows is for leads, stud 756 between lines 2 and 3, causes one or more leads to be inserted at this point. If more than one lead is needed then lead counter 785 (Figure 12 also) is rotated one tooth and each of studs 786 thereon would cause insertion of a lead as described hereafter. A gap between such groups of studs causes lead counting pawl 784 (Figure 12) to cease its step-by-step engagement and the line counter 745 itself is moved on one tooth so contacting (in the arrangement of studs illustrated) tower 2 stud 618 so causing tower 2 to become engaged.

Next to the lead (7th) row is the stop (8th) row. Frequently studs will occur together in the lead and stop rows in the same "halfway" alignment, in which case the mechanical set up is such that the leads are inserted first and machine stopping follow, the counter 745 being moved a ½ step at the end of both series of cycles.

Next to the stop (8th) row is the lead delete row which can only be used to delete any leads which may be inserted on the caster by the leading mechanism while lines are being run through the paper tower with pump cut off during line deletion. When used for this purpose independently of line deletion, the stud in the 9th row operates as though it were in the 6th row. Thus stud 856A (Fig. 13) would actuate a lever (not shown) connected to lever 667 and so set in motion the same sequences.

Then follows "signal" (10th) row for setting leading control valve of the caster to "S" for "signal" leading, and the "repeat" (11th) row to provide interline leading by setting the leading control valve at "R"; studs 811 and 819 respectively are shown in these 10th and 11th rows.

The studs in the rows described above have a controlling effect on the tower used, lines to be inserted or to be taken out, or leads to be inserted or deleted, and constitute directives for page make-up. Associated for mechanical convenience with the line counter drum 745 is a correction counter drum 831 and the lead counter drum 785, both similarly drilled for the insertion of control studs 832 and 786 respectively for the purpose of carrying the direction control further. The correction counter is driven by a DJ pawl 836 (Figure 12) only when line counter 745 is not driven and the studs 832 therein determine how many lines shall be taken from tower 1, when tower 1 carries a correcting spool for use with an already made-up—or for use when making up—known matter.

Description of Drum. (Figures 13 and 14)

In effect this does the work of the valve chest 7 used in Figure 1 together with the various special perforations previously used in the make-up strip used as a correcting control from master tower 1. The whole drum is simply slid off its shaft at the end of the page done, and another drum put in its place the studs of which have been already pre-set by the attendant during the time that the previous drum is operating.

The drum has a bearing 869 which slides over a shaft on the machine and allows for the independent rotation of line counter 745, correction counter 831 and lead counter 785 portion of the drum all of which are built to form a unit on the shaft. Each counter can receive a step-by-step rotation of either a one tooth thrust or a two teeth thrust, depending upon which of the various pawls is providing the thrust.

The outer or main drum 861 (see Figure 14) carries the drillings 862 for the various studs, whilst an inner, stud retaining, lining 863 permits simple placing of studs 864 through holes 866 in lining 863 to required position and retention of the stud head 865 when the lining 863 and the main drum 861 are relatively displaced and locked after setting. This is done by having a spring loaded pin 870 carried by the inner lining 863 and adapted slidably to enter a lock hole 869 in the outer drum 861, the pin 870 carrying a head 867 for manipulation and a shoulder 868 adapted to hold the pin in its withdrawn position as required by giving it a half turn so that shoulder 868 will engage surface 871, in order that the lining 863 can be partially turned for the purpose of loading the drum.

Description of stud actuated lever system (Figure 14)

On the schematic drawing Figure 12 all the studs 621, 610, 666, 756 and so on are shown having levers 622, 609, 667, 765 and so on, each taking a thrust from a stud when the lever is moved into the path of a stud by arms 672 or 708 actuated by cam 614 on the main drive shaft of the caster. The following description refers to tower 1 row for its reference numbers but it is applicable to all studs and levers engaging the same. Chain-dotted position 876 indicates position of lever 622 when cam 614 operates lever 615 and so thrusts arm 672. Lug 812 on lever 622 keeps lever 622 in engagement with arm 672 due to spring 877. A lost motion slot 874 allows for such travel of lever 622 when no stud is engaged. When a stud, e. g. 621 on Figure 13, shown as 864 on Figure 14, is engaged, then slot 874 becomes a stop and does not permit of lever 622 to move forward to the chain dotted position 876.

Description of mechanism of caster method of make-up etc. Paper towers

The 5 towers needed may conveniently be used as for the keyboard method, on the same manifold 6 (Figure 1) but without any valve chest 7 or any of the various actuating pistons shown in Figure 1.

Paper locking of feed

There is no duplex lever movement as described for keyboard mechanism, there being no paired counters comparable with counters R1 and R2 of the keyboard method described above; hence the paper lock removal device on tower 2 is not needed. Tower 1 has no locking means as before, but the same initial locking of towers 2 to 5 is needed.

Tower Engagement Rod 619

So far as method of the engaging the paper feed is concerned, this is as described with reference to the keyboard method. Instead of having pistons D², E², F² or G² locating gauge blocks 79 (Figure 1) for tower engagement purposes, blocks 600-1-2-3 (Figure 12) are mechanically lifted as follows. As the line counter drum 745 is rotated line by line the stud 610 in tower 2 row 611 (towers 3, 4 and 5 are identical in action situated adjacent to tower 2 row) strikes the end of lever 609, pivoted at 608 and cranked at its other end 607 to an arm 606 which causes a lifting of block holding bar 604, so as to position block 603 in the path of a rod 616 driven by lever 615 and cam 614 as previously described. Normally, at tower 1 position rod 616 freely traverses the gap into which the block 603 is inserted and causes no movement of positioning rack 617, but when a block 603 (or 600, 601, 602) is in the path of its travel rack 617 is driven a predetermined distance and rack teeth 618 are taken past pawl 619a, which engages a tooth when rack 617 stops, whereby the tower engagement rod 619 is moved to the selected position. In order for the tower engagement rod 619 to return, that is move to the left as viewed in Fig. 12a, by influence of the spring 635, pawl 619a must be removed from rack teeth 618. Removal of pawl 619a takes place during the commencement of stopping and leading operations, as described hereafter, but normally this pawl is removed whenever tower selection occurs on block holding bar 604 being moved upwardly to place any selected block 600-1-2-3 (corresponding to the tower position) in place. Thus, a cam 605 strikes the head 604a of crank 605a and causes the latter to pivot and push rod 606a. Rod 606a rotates crank 607a which pulls down rod 608a to remove pawl 619a which is retained by latch 609a until cam driven lever 615 pulls link 615a to the left as viewed to remove latch 609a at the end of travel of slot 616a; in this way re-engagement of pawl 619a is timed in relation to the removal of the block 600-1-2-3 and to the main drive. The principle is the same as previously described, the rod 619 from tower 1 position normally having four possible traverses to the right away from tower 1, such traverses being governed by studs in the 2nd, 3rd, 4th or 5th rows of holes in the drum 745 instead of by D', E', F' or G' air.

Valve plates on the manifold block

These remain as before, as previously stated there is no change in the manifold block except that no tappings are taken from it for any control purposes. In the method to be described it consists of an inter-air circuit from any tower to the caster base for normal operations, e. g. die case positioning.

Tower 1 row of holes

This row 620 is shown carrying a stud 621 which, upon striking lever 622 due to step by step rotation of the drum 745, causes lever 622 to pivot on 623 and drive along link 624, which carries two collars 625 and 626. Collar 625 causes crank 627 linked to crank 628 to cause (via rod 839 described hereafter) arm 629 to remove pawl 746 from its engaging position with the ratchet teeth 827 of the line counter drum. This is for the purpose of preventing the main control from being driven whilst lines are being cast on tower 1, so keeping the caster method in line with the keyboard method of using tower 1 as master control over towers 2 to 5. If, however, tower 1 is not used for correcting purposes, but is carrying spools of matter for make-up then counting will be essential, so that a make and break link mechanism 630 is inserted in rod 839 to act as a control for either method.

Collar 626 causes a throw of crank 631 and takes pawl 619a out of rack 618, also the tower 2 neutral position stop 632 and the tower 2 position stop 633 out of path of lug 634 on the positioning rack 618, so that the rack 618 is thrust by spring 635 against the tower 1 position stop 636. As there are no counters to effect control operation by abnormal movements at the end of a certain number of lines depending upon perforations in strip as previously described for the keyboard method, the tower engagement rod 619 will remain on any tower until a stud is engaged in rows 1–5 or until it is taken to a neutral position during leading or stopping.

Tower 2 row

Under tower engagement rod 619 above, it has been described how stud 610 causes positioning of rack 618 and travel of the rod 619 until a further stud is reached in any other row.

Tower 3, 4 and 5 rows

Similar mechanism operated by studs in any of these three rows, causes relative displacement of the positioning rack 618 and travel of the tower engagement rod 619 to engage selected tower 3, 4 or 5.

Line delete row

The studs in the 6th row must cause not only tower selection, indicator and automatic control for that selected tower, but they must also cause the pump to be locked to prevent casting during the running through of the strip consisting of perforations comprising a line or lines and the prevention of lead insertion through galley cam plate action. This is achieved by row 665 (Figure 12) carrying studs, e. g. as 666 on Figure 13, positioned according to line sequence of main control, which when moved strikes lever 667 which is pivoted at 671 to the drive rod 672 connected to lever 615. Attached to 667 at pin 668 is rod 673 which actuates crank 674 and so pushes link 675 to move crank 676. This latter crank is attached to link 677 which moves collar 678 so causing crank 679 to move the leading galley cut-out piston valve 680 against a spring-loading to a blocking position so as to prevent any leads being cast whilst the deleted line or lines strip is running through the caster. Hence whether the valve 681 is set for "S" or "R" there can be no leading because of this blocking of cut out valve 680.

Normally the leading control valve 681 permits main air to pass from line 682 to leading galley piston 683. By inserting the cut-out valve 680 in this air path the passage of this air can be controlled. If crank 679 is actuated to move the piston of cut-out valve 680 to the down position then air passes round grooving 684 and reaches the leading galley piston 683. If crank 679 is actuated to move up the piston of valve 680 the air passage to piston 683 is obstructed. Link 677 is retained by a latch 685.

Lever 667 also has an extension 669 which is adapted to thrust collar 670 to move rod 686 along against its spring 691, so permitting latch 693 to engage behind block 692 as rod 686 moves to the right. When block 692 is displaced latch 694 can engage behind collar 695 on the pump collar trip rod 696. This is again analogous to the keyboard method for keeping the pump locked until latch 694 is delatched as described hereafter.

It will be appreciated that the delete stud 666 will be in the same line sequence as the tower control studs (621 or 610 in respect of towers 1 or 2) if it is being used on that particular tower for the first time.

Thus when going from tower 1 to tower 2 for deletion of four lines then a 666 stud will be in the (6th) delete row 665 and a 610 stud will also be in 2nd row (tower 2) 611. But if already operating in row 2 as a result of 610 stud some six or more lines previously, then all that will be necessary will be the 666 stud to start off deletion, i. e. blocking of leading air and pump for that particular line, with further delete studs 666 for three more lines.

When deletion is accomplished, subsequent delatching of pump and lead air control is automatic, since a single delete stud causes the deletion of a single line only. This differs from the keyboard method where deletion, once started, continues until the counters have counted the required number of lines. When the DJ signal at the end of the deleted line is reached, the justification trip rod 695a makes its normal travel causing a contact rod 696a to place a DJ block 697 in the path of link 699 connected at 698 to cam driven lever 615 for normal counting purposes. As contact rod 696a moves, it carries with it a striking plate 700 connected to crank 701 which moves rod 702. A collar 706a on rod 702 actuates a crank 703a which withdraws retaining latch 693 by link 704a. Should a second delete stud 666 follow the first, latch 693 will be held away because of this action, whilst latch 694 will be moved to its operation latching position by action of collar 670 and block 692 as described. The timing of latch 693 will therefore require to be delayed a little to ensure its re-engagement after disengagement.

Rod 702 also retracts latch 685 from its locked position holding rod 677 so that crank 679 is freed to permit the piston of cut-out valve 680 to return to its normal air passing position by means of its spring loading.

Stop row

The functions initiated by studs in this row follow closely the keyboard M' air system. A stud is positioned at the half row position in the stop (8th row), 703 of Figure 12. Assuming line 37 to be cast of text whilst line 38 is of notes on the proof, between 37 and 38 will be a stopping of machine for die case change, a manual or automatic changing of sizing, mould, or photographic attachment, and in all probability the insertion of some leads. Hence the introduction of the half space rows for a timing of mechanical sequence as opposed to limitations of proof sequences, the DJ block 697 (by insertion as described) being responsible for the sequences involved. Thus in stop row 703, a stud 704 strikes lever 705 which is pivoted at 706 causing it to engage drive pawl 707. As pivot 706 is displaceable, being on drive rod 708 moved by cam 614 and lever 615, the stop wheel 664 with 15 teeth (for imposing a time lag as in keyboard method) is rotated one tooth so that pawl 709 is no longer idling across a lost tooth portion, but instead begins to drive stop wheel 664 round until it has completed one cycle and comes to rest once again in position shown with pawl 709 no longer effective. Detent 710 is merely to prevent back throw of the stop wheel.

The pins on the stop wheel 664 are as described for the keyboard method. The first effective tooth drive causes lever 711a to push link 690 and collar 712a thereon to rock lever 713 about pivot 714 so that collar 715 causes withdrawal of positioning rack pawl 619a in order to ensure that the tower engagement rod 619 moves to a neutral position to prevent paper feeding on. The same rocking movement of lever 713 also causes collar 716 to withdraw the tower 1 stop 636 in order to clear the way to the tower 1 neutral stop if tower 1 is in use, and collar 717 to withdraw the tower 2 stop 633 if tower 2 is in use.

Link 690 also drives up collar 718 to move crank 719 to cause rod 720 to withdraw normal starting handle trip on the caster so that the starting handle is withdrawn and the drive belt passes to loose pulley in known manner. Link 690 also drives collar 721 until crank 689 causes a withdrawal of block 692 as previously described so that the pump locking latch 694 can engage the collar 695 on the pump collar trip rod 696 to ensure that no casting occurs during the 15 revolutions of stop wheel 664 operation.

Link 690 further carries collar 731 which causes crank 734 to thrust rod 508 and so disengage latch 501a from setting rack 500a of indicator 16X and also releasing the latches 501c and 1034 to 1038 of the automatic control unit (Panel A) with the wedges thereof as shown on Figure 15.

At the 5th revolution of stop wheel 664 a pin strikes lever 722 which causes link 723 to apply thrust to collar 726 and so cause bell crank 727 to displace link 728 so that crank 729 inserts a block 730 (equivalent to the "M" block 148 of the keyboard method) which acts as a stop for the running back of setting rack 500a. Link 723 also thrusts collar 724 to cause crank 725 to pull link 658 to the right, which is jointed by pin 642 to lever 641. The lever 641 is thus moved into a position to be struck by stud 610 in row 2 (611) as described hereafter under "Indicator 16X."

At the 10th tooth movement on the stop wheel 664 the flag 504 is operated as already described and the last and 15th tooth movement causes lever 7310 to be struck by a pin so that collar 732 drives rod 733 and pulls over crank 7340 which by means of collar 735 delatches the pump lock 694 by removing latch 693 to let collar 692 be thrust by spring 691 to normal. Movement of rod 733 also operates crank 736, which withdraws rod 737 and causes collar 738 to actuate crank 739, pulling link 780 to remove latch 741 from holding up selector lever 653, which thus is ready for re-operation by next stud of the tower rows, there being in fact four selector levers 653 carrying blocks 646–649.

The stop cycle is now complete and all is now ready to receive the next stud in whatever row it may occur, but before this can happen the line control drum 745 comprising the main control must receive a movement from somewhere. This cannot result from a DJ movement as the tower engagement rod 619 is no longer engaging a tower, so it is in fact done by the stopping means itself. As stud 704 in the stop row 703 (Figure 12) meets cam plate 708a cranked to rod 709a, crank 710a is caused to drive rod 711 along causing plate 742 to swing about pivot 743 and deflect drive pawl 746 out of engagement with the ratchet teeth of line counter 745. Besides being pivoted at 747 to plate 742, rod 711 moves crank 712 which through member 753 and stud 748 thereon removes pawl 749 also in engagement with the teeth of line counter 745 and causes it to be latched back by detent 752 engaging a complementary detent on member 753. Further details of this mechanism are dealt with under "Main Control" heading hereafter.

*Lead row*

For a line delete operation one stud 666 in delete row 665 gives one line out only for one stud as described. For leading one stud 756 in lead row 754 may mean one or a large number of leads inserted, it being remembered that at half way stage (one tooth of line counter 745) before and after the stud 756 may be tower studs in any of rows 1–5. Also there still remains the necessity of obtaining an 8 revolutions time lay per single lead inserted for working of the leading attachment and also control of leading galley piston air as described for the keyboard method with reference to Figure 1.

When a stud 756 is in lead row 754, lever 765 is displaced and being pivoted at 767 (which is on driven lever 708), a movement is produced in lever 769, pivoted freely at 768, causing locking bar 770 to be removed to be latched back by spring-loaded tooth 771 whereby pawl 772 is able to fall into engagement on the 8 toothed leading wheel 773. The pawl 772 is driven by cam 614 on the main drive shaft through lever 615 so that wheel 773 is rotated step by step until the eight revolution cycle is effected. The first projecting pin 774 on wheel 773 strikes crank 775 during the first tooth movement which lifts collar 776 and with it rod 777, latched up by latch 782, to cause rotary movement of a T-shaped bell crank 687 to pull link 687a connected to the existing galley cam plate trip rod to initiate the leading operation in known manner. Also on rod 777 is collar 778 which causes a movement of lever 713 about its pivot 714 to ensure removal of pawl 619a of positioning rack 618 to enable the tower engagement rod 619 to disengage from any tower and go to a neutral position as discussed with reference to the keyboard method; the same movement of lever 713 removes the tower 1 stop 636 by engagement with collar 716 and so presents tower 1 neutral stop, also by engagement with collar 717 tower 2 stop 633 is removed and so presents tower 2 neutral stop 632, one or other of the neutral stops acting as a positioning gauge for lug 634 on the rack 618. The T-shaped crank 687 referred to above draws rod 686 along, so removing block 692 and also placing pump locking latch 694 behind pump trip rod collar 695, to prevent casting for the eight revolutions.

As the one stud 756 in lead row 754 might be a directive for one lead or more, a lead counter 785 is necessary for dealing with the insertion of more than one lead. The action is that stud 756 provides one lead because it locks off pump and allows the lead wheel to be driven by rod 708 from the main drive shaft the lead wheel 773 in turn effects the step by step rotation of the lead counter 785.

Thus a crank 780a during the 5th tooth movement is struck by a pin 774a on lead wheel 773 and causes a thrust of rod 781 against crank 783 to drive the lead counter 785 by pawl 784 for one tooth for each revolution of lead wheel 773. Movement of the crank 780a also retracts latch 782 from a detent on rod 777 to allow the latter to drop to its normal inoperative position (i. e. after four revolutions of the caster in known manner). The arrangement is such that when there is no stud on lead counter 785 presenting itself after such partial rotation of lead counter 786 then the lead wheel 773 releases the pump, settles all mechanism to normal and action is returned to the next stud in the drum. If however there is a stud in the lead counter 785, e. g. as shown at 786, then lever 787 pivoted at 788 drives along rod 789 causing a rocking of crank 790 so that it is held by latch 798 at the same time removing block 791 from its operative position. When block 791 is so removed, crank 792 when moved by pin 774b on lead whel 773 on the 8th tooth movement effects no operative movement; when block 791 is in position then crank 792 when so actuated drives along lug 793 on rod 795 which causes crank 796 to disengage retaining latch 771 so letting the spring 799 take lead wheel drive pawl 772 out of engagement, which pawl continues to be driven each revolution of the drive shaft but has no contact with lead wheel 773. If 19 leads are needed to be inserted, there are required an equivalent number of studs 786 in lead counter 785, after which comes a gap before next leading group of studs 786 and as explained it is this gap which causes the finish of the leading cycle which may consist of 8 revolutions for 1 lead or 800 revolutions for 100 leads if a 100 studs are positioned continuously on the lead counter.

When the leading cycle is completed but before the next stud in any row initiates a further operation, the line control drum 745 (main control) must receive the requisite one-tooth movement. This is effected as for the stop cycle described above. As stud 756 in the lead row 754 meets cam plate 757 cranked to rod 758, crank 759 is caused to drive rod 741 along causing plate 742 to swing about pivot 743 and deflect drive pawl 746 out of engagement with the ratchet teeth of line counter 745, and pawl 749 is simultaneously removed. In this way the line control drum 745 is free to be moved as described under the "Main Control" heading hereafter.

*Lead and stop rows in combination*

This will frequently happen since line 1 of a page mould will normally consist of a page headline, after which leads will require to be inserted before text is commenced at the 2nd line of print on the page. Using type casting there must be a stop stud 704 for die case change from page headline type to text type, also for impression (see British patent application No. 6,848/49) for change of dies; for photography (see British application No. 18,120/50) stopping is not required. After the die case change comes the insertion of the two leads. In the keyboard method this would be a matter of perforation sequence, but in the caster method it is action sequence. On the proof which the operator has as a guide, when drum setting, no action is to be seen, only a little extra white between heading and text. The view of the drum (Figure 13) shows an instance of a stop stud 704 and a lead stud 756 being on same halfline (between lines 9 and 10).

The actions of stop and lead mechanisms is as follows when these two synchronise. Leading stud 756 initiates operation of lead wheel 773 by letting pawl 772 drop into place; lead wheel 773 causes lead counter 785 to be driven by the linkage from crank 780a to pawl 784, and the next stud 786 of which two leads being inserted causes travel of rod 800 which operates lever 769 on pivot 768 to give a further cycle to lead wheel 773 and also trips crank 759 which by rod 758 causes crank 760 to actuate cranks 761 and 762 to displace friction bar 763 which is held by latch 764 and so remove pawl 799 which normally idles over the lost tooth portion of the stop wheel 664, but which would now be positioned over first active tooth had it not been removed, pawl 707 having rotated stop wheel 664 one tooth due to the actuation of lever 705 by stud 704. Thus the stop wheel cycle is held up by action of latch 764 until it is ultimately released by lead counter 785 causing block 791 to be dropped into operative position with rod 793 so that crank 792 actuated by pin 774b on lead wheel 773 can drive rod 795 to the right and cause crank 794 to pivot and release latch 764 (as previously described) which happens only at the end of insertion of lead or leads.

*Signal lead row*

If the text of a job is interline leaded, the extract may be "solid" with leading only at operator's use of "S" lead key as with existing machine. Hence it is desirable to have a stud means of control to alter the leading valve 681. In the keyboard method G E-0005 air sets the switch at "S" as described with reference to Figure 1. In the mechanical layout of the caster method a stud 811 in signal row 810 strikes lever 812 pivoted at 813 causing lever 814 pivoted at 815 to drive along rack 816 until gear 817 is fully rotated to the position when lower leading latch 823 would be operative, thus preventing leading valve 681 from lifting and so passing air via open cut-out valve 680 to leading galley piston 683.

*Repeat lead row*

To set the leading valve 681 in opposite station, "R" setting, and to remove lower latch 823, a stud 819 in row 818 strikes lever 820, pivoted at 821 so causing rack extension 822 to drive rack 816 in opposite direction to a signal lead stud 811, thus rotating gear 815 and valve 681 to the "R" position.

*Main control*

The normal means of moving main control line counter 745 is by pawl 746 except after a lead or a stop cycle when although link 804 is pulled down by crank 797 link 795 and driven lug 793, this cannot be used because stud 748 has removed pawl 803 which is held out by the engagement of detents 752 and 753. Hence after a stop it is left to the stop wheel 664 to provide the means for driving the line drum counter 745 along to the next stud position. This is done by the last effective action of stop wheel 664 on its 15th tooth movement, as previously described, so that crank 731 drives rod 733 and crank 736 so pulling down rod 737 to which pawl 750 is attached and so driving the line counter 745. Plate 742 is then spring removed as soon as detent 753 is freed from detent 752 on downward movement of rod 737 and collar 751 so that the main drive pawl 746 returns into engagement ready for next DJ drive.

A similar drive of counter 745 concludes the leading cycle likewise, when the last stud 774b operates lever 792 linked by rod 795 to crank 797 so causing pawl 749 to drive the counter 745 on to the next tooth.

*Corrections counter*

This counter is an alternative line control, used for lines on a spool of corrections, not on spools of which the lines are known, as in a page proof.

The pawl 746 driven by DJ movement of rod 899 moves the line control drum 745 two teeth for each DJ of lines cast or deleted, and the studs on drum 745 are set relative to the page lines. When correcting, however, it may be a case of taking 6 lines off the spool of corrections and inserting them between existing lines of page, say between 25 and 26 for example, and as the correcting spool may contain all the corrections for the whole job, or at least for a large number of pages, means must be provided for taking off only those lines required, and only when they are required. Therefore correction lines must be counted only one at a time.

The mechanism involved is as follows. When tower 1 carries a spool of insertion corrections stud 621 on tower 1 row 620 causes lever 622 to drive collar 625 along, so rocking cranks 627 and 628 in such a manner that correcting link 839 and extending between the correction counter 831 and line counter 745 is thrust so as to withdraw DJ drive pawl 746 from its normal working position on line counter 745, and at the same time release DJ drive pawl 836 to engage on the correction counter 831. When withdrawn, link 839 is latched by lug 838a being positioned behind detent 838. The DJ drive is therefore changed from line to correction counter, while lines continue to be taken off correction spool on tower 1 until DJ drive is again reversed and line counter 745 again operates. When stud 832, moved by step by step rotation of correction counter 831 by pawl 836, contacts lever 833, the latter pivots about 834 and causes rod 833a to rotate crank 835 and lower detent 838, so that rod 839 is detached and returned to normal position by position by spring 840. This action causes lever 837 to pivot and remove pawl 836 from engagement with counter 831. At the same time lever 833 through rod 733 turns crank 736 to cause a drive of line counter 745 by pawl 750 to engage the next tower stud and also detaches detent 741 holding the selecting block lever 653. While correcting no lines have been counted on line counter 745.

DJ block cut out

As with keyboard method, the DJ perforations are used twice, once for wedge setting and again as the signal of a line delivery. Hence occurs the associated paper feed locking means. However it is necessary to prevent the repeated DJ to act twice for line counting, otherwise count of lines per page would be completely lost. The mechanism involved is as follows. The positioning rack 618 carries two cam projections 844 and 843 which have a roller lever 842 bearing on them. Any movement of the tower engagement rod 619 from tower 1 neutral to tower 2 neutral would cause lever 842 to depress collar on rod 842a and cause crank 846 to effect through rod 847 a locking of paper locking means as previously described. Movement of rod 842a also rocks crank 848 to drive along a DJ block bar 849, which is latched at 850 by detent 851, so that the end of bar 849 blocks the entry of DJ block into its driving position. Delatching of bar 849 is effected on a return movement of the cam driven link 699 causing an articulated lever 852 to ride over cam surface 853 on the crank 854 and cause the latter to withdraw detent 851. Bar 849 is then returned by spring 849a and causes lever 848 to pivot and maintain rod 842a in contact with lever 842 as the latter follows cams 843 or 844 on rack 618.

Indicator 16X

This is driven by rack 500a and pinion 1074 from a rod 505 and latched where thrust by pawl 501a. As shown, it is the tower 1 position which is caused by collar 637 on bar 624 thrusting along a friction held bar 638 which in turn drives against collar 639 on the rod 508, causing latch 501a to be withdrawn, so that rack is thrust by spring 640 to its tower 1 position.

To indicate the tower 2 position a system is employed similar to the MD', ME', MF' and MG' means described for the keyboard method on Figure 1. A lever 641 is so situated that at the halfway row stage, i. e. before stud 610 in row 2 strikes lever 609, it strikes lever 641 which is pivoted at 642, causing a movement of bell crank 643 which lifts a link 645 attached to selector lever 653 and so inserts tower 2 blocks 646 in the path of rod 650 which is attached to end of lever 651, the end 613 of which is driven by cam 612 on the main drive shaft. Thus the drive is transferred to rod 652 which in turn drives along rack 500a one tooth distance and rotates indicator disc 16X one sixth. Also on rod 652 is a link 652A which connects with link 505c on the lifting rack 156X of automatic control unit (Panel A); shown in Figure 15 described hereafter. Movement of the disc 16X to the other stations is similarly achieved by raising of one of the blocks 647-8-9 by the engagement of levers similar to lever 646 actuating duplicated cranks 643 and 645 for towers 3, 4 or 5 indication. This in effect means that the indicator is set one revolution ahead of the actual tower engagement rod travel initiated by lever 609 so it can be seen that stud 610 performs two functions, first setting the indicator and then moving the tower engagement rod. Release of indicator rack 500a is done when going from tower 2 to any other tower (or from towers 3, 4 or 5 likewise), by having a collar 654 on rod 658 linked at 642 to the lever 641, adapted to strike lever 656 which is pivoted at 657 and so drives along collar 655 on rod 624 which takes along friction bar 638, drives along rod 508 by collar 639 and removes latch 501a.

This delatching of indicator takes place at the same time as the lifting of the selected indicator setting block 646-7-8 or 9.

Flag 504a

This has the same purpose as before and is actuated from stop wheel 664 in similar manner and at same timing as in the keyboard method. A stud at tenth tooth position on stop wheel strikes lever 663 which causes link 662 to move crank 661, pull link 660 against crank 659 and cause rod 503a to display the flag 504a at the appropriate revolution. The whole of this linkage is spring returned when the stop wheel 664 has finished revolving.

In the keyboard method (Figure 1) and caster method (Figure 2) as described a rack driven indicator means in combination with machine stopping is provided, which is identical for both methods, in which is contained certain instructions to the attendant, the arrangement being that these instructions are disclosed when required depending upon the respective tower engagement.

These instructions relate to the manual removal replacement and adjustment of known normal wedges, or hand adjustment of the improved sizing means as disclosed in British patent application No. 14,748/50 by the machine attendant. They also relate to the type body depth mould size required, which is obtained by manual positioning of the mould control lever as disclosed in British patent application No. 19,325/50 by the machine attendant.

When a mould is not being used the instructions relate to the control of table depth movement by the depth bars or the micrometers as disclosed in British patent application No. 6,848/49 in order to obtain count spacing depthwise of impressions, such control of depth control mechanism being done manually.

When photographic projecting takes place instead of impressing as disclosed in British patent application No. 18,120/50 the same table depth control must take place when images of various type body depth sizes are being formed relative to the various towers.

It is the purpose of the mechanism described under Panel A to relieve the attendant of manually altering his sizing means and mould means by automatically performing such functions for him, though he will still have to change the diecase when the machine comes to rest; for casting from different matrices.

It is the further purpose of Panel A to relieve the attendant of manually altering his sizing means and table depth control means when impressing as in British patent application No. 6,848/50, but he will still have to change his diecase for impressing with dies of a different type size face.

It is also the further feature of Panel A to perform the sizing, table depth control and control of the perforation system used in British patent application No. 18,120/50 automatically without any need for the machine to stop and without any manual operation on the part of the attendant. Panel A is therefore a means of performing certain functions automatically as described hereafter and when used replaces the indicator 16 or 16X and the setting means therefor, illustrated in and described with reference to Figures 1 and 12.

In the following description of Panel A, alternative references are used for certain members which have functional equivalents in the indicator means of Figures 1 or 12. Where, in an alternative reference, a suffix "X" is used, this indicates that the same reference number will be found on Figure 1 for the same or equivalent part, and where suffix "C" is used, the same applies to Figure 12.

*Panel A—rack travel*

Instead of pistons MD', ME', MF' and MG' causing gauge blocks 161 to 164 to be lifted up into the path of lever 160 against the "M" block 148 and so taking along the setting rack 159 (Figure 1), the same air supplies lift up a different setting rack 156X (502C). Pistons MD'X, ME'X, MF'X and MG'X are provided for this purpose, each carrying rack setting means of different lengths, thus piston MD'X has a stop extension 164X, corresponding to the gauge block 164, which controls the piston lift by striking an upper plate 1090a, MF"X has a much shorter stop projection 162X, whilst the MG'X piston has the shortest stop projection 161X, which results in rack base plate 1091 being taken up to its highest position. Piston ME'X is not visible in the drawing of Figure 15, but carries a stop projection of length intermediate those of projections 164X and 162X. The setting rack 156X carries on one side teeth for causing rotation to gears 1101, 1061, 1053 and 1074, and on its back are ratchet teeth 159X (500c) for enabling detent 158X (501c) to retain it in the position to which it has been lifted. The MD, ME, MF and MG air supplies result from perforations obtained by operator depressing "sizing" keys 2, 3, 4 and 5 provided on the keyboard. Instead of lifting rack 156X (502c) by air the same stepped travel can be obtained by linkage from rod 505 of the make-up machine using the caster method (Figure 12) to bracket 505C on rack 156X (502c). The initial displacement of rack 156X can thus be effected either by air or by the keyboard caster method make-up apparatus.

*Rack release*

To release rack 156X (502c), the retaining detent 158X (501c) is removed, either by air at M⁵X piston or by an upward thrust of link 508C (from caster control make-up machine) against spring 1075. The rack then drops until base plate 1091 is adjacent to valve box upper plate 1090, and as it drops it rotates four gears 1101, 1061, 1053 and 1074 anticlockwise and sets all the discs 1102, 1050, 1051 and 155X (described hereafter) to neutral. The air for operating piston M⁵K to release rack 156X is provided by the addition of a further key "Sizing Release" causing perforation combination M-0005, or using the "stop" key and having the manual "MM" air (Figure 1) valves in closed position. In this manner no initiating thrust is applied to the stop wheel 9 by piston M³, but piston M⁵ can function for Panel A purposes.

*Indicator flag*

Flag 151X (504C) is operated by link 150X (503C) actuated by the third pin on the stop wheel 9 or 664. It is not, in fact, needed for automatic sizing, but is retained as being integral with the indicator.

*Indicator*

The indicator 16X is required as a check means to the attendant, so that he should be aware at what stage the page is, and what is happening to the various mechanisms.

Its action and drive remain the same as on Figure 1 or 12. In Figure 15 gear 1074 is mounted on a shaft which rotates indicator disc 155X to any of five positions and to a neutral position when the rack 156X is released as mentioned above. Window 151X' in the body of the indicator 16X is the means through which details are shown.

*Mould control*

Gear 1101 is driven by rack 156X and mounted on shaft 1135 carried in a bearing 1100 which acts as a stop against lateral impact from collar 1135a, to which is attached the disc 1102. This disc carries four stop posts, adjustable as to length and locked by locknuts 1106. These posts (only three of which can be seen in Figure 15) 1105, 1104 and 1103, are so dimensioned and adjusted as to their extent of projection that a desired difference is obtained in the travel of striking head 1107 on rack 1120, to which is attached a rod 1108 operatively connected as described hereafter to a rod 1128 carrying a coupling 1134 connected to the mould depth control means. Depending upon which of the four posts is presented by partial rotation of the disc 1102, so the rod 1128 is permitted to move through a certain desired and predetermined distance. On rod 1128 a spring box 1131 is attached to a cross head 1004 by a web 1133 and hence becomes part of the lever system driven by drive lever 1000 (160X), (565C). As shown in Figure 15 striking head 1107 is in neutral position, which could be used for tower 1 position if a 5-size mould were in use. When spring box 1131 is driven to the left by the lever 1000 a collar 1130 on the rod 1128 is driven through spring 1132 to a contact rod 1108 and so drives rack 1120 along and at the same time causes movement of control rod 1128 linked at 1134 to the mould control means. When head 1107 strikes the presented stop, e. g. 1103, depending upon rotation of rack 156X, then further movement of cross-head 1004 causes spring 1132 to be compressed for the rest of the lever travel. In this manner the same lever movement or any other suitably timed movement can be used to give four or more variable travels, the remainder of the movement being absorbed in spring box 1131.

Latching of rack 1120 by pawl 1121 is automatic, the pawl just running over as rack passes along. Delatching is by linkage to existing means shown by crank 1122 being connected by link 1123 to crank 1124, pivoted at 1126, and linked at the other end to control bar 1127 at pivot 1125. The same perforations which produce M air supply for piston $M^5X$ to delatch pawl 158X (501C) also produce another M air supply for piston 1092, which thrusts bar 1048 along causing movement of bar 1127 with consequent turning of crank 1124 and so by the linkage to withdraw latch 1121 thus permitting head 1107 to be returned by spring 1132 to neutral position.

Alternatively, for use with the caster method machine, a linkage 598C² is provided to connect with rod 598 (Figure 12) which creates a pulling movement to bar 1048 and has the same result.

When the above mechanism is used to control the table depth travel means described in British application No. 6,848/49 link 1134 connects to the depth bars which carry the desired dimensioned stop blocks at intervals, the action being that each bar is moved to insert a stop block before the depth bars according to which of the posts 1103, 1104, 1105 or the other unshown post is operative, the mechanical travels required for positioning the mould control lever being identical with those needed for positioning of the depth control bars.

*Sizing control*

Gear 1053 is rotated by rack 156X (502C) from its neutral to any one of four positions, to be adopted by the disc 1051 coupled thereto. Disc 1051 carries four gauge posts 1069, 1072, 1073 and one not shown, so dimensioned as to produce any desired travel of the sizing wedge to which the sizing control is coupled by coupling 1025. These gauge posts can be based on any type width system but must correspond to the particular rack 1080 being used on bar 1014. In this instance the "Point" rack is shown as being used, therefore the gauge posts 1069, 1072, 1073 correspond to "Point." They are simple to insert in disc 1051, hence the changeover from "Point" to "Didot" for example becomes merely a matter of replacement of rack 1080 and the four required gauge posts for "Didot."

The cam driven lever 1000 (160X), is attached to the crosshead 1004 by link 1001 and rod 1002. The crosshead 1004 slides freely on the shafts 1052 and 1060.

The rack 156X (502C) is raised to required position so rotating the four gears 1053, 1061, 1074 and 1101 which are mounted in bearings to prevent lateral movement. Sliding in suitably splined holes in the gears 1053 and 1061 are splined shafts 1052 and 1060 on which are rigidly mounted the discs 1051 and 1050. These discs hold the eight gauge posts 1066, 1067, 1068 and 1069, 1072, 1073 and two not shown. The ends of the shafts 1052 and 1060 are attached to lugs 1011 and 1012 on the rack carrying bar 1014 and a similar bar 1013 in a manner which leaves the shafts free to rotate. The rack bars 1014 and 1013 are moved along in bearings 1015 and 1017 in a frame 1019 and are urged to the right as viewed in Fig. 15a by tension springs 1044 and 1045. The actual rack 1080 mounted on bar 1014 is composite having four separate sets of rack teeth 1030-1-2-3 bolted together in staggered relationship to give locking to the accuracy to a quarter of the set involved, locking being by any of four detents 1034-5-6-7 cooperating respectively, with rack sets 1030-1-2-3. When the cross-head 1004 is moved forward by the lever 1000 it contacts with spring buffer 1008 the gauge post in its path shown in Figure 15 as post 1069. The crosshead 1004 always travels the same overall distance so according to the length of the gauge post engaged the rack bar 1014 and coupling 1025 will be moved that amount.

In order that the racks 1030-1-2-3 of bar 1014 cannot jump a tooth owing to an overthrow, hydraulic damper 1063 is used. Fixed to the end of the splined shaft 1052 is a piston 1054 working in the dashpot 1063a. As the piston moves forward the oil is forced out through the bleed hole 1055 which is adjusted by the needle valve 1056 into a T-junction 1057 and thence to a reservoir (not shown) via pipe 1059. On the return stroke the oil returns to the dashpot 1063a via the head of the T-junction 1057 and through spring loaded ball valve 1058.

*Photographic control*

This is identical in principle to the sizing control described above as using the gauge posts 1069, 1072, 1073 (one post being unshown) and retaining rack 1080 with lock detent 1034, but for photographic control, four gauging posts 1066-1068 and one not shown for photographic control perform two functions and cause two movements of two separate controls and, as lenses vary depending upon the refractive factor of the glass through which projection occurs, it is impossible to use a rack and still obtain perfect results; in view of this the rack arrangement is replaced by a wedge member locking system. Splined shaft 1060 carries the disc 1050 in which are inserted the gauge posts—shown are pica 1066, long primer 1067 and minion 1068 (one post not shown). These are initially adjusted and set for length, i. e. for the distance between disc 1050 and the extreme end of the post upon which spring buffer 1007 (similar to spring buffer 1008) on crosshead 1004 abuts, when crosshead 1004 is drawn in (i. e. moved to the left as viewed in Figure 15). Once these are set (each varying according to the lens used), they are locked by nut 1066A against collar 1066B and need no alteration afterwards.

By inserting as a stop the gauge post as preset, the attendant can be sure of accurate lens setting to the same position each time the post is used.

On the sizing control mechanism the gauge posts 1069, 1072, 1073 and the fourth (not shown) are of such a length as required by the particular type size rack 1080 required, point, English, American, Didot and so on, the retention by the detents 1034-7 being the critical factor.

On the photographic control mechanism, the gauge posts 1066, 1067, 1068 and the fourth (not shown) will, as stated, almost certainly require an initial setting, depending upon lens, nodal points and other variables, but once set they can be regarded exactly as the sizing posts, comprising distance pieces which are taken along by spring buffer 1007 on crosshead 1004 when rod 1002 is drawn to the left by the lever 1000. As disc 1050 is secured to lug 1012 on control bar 1013, the lens control coupling 1026 is taken along for a certain pre-determined distance, thus, for example, the pica post 1066 causes the lens to be so vertically positioned as to produce an image of exactly a pica size from the type negative, and the same with long primer 1067 and so on.

In order to prevent any lens control movement until a further mechanical, hand or pneumatic directive is given, the bar 1013 must be locked in the position to which it is drawn. This is done by having a spring loaded wedge member 1200 positioned between the bar 1013 and a suitably shaped fixed member 1201. As crosshead 1004 is drawn to the left so the wedge 1200 is removed by bar 1203, the arrangement being that a block 1204 strikes bar 1203 and causes the wedge 1200 to be carried away, so compressing its spring 1205, whereafter the bar 1013 is free for removal. In sequence this is the first action which occurs, the block being driven by depending projection 1206 on rod 1207 which is fixed to crosshead 1004 as shown at broken end 1208. The arrangement is such that when crosshead 1004 reaches the end of its drive stroke projection 1206 is removed, which permits the wedge 1200 to be spring returned to locking position before there is any return movement of the crosshead 1004 and therefore any movement away from the gauging post 1066, 1067, 1068 or the fourth (not shown). As soon as the wedge 1200 is spring thrust home under its fixed member 1201 the bar 1013 and control coupling 1026 remain fixed until the wedge 1200 is released as described by some future directive for a different lens travel.

Besides positioning the lens at the vertical plane required to effect an image of, for example, pica size, as described, posts 1066, 1067, 1068 or the other unshown post also position the object or image plane, or both if both are being used in order to halve the required movement for focussing. This is done by having on each gauging posts 1066, 1067, 1068 and the fourth (not shown) a collar 1066D which is adjustable along the threads of the post and can be locked by nut 1066E. The collar 1066D is initially set for focus and once adjusted remains always in constant relationship with the post lengths. This arrangement comprises means for obtaining different image sizes automatically, for by rotating the desired post into operative position all focal planes, light systems and screenings are also set as a result of the one movement of the crosshead 1004 in the same revolution as the control air piston functions in the keyboard method, or the mechanical stud operates in the caster method.

Collar 1066D causes a dragging movement on projection 1210 attached to rod 1211, which causes control bar 1212 to be taken along a distance always less than that of bar 1013. In effect this means that collar 1066D may be anywhere on its post, the nearer to the disc 1050 the longer is the travel of bar 1212 because the earlier in the constant travel of crosshead 1004 is projection 1210 engaged. Attached to bar 1212 is a coupling 1027, for connecting object or image control means or to both, as desired. Spring 1213 causes the bar 1212 to be returned to its tower 1 or neutral position when its clamping member 1214, carried on crosshead 1004 by rod 1216, is freed from mating with fixed member 1215. Clamping and unclamping is identical on bar 1212 to that on bar 1013 already described, the same bar 1203 and block 1204 being used and the same release means at the end of the lever stroke to obtain locking before collar 1066D comes away, so preventing projection 1210 from following it back by spring 1213.

Damping for rack rod 1013 is as provided for rod 1014 on the sizing control, by a dashpot arrangement 1063'/1064.

*Lever engagement and disengagement control*

By having the previously described wedge member system of locking on the bars 1013, 1212 actuated by shaft 1060 as opposed to pawl and tooth locking as used with bar 1014, there occurs a possibility of the wedges 1200 and 1214 being displaced due to constant light tapping of the selected gauging post 1066, 1067 or 1068 or the fourth (not shown); hence a method of breaking the drive from lever 1000 (160X), (505C) so that lever 1000 can continue to oscillate whilst leaving the crosshead 1004 unmoved. The method to be described hereafter is only one particular method, any other means of achieving the same objective would do equally as well.

Lever 1000 is shown in caster stud method schematic (Figure 12) as 565C and in the keyboard method schematic (Figure 1) of make-up as 160X, and is connected by link 1001 to fork 1300 which carries a bar 1301 having a block projection 1303 on its opposite end. Situated below bar 1301 is a slotted bar 1331 which is connected to shaft 1002 by screwed means locked by nut 1332, the ends of the slot being defined by portions 1302 and 1304. The positioning of bars 1301 and 1331 is such that bar 1301 can oscillate backwards and forwards when driven by lever 1000, whilst bar 1331 remains stationary when in the full disengaged position, which is to the right as shown.

Below these two bars is a second slotted member 1306, pivotally supported at 1307, which carries within its slotted way 1310 a displaceable engagement block 1305, channelled as shown at 1309 to fit freely into the slotted way 1310. The end of member 1306 furthest from pivot 1307 has below it a spring 1327 to urge member 1306 to lift to the horizontal when free to do so. Engagement block 1305 carries a depending lug 1333 which has on it a roller 1311 offset therefrom, which can engage and be held by a displaceable retaining latch 1317 formed on a lever 1330.

Disengagement of roller 1311 from latch 1317 to allow spring 1327 to lift block 1305 into the slotted bar 1331 in engagement behind block projection 1303 on bar 1301 is caused by any movement of rack 156X (502C) which carries on its side cam projections 1324, 1325, 1326 which cause a roller 1323 pivotally mounted at 1322 on a crank 1320 and yieldably urged to co-operate therewith by spring 1329 to lift whenever rack 156X is displaced and rotate the crank 1320 about its pivot 1321, thus through pin 1319 rocking the lever 1330, which is pivoted at 1318, sufficiently far to remove latch end 1317 from beyond path of roller 1311 which is then disengaged. When block 1305 is allowed to lift and fill the gap between end portion 1302 of slotted bar 1331 and block 1303 on the oscillatably driven bar 1301, the next movement of lever 1000 to the left is transmitted through the coupling so formed to shaft 1002 so displacing crosshead 1004 to the left to cause the various controls to be set depending upon how far the bars 1014, 1013, 1212 and rod 1128 are moved according to which of their associated gauge posts are struck. When lever 1000 reaches its maximum travel to left, the necessary operative stroke has been effected and to prevent the tapping previously referred to, the drive to shaft 1002 must be broken. This is achieved by a disengaging member 1314, which is pivoted at 1313 on bracket 312, and urged upwardly by spring 1316. The end 1315 of member 1314, chamfered off for the purpose, can be lifted by spring 1316 to a point above the path of roller 1311. When block 1305 travels to the left, roller 1311 thereon passes along the upper surface of member 1314 depressing it against its spring 1316, but once block 1305 has gone past the end 1315 of member 1314, the latter is free to lift so that roller 1311 on the return movement of block 1305 engages the lower surface of member 1314 and so is guided to be re-engaged by latch 1317 having caused block 1305 to be drawn down out of its coupling relationship between bars 1301 and 1331. As lug 1333 carried by block 1305 moves to the left a spring 1323 is compressed and on its return urges block 1305 to insert roller 1311 under latch 1317 as described.

The cam surfaces 1324, 1325, 1326 on rack 156X are situated in a related disposition to the retaining teeth 159X also on rack 156X and detent 158X; in Figure 15 the rack 156X is shown as lifted by piston MD'X, the stop extension 164X of piston MD'X being adjacent to valve box top plate 1090, as the rack lifted this one step, cam 1324 caused a rocking of crank 1329 as previously described. Cam face 1325 would become operative with ME'X (piston not shown, lying behind MG'X) whilst cam face 1326 would become operative when stop extension 162X on MF'X struck plate 1090.

*Application of panel A control mechanism to keyboard method make-up apparatus (Figure 1)*

As already described, the keyboard method attachment is pneumatically operated, and is therefore dependent upon control perforations in the record strip, which cause machine stopping, leading and lead deleting, line inserting and line deleting from any of five towers which is actuated to display instructions to the attendant for manually altering the mould, wedge size and die case.

When this keyboard method is used with the existing typecaster, a physical replacement of a die case is essential, therefore the machine is brought to rest to permit above changes but if sizing can be done automatically it saves the attendant's time. When the keyboard method is used with photographic attachment described in British application No. 18,120/50, there is no necessity to stop the machine.

The perforations MD, ME, MF and MG, resulting from the keyboard operator using his "sizing" keys 2—5, are put in the strip so that they are met on the caster before the "tower" directives, whether producing from last line to first, or using line start justification, and therefore producing from first line to last as previously explained. This results in the wedge setting means being ready for the movement of the tower engagement rod 12 to any tower for line casting. For line deletion it is not necessary to ensure that such a sizing combination of signal perforations precedes "tower" directives. If the valve MM (see Figure 1) is open then the M' air is used as well, being always a result of a "sizing" group of perforations, so that M air is available to piston 1092 for removal of lock pawls 1034-5-6-7 (Figure 15) from rack 1080. If the valve MM is closed no machine stopping takes place, but M air is still available to piston 1092 which operates to re-set rack 1080 to zero to be ready for resetting. It should be noted that from perforations derived from the four sizing keys (see British application No. 13,962/50) two things happen on the caster, the wedge is sized and the mould size changed, both taking place before casting takes place under control of the tower next to be engaged, applying this to typecaster according to the present invention. When applied to photographic method apparatus (British application No. 18,120/50) no mould is used, but in its place automatic focussing means is required. The indicator 16X will be always operated, but although used in the former case, in the latter case it is not needed.

*Application of panel A control mechanism to caster method make-up apparatus (Figure 12)*

When using the stud mechanical caster method identical results to those detailed under the preceding heading are obtained following on the depression of the "sizing" keys. The same rack 156X (502C) is lifted, not by air this time but by a thrust on the bracket 506C on the rack, to cause the same sequence of operations as did the MD', ME', MF' and MG' airs.

The difference between the operation of panel A by the caster method and the keyboard method apparatus is that release of rack bars 1020 and rod 1100 and the lifting of rack 156X (502C) is done in the caster method by mechanical linkage to movements caused by studs striking levers, instead of by airs resulting from perforations in paper strip in the keyboard method.

It will be appreciated from the foregoing description that the apparatus may be employed in various ways for making-up pages of composed or reproduced matter, for correction of made-up pages, and for insertion and removal of lines or leads by automatic means from a record previously prepared by the operator. Thus in one mode of operation the control is effected from the paper strip in a master air tower by appropriate perforations in the strip which bring different towers into use as required and also the necessary lead insertions or deletions to complete the page make-up. The controlling perforations may be combinations of existing perforations produced with the existing keyboard mechanism, or they may be additional perforations produced by keys which are added to the keyboard for this purpose. In another mode, the master strip may be provided with controlling perforations which cause operation of air towers other than a master tower as required, and the controlling rows of holes in a drum previously described are provided with the appropriate studs to effect the return of the control to a master tower when required. In a further mode as applied to the correction of previously recorded matter, the corrected lines to be substituted for defective lines in previously recorded matter are recorded upon strip as in known practice, and the control discs are provided with the appropriate studs to effect cancellation of defective lines and the substitution of corrected lines, including all controls necessary for effecting page make-up. The operator can select the most suitable mode of operation, or any combination or variation thereof, according to the character of the matter to be composed or reproduced. Also in another mode as previously indicated, all text matter, headings, notes and so forth, may be recorded upon a single strip or record-bearing means, and the required corrections upon a second strip or means, whereby only two air towers need be employed whether control of such strips is by perforations or by studs in a drum as described.

The invention is not restricted to the example described but can be applied to other machines for producing composed or reproduced matter. For example, the invention could be applied to strip controlled justifying devices for typewriters as described in British patent specification No. 577,042.

I claim:

1. In mechanism for independently controlling the operation of an apparatus or machine for the purposes indicated, the provision of independent and auxiliary control mechanism for effecting sequence control of the lines and disposition of the characters and spacing between such lines, including line and lead repetition and elimination, comprising at least two devices (hereinafter referred to as record devices) each carrying and actuated by independently pre-prepared record-bearing means relating to said line, lead and character control and disposition, counting means whereby selection and sequence control of said record devices is obtained, said counting means being controlled by pre-prepared record bearing means (referred to hereafter as master record) means for actuating said counting means in response to each line completed and each lead inserted (similarly for lines and leads deleted), means controlled by one of said master records for initiating the actuation of said line and lead counting means whereby the latter is put in control of the apparatus, means controlled by said line and lead counting means for transferring control of the apparatus back to one of said master records at the end of a predetermined counting operation of said counting means, and means for transferring control of the apparatus from one of said master records to another record device for further sequential line by line operation according to the actuation of said line counting means.

2. In apparatus for typographical composing as indicated, the provision of independent and auxiliary control mechanism for effecting sequence control of the lines and disposition of characters, including line and lead repetition and elimination, comprising at least two devices (hereinafter referred to as record devices) each carrying and actuated by independent pre-prepared record bearing means relating to said line and character control and disposition, at least one of said record devices being a master record device governing the operation of any additional record devices, line counting means actuated in response to each line completed and each lead inserted (similarly for lines and leads deleted), means controlled by a master record device for initiating the actuation of said line and lead counting means for transferring control of the apparatus back to a master record device at the end of a predetermined counting operation and means for transferring control of the apparatus from a master record device to another record device.

3. In apparatus for typographical composing as indicated, the provision of independent and auxiliary control mechanism for effecting sequence control of the lines and disposition of characters, including line and lead repetition and elimination, comprising at least two devices (hereinafter referred to as record devices) each carrying and actuated by independent pre-prepared travelling record bearing means relating to said line and character control and disposition, a master record device being a sequence control means carrying pre-prepared record bearing means relating to the control of the lines of characters and leads between such lines, means for actuating said sequence control means in response to each line and lead completed, means for actuating any one of said record devices to control the characters and their sequence line by line according to the actuation of said sequence control means, means for actuating any of said record devices to also effect line elimination and means actuated in response to actuation of said sequence control means to cause leads to be inserted and, where necessary, to be eliminated.

4. Mechanism as claimed in claim 2, wherein the record-bearing means comprise paper strip having record signals in the form of perforations thereon and each of said record devices comprise pneumatically operated mechanism controlled by said strip.

5. Mechanism as claimed in claim 4, wherein the paper strip is of known type produced on a keyboard mechanism whereby the location of the justification perforations thereon are dependent on the keyboard measure and justifying scale used.

6. Mechanism as claimed in claim 1, including an auxiliary mechanism adapted to make adjustments to the type width and depth according to the said keyboard measure used, means for controlling said auxiliary mechanism to operate as governed by the record bearing device in control whereby said adjustments are effected automatically.

7. Mechanism as claimed in claim 6, wherein the means for controlling said auxiliary mechanism comprise means responsive to actuation by the record bearing device and means for selecting said adjustment to be made to said auxiliary mechanism, means operating in synchronism with the drive of the main mechanism for causing said adjustment to be made at the appropriate time and means for locking the auxiliary mechanism control means after said adjustment is effected until another adjustment is required to be made.

8. In apparatus for typograpical composing as indicated, the provision of independent and auxiliary control mechanism for effecting sequence control of the lines and disposition of characters, including line and lead repetition and elimination, comprising at least two devices (hereinafter referred to as record devices) each carrying and actuated by independent pre-prepared record bearing means relating to said line and character control and disposition, at least one of said record devices being a master record device governing the operation of any additional record devices, line counting means actuated in response to each line completed and each lead inserted (similarly for lines and leads deleted), means controlled by a master record device for initiating the actuation of said line and lead counting means for transferring control of the apparatus back to a master record device at the end of a predetermined counting operation, means for transferring control of the apparatus from a master record device to another record device, and means associated with said line counting means for setting the number of lines and, as necessary, the number of leads to be counted by said line counting means as a predetermined counting operation.

9. Mechanism as claimed in claim 8, wherein the said line and lead counting means is driven by means transmitting a suitable motion of the machine drive which occurs at the completion of each line, whereby the number of lines inserted and eliminated are counted until reaching a number previously set by said record bearing means.

10. Mechanism as claimed in claim 8, wherein said number can only be set on said line and lead counting means by said record bearing means when in combination with means governing the insertion and elimination of lines.

11. Mechanism as claimed in claim 8, wherein the said line and lead counting mechanism can alternatively be driven by means transmitting a suitable motion from a lead counter device occurring upon the completion of one revolution of said counter device, rotation of which is initiated by said record bearing means and for each revolution of which one lead is inserted, whereby the line and lead counting mechanism counts the number of leads inserted until reaching a number previously set by said record bearing means.

12. Mechanism as claimed in claim 11, wherein said number can only be set on said line and lead counting means by said record bearing means when in combination with means governing the insertion of leads.

13. Mechanism as claimed in claim 8, wherein a separate line and lead counting means is associated with one or more of the record devices, one of said record devices with its associated line and lead counting means being adapted to exercise master control directly or indirectly over the other of said record devices and its associated counting mechanism.

14. Mechanism as claimed in claim 13, wherein one of the line and lead counting mechanisms had a secondary driving means initiated by said record bearing means for the prevention of the insertion of a number of leads and adapted to eliminate the line completion counting travel of the mechanism so that the pre-set number of leads to be prevented is reached and counting thereof is accomplished in a single revolution of the lead control wheel irrespective of the number of leads the insertion of which is to be prevented.

15. Mechanism as claimed in claim 8, wherein said line and lead counting means is locked against further movement when the number of lines counted by said setting means have been counted and the next motion of the line completion drive means effects the termination and, if so controlled, the reinstatement of the operation of the record device in operation, removes the number setting from said setting means of said line counting means, re-sets the said counting means to zero and causes the drive means therefor to become ineffective, the control actions resulting from said locking of said counting mechanism being an abnormal movement.

16. Mechanism as claimed in claim 8, wherein said line and lead counting means is locked against further movement when the number of lines counted by said setting means have been counted and the next motion of the lead counter drive means effects the termination and, if so controlled, the reinstatement of the operation of the record device in operation, removes the number setting from said setting means of said line counting means, re-sets the said counting means to zero and causes the drive means therefor to become ineffective, the control actions resulting from said locking of said counting mechanism being an abnormal movement.

17. Mechanism as claimed in claim 8, wherein means are provided in association with the line counting completion drive means for preventing drive of the line counting means by a drive motion occurring at the beginning of the line (or group of lines) to be inserted (or eliminated).

18. Mechanism as claimed in claim 3, wherein consecutive selectively locatable pre-settable means are provided on the line counting means corresponding to the number of consecutive lines to be produced (or eliminated), a gap after said pre-settable means making the termination of such line production (or elimination) and causing means to operate to effect the termination of the operation of the record device last in operation, said selectively locatable means comprising a first record control means.

19. Mechanism as claimed in claim 18, wherein selectively locatable pre-settable means, corresponding to the number of consecutive leads to be inserted are also provided on another counting mechanism brought into operation by said first record control, means on the first-mentioned line counting means and driven by a drive motion resulting from the completion of each revolution of said lead counter means, a gap after said presettable means marking the termination of such lead insertion and causing means to operate to effect reinstatement of the operation of the record device last in operation.

20. In apparatus for typographical composing as indicated, the provision of independent and auxiliary control mechanism for effecting sequence control of the lines and disposition of characters, including line and lead repetition and elimination, comprising at least two devices (hereinafter referred to as record devices) each carrying and actuated by independent pre-prepared record bearing means relating to said line and character control and disposition, at least one of said record devices being a master record device governing the operation of any additional record devices, line counting means actuated in response to each line completed and each lead inserted (similarly for lines and leads deleted), means controlled by a master record device for initiating the actuation of said line and lead counting means for transferring control of the apparatus back to a master record device at the end of a predetermined counting operation, means for transferring control of the apparatus from a master record device to another record device, means associated with said line counting device, means for setting the number of lines and, as necessary, the number of leads to be counted by said line counting means as a predetermined counting operation, and means for locking said line and lead counting means against further movement when the number of lines counted by said setting means have been counted, the arrangement being such that the next motion of the line completion drive means and, in the case of leading, the next motion of the lead counter drive means effects the termination and, if so controlled, the reinstatement of the operation of the record device in operation, removes the number setting from said setting means of said line counting means, re-sets the said line counting means to zero and causes the drive means therefor to become ineffective, the control actions resulting from said locking of said line counting mechanism being an abnormal movement.

21. Mechanism as claimed in claim 20, wherein an abnormal movement in the line completion drive means for the line and lead counting means is operative also after the elimination of lines to allow return of the pump collar rod of the existing machine, which has been held in its inoperative position during such operations.

22. Mechanism as claimed in claim 20, wherein an abnormal movement in the lead counter drive means for the line and lead counting means is operative also after the insertion of leads to allow return of the pump collar rod of the existing machine, which has been held in its inoperative postion during such operations.

23. Mechanism as claimed in claim 1, wherein means are provided for locking the record-bearing means on all the record devices except the master control record device against feed movements normally applied thereto whereby a control signal thereon can be utilised twice before being moved out of operation, the signal serving firstly as a control means for the apparatus and secondly to initiate its normal operation as on the existing machine.

24. Mechanism as claimed in claim 23, wherein means are provided on certain of the record devices directly controlled by said master control record device for preventing said locking of the record-bearing means whenever both the line and lead counting means function to produce simultaneous abnormal movements in their line completion drive means.

25. Mechanism as claimed in claim 1, wherein leading cut-out means are provided to prevent the normal insertion of inter-line leads when the machine is functioning to eliminate lines, the operation of said leading being initiated by record bearing means governing line elimination and being driven in synchronism with the apparatus or machine to cause the leading galley piston of the existing machine to suspend operation until the total number of lines to be eliminated have been completed as counted by the line and lead counting means of the record device in operation to cause an abnormal movement thereof.

26. Mechanism as claimed in claim 1, wherein means are provided for stopping the apparatus automatically upon initiation by said record bearing means for die case changes and maintaining the machine inactive while this is being done and for indicating the changes to be effected, the stopping means comprising a step-by-step mechanism driven one step per revolution of the machine and adapted to cause in sequence stopping of the machine drive, actuation of an indicator previously equipped with data indicating the changes to be made, and re-establishing the effective operation of the machine when the machine has reached normal speed after manual re-starting.

27. Mechanism as claimed in claim 26, wherein the indicator means includes a selective setting device including a continuously operating drive and a plurality of connector means selectively insertable in response to record bearing means for establishing in part a drive connection between said continuously operating drive and the indicator, each of the connector means being of different lengths to vary the drive stroke to the indicator means to cause different indication thereon according to the connector means inserted, the drive to the indicator being completed by said second sequential action of the stop wheel.

28. Mechanism as claimed in claim 27, wherein the indicator means is located in its actuated position until further record bearing means cause a subsequent stopping cycle to come into operation.

29. Mechanism as claimed in claim 2, wherein the record devices comprise a plurality of pneumatically operated mechanisms having air lines common to each of said record devices and leading to the die case positioning means for actuation thereof, valve means being associated with each of said record devices and being selectively operable by means actuated in response to record bearing means for causing said valve means to connect the record device in operation to said common air lines while the remaining valve means remain closed.

30. Mechanism as claimed in claim 29, wherein each record device is a pneumatically operated air tower according to the existing machine but wherein an additional air line and air valve are provided in order to augment the normal air supply for said pneumatic action.

31. Mechanism as claimed in claim 1, wherein selecting means for determining the individual operation of one only of said record devices at a time is provided and comprises displaceable means interconnecting all of said record devices, record device actuating means carried by said displaceable means and spaced so that one only can be in a device actuating position at a time and means for displacing said interconnecting means in response to record bearing means to locate a selected one of said actuating means in its operative position according to the record device to be operated, and releasable means for retaining the interconnecting means in the positions to which it is displaced.

32. Mechanism as claimed in claim 31, wherein said interconnecting means is displaced by the establishment of a drive connection between it and continuously driven means moving in synchronism with the machine drive, the drive connection comprising one of a plurality of connector means of different lengths insertable selectively in response to record bearing means between said continuously driven means and said interconnecting means, the length of the insertable means selected governing which record device is brought into operation.

33. Mechanism as claimed in claim 31, wherein displaceable stop means are associated with said interconnecting means for predetermining to which record device position said interconnecting device moves when said retaining means are released according to which record device operative selection is to be returned or the operation of which record device is to be interrupted.

34. In apparatus for typographical composing as indicated, the provision of independent and auxiliary control mechanism for effecting sequence control of the lines and disposition of characters, including line and lead repetition and elimination, comprising at least two devices (hereinafter referred to as record devices) each carrying and actuated by independent pre-prepared record bearing means relating to said line and character control and disposition, at least one of said record devices being a master record device governing the operation of any additional record devices, line counting means actuated in response to each line completed and each lead inserted (similarly for lines and leads deleted), means controlled by a master record device for initiating the actuation of said line and lead counting means for transferring control of the apparatus back to a master record device at the end of a predetermined counting operation and means for transferring control of the apparatus from a master record device to another record device, the said record devices comprising a plurality of pneumatically operated mechanisms having air lines common to each of said record devices and leading to the die case positioning means for actuation thereof, valve means being associated with each of said record devices and being selectively operable by means actuated in response to record bearing means for causing said valve means to connect the record device in operation to said common air lines while the remaining valve means remain closed.

35. Mechanism as claimed in claim 34, wherein airs from the pneumatic mechanisms comprising the record devices are passed according to the control perforation in the associated paper stops to a valve chest in which certain of the airs are controlled and distributed singly and in combination to effect sequence control means operations, the functioning of said valve box being dependent on the combination with said airs of a master sequence control air which must be present before other sequence control airs can be distributed to fulfill their operative functions, the arrangement being such that airs resulting from perforations solely for die case positioning do not cause sequence control movements of the mechanism.

36. Mechanism as claimed in claim 1, wherein the line completion and lead control drive means for the line and lead counting means for the record devices each includes a resilient drive thrust absorbing device to accommodate a drive movement of said drive means after the associated line and lead counting means has been locked against further movement and cam and lever means associated with said thrust absorbing device capable of a relative movement whenever said thrust is absorbed to produce the control actions resulting from an abnormal movement.

HENRY GEORGE CROUCHER.

References Cited in the file of this patent
UNITED STATES PATENTS

| Number | Name | Date |
|---|---|---|
| 1,434,114 | Greer | Oct. 31, 1922 |
| 1,606,126 | Houston | Nov. 9, 1926 |